M. TEETOR.
CALCULATING MACHINE.
APPLICATION FILED MAR. 3, 1911.

1,344,191.

Patented June 22, 1920.
20 SHEETS—SHEET 1.

Witnesses
A. G. Hague
A. A. Thomas

Inventor
Martin Teetor
by Wallace R. Lane atty

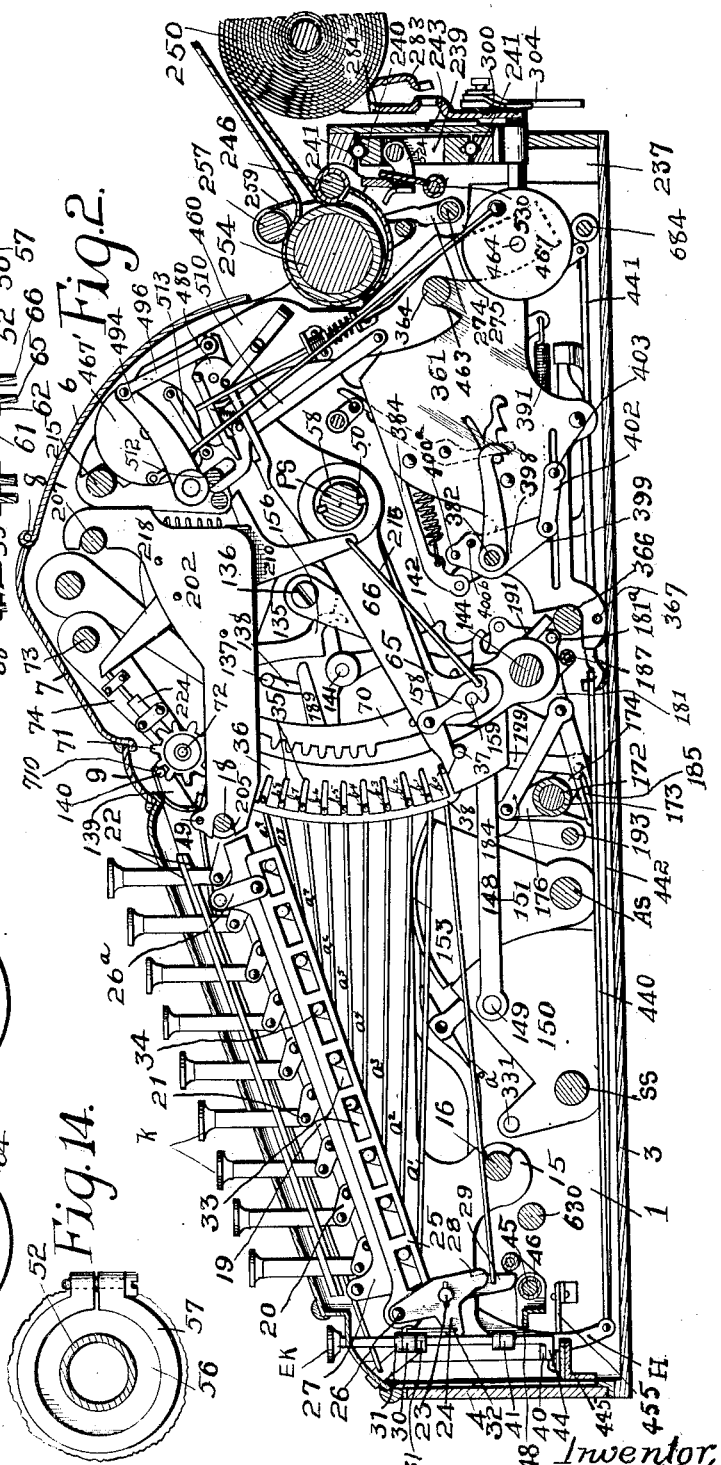

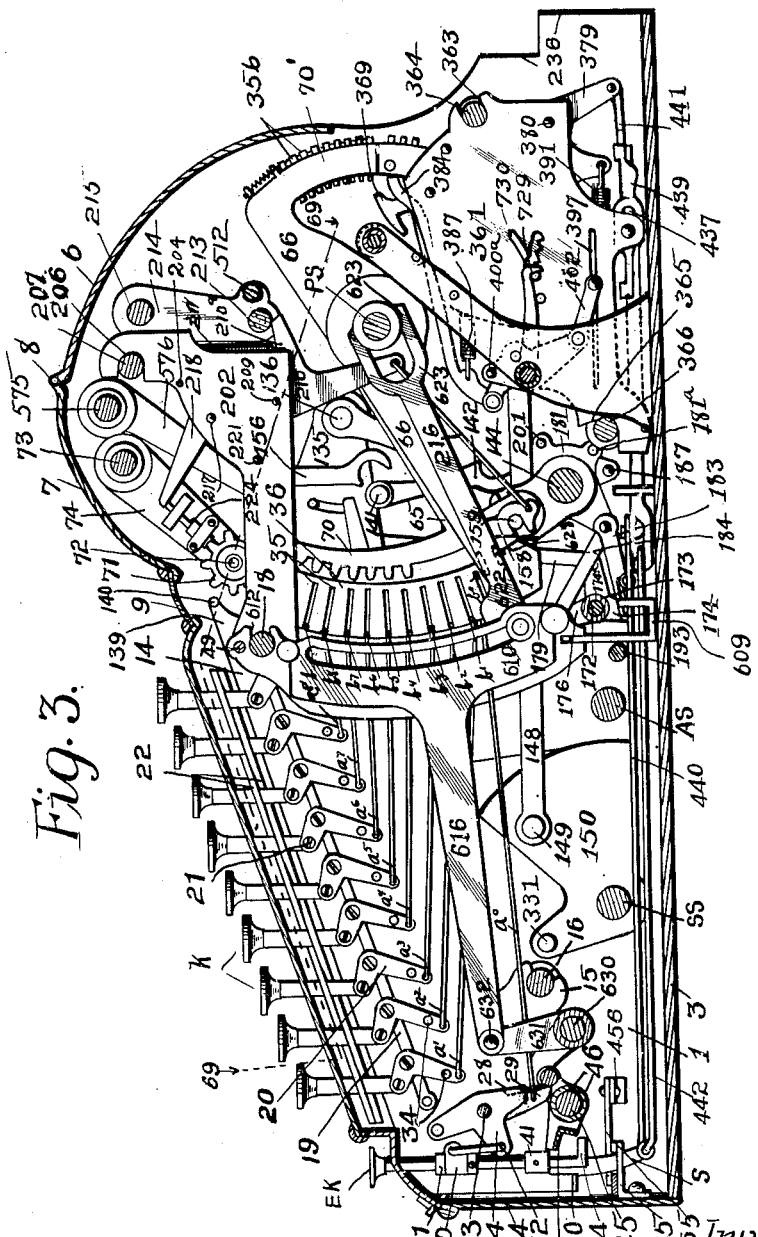

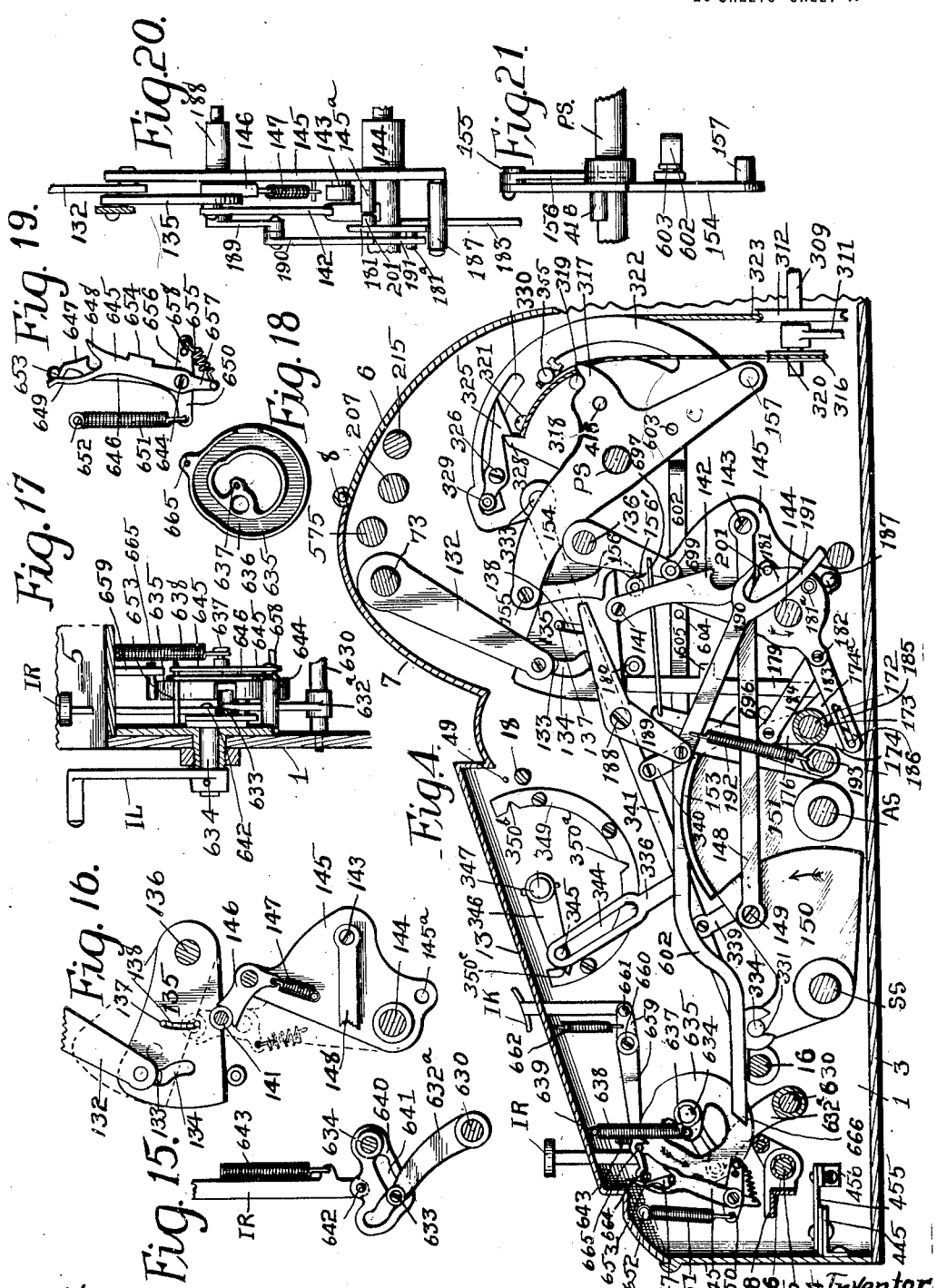

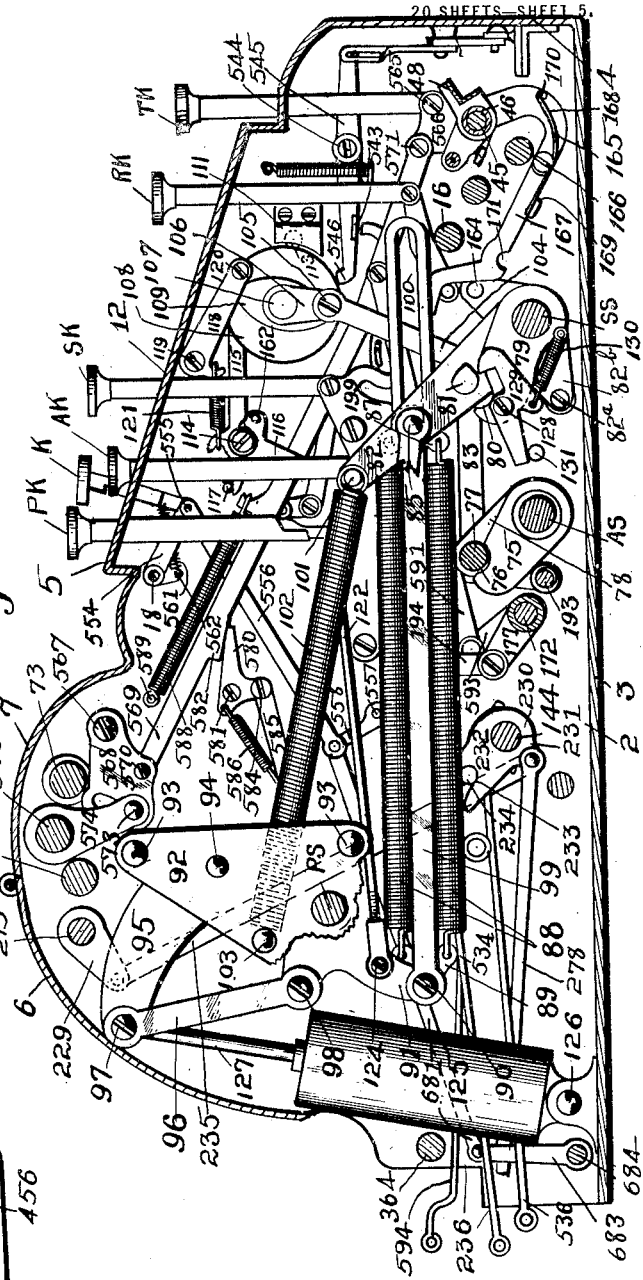

M. TEETOR.
CALCULATING MACHINE.
APPLICATION FILED MAR. 3, 1911.
1,344,191.
Patented June 22, 1920.
20 SHEETS—SHEET 6.
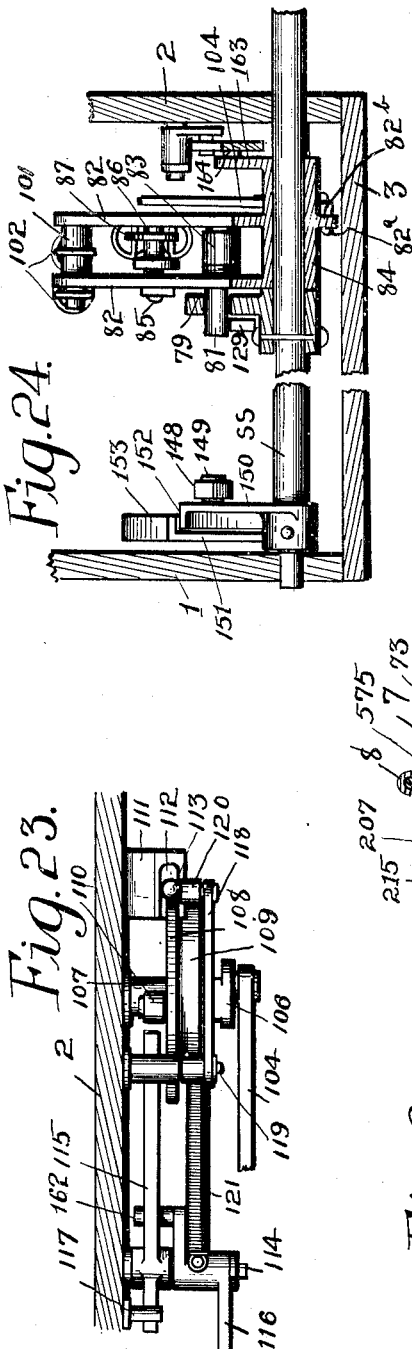
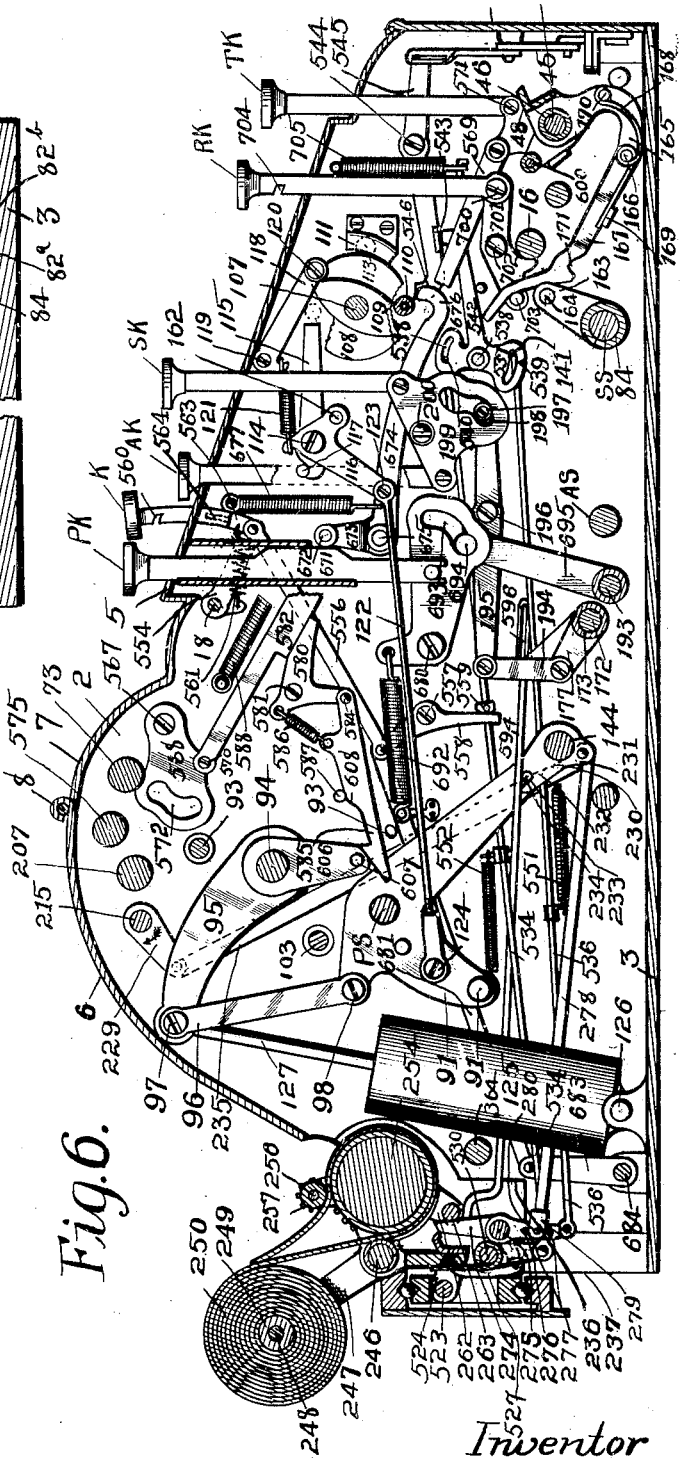
Witnesses
A. G. Hague
A. A. Thomas
Inventor
Martin Teetor
by Wallace R. Lane atty

M. TEETOR.
CALCULATING MACHINE.
APPLICATION FILED MAR. 3, 1911.

1,344,191. Patented June 22, 1920.
20 SHEETS—SHEET 7.

Fig. 7.

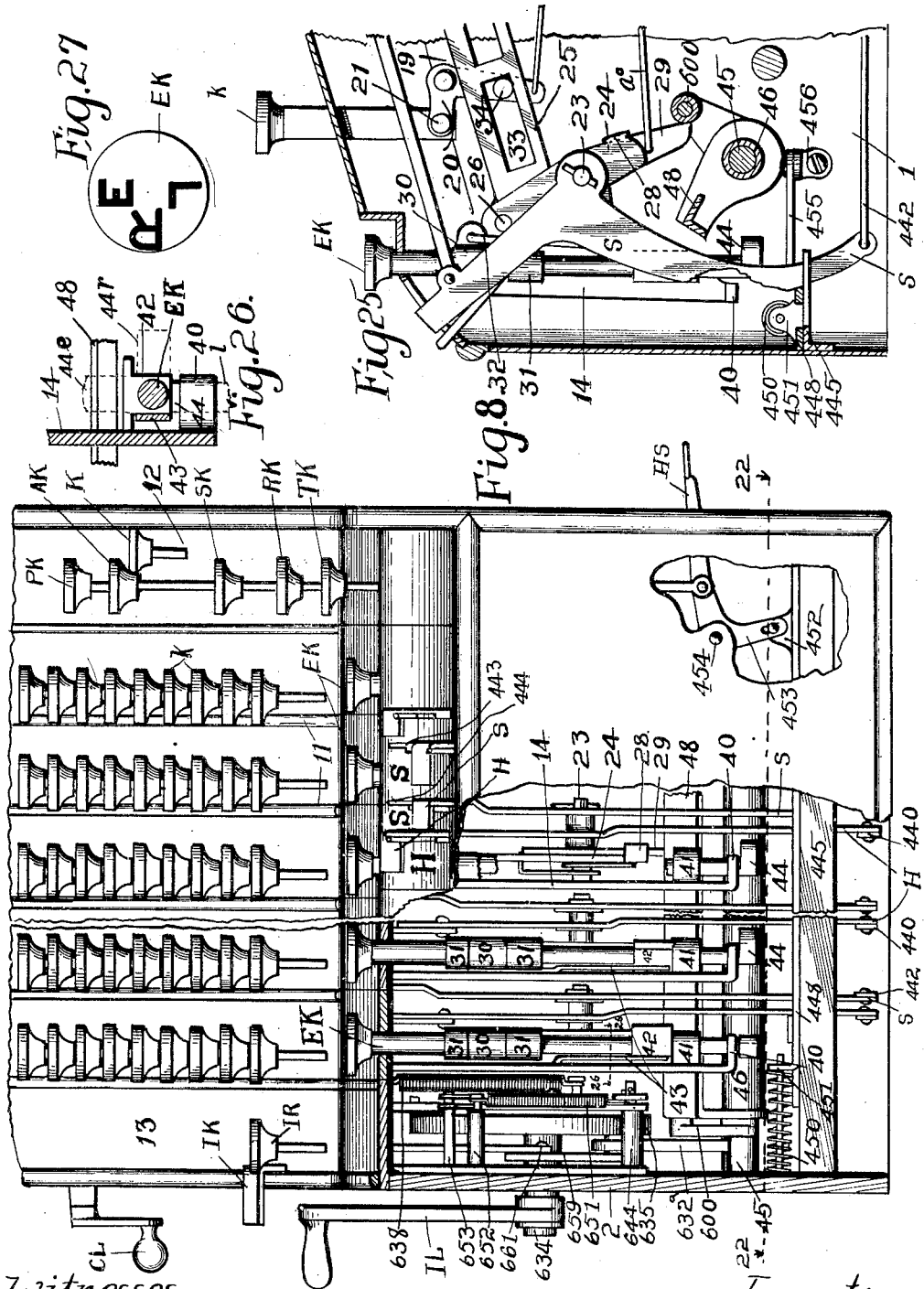

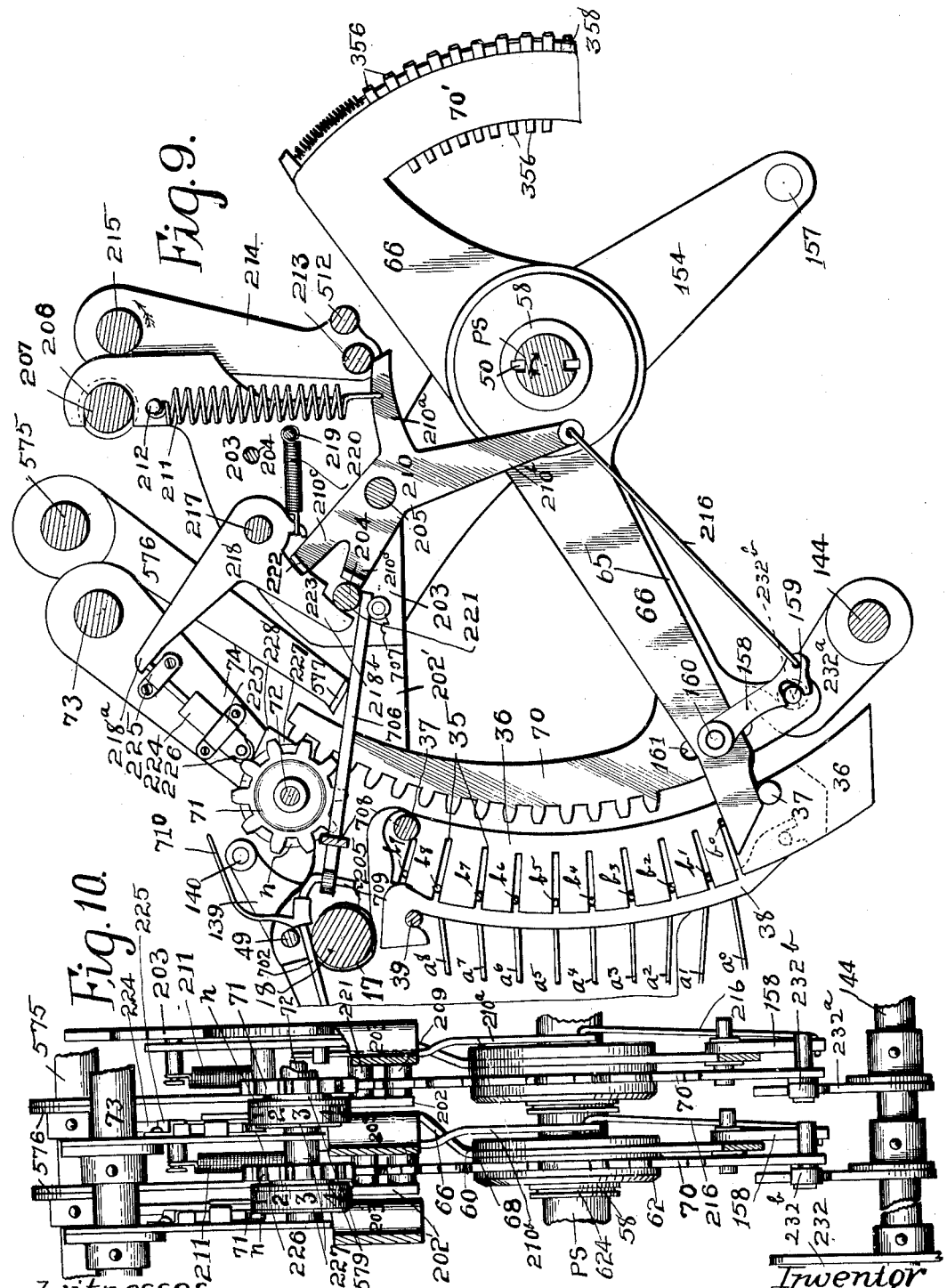

M. TEETOR.
CALCULATING MACHINE.
APPLICATION FILED MAR. 3, 1911.
1,344,191.
Patented June 22, 1920.
20 SHEETS—SHEET 10.
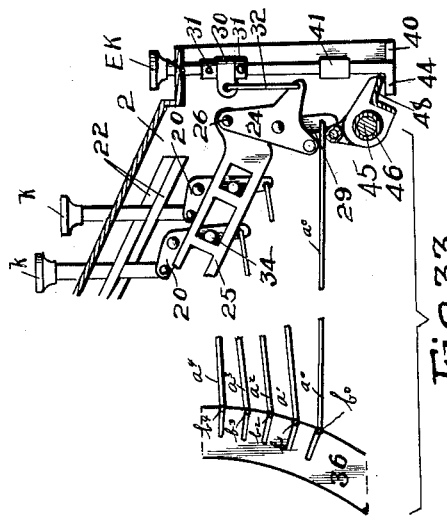
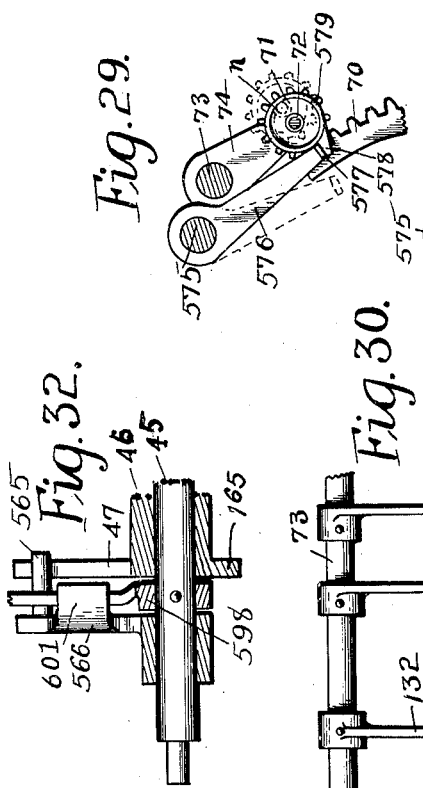
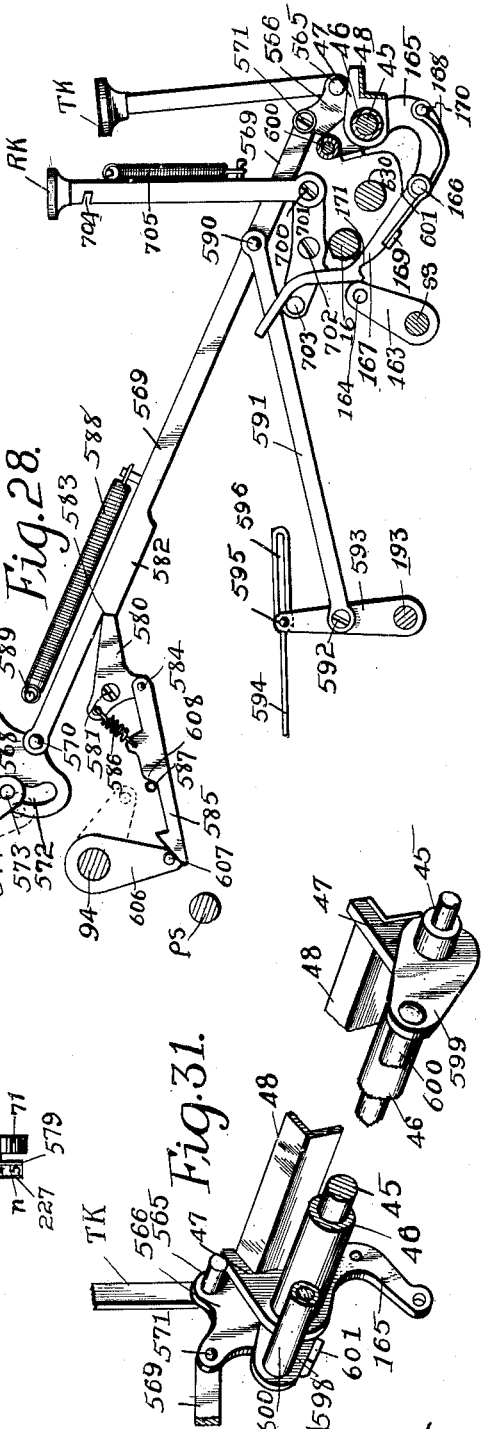
Witnesses
A. G. Hague
A. A. Thomas
Inventor
Martin Teetor.
by Wallace R. Lane Atty

M. TEETOR.
CALCULATING MACHINE.
APPLICATION FILED MAR. 3, 1911.

1,344,191.

Patented June 22, 1920.
20 SHEETS—SHEET 11.

Witnesses
A. G. Hague
A. A. Thomas

Inventor
Martin Teetor.
by William R. Lanelly

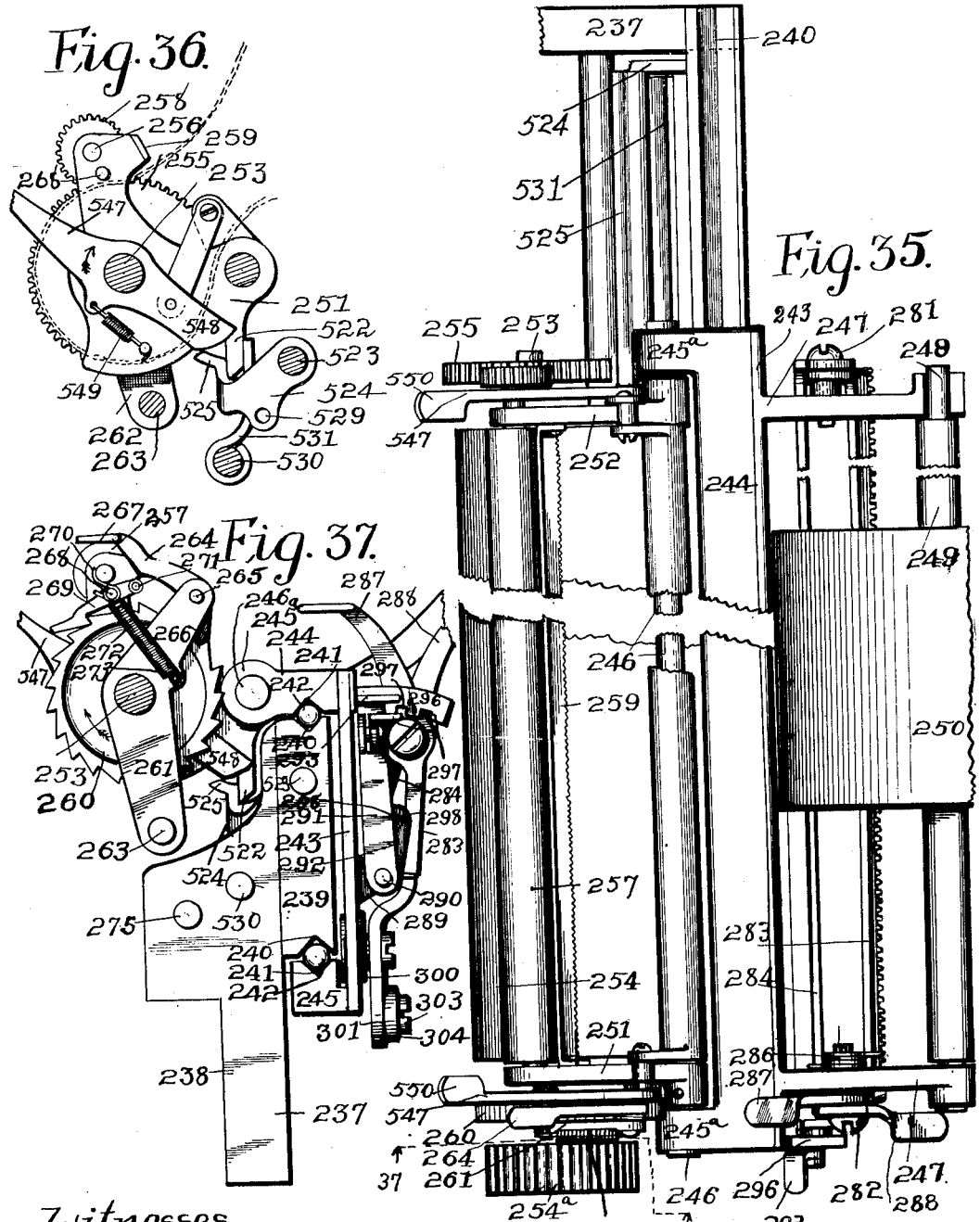

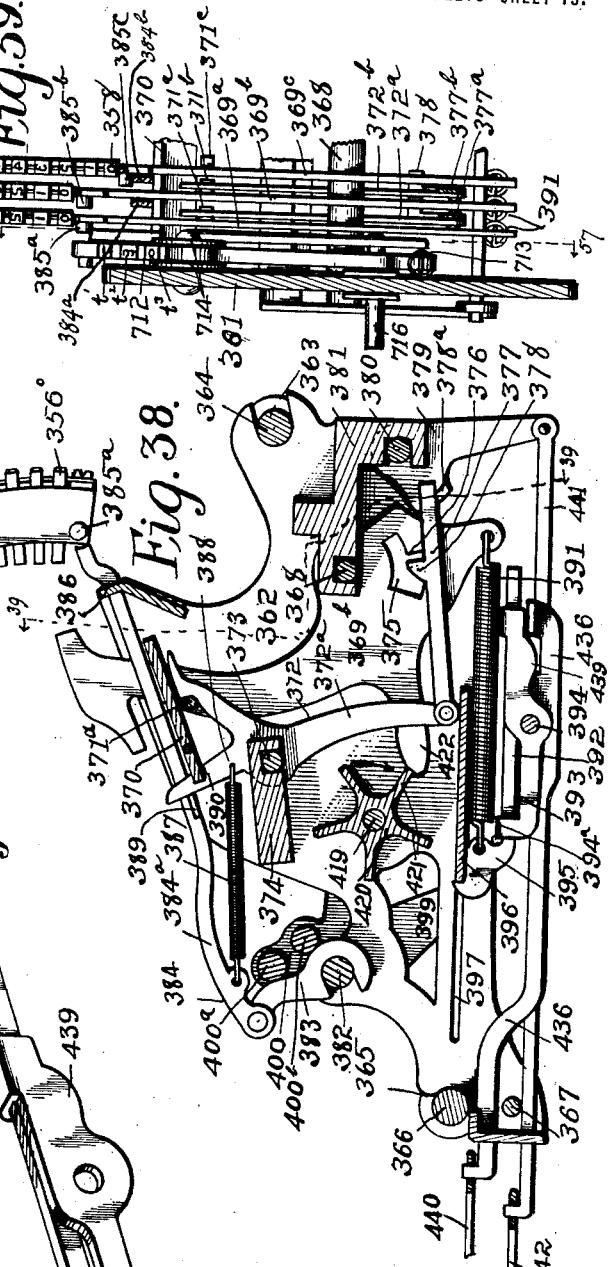

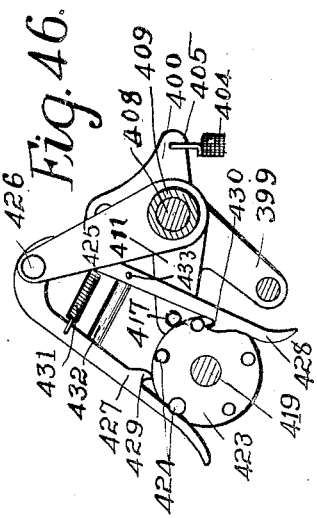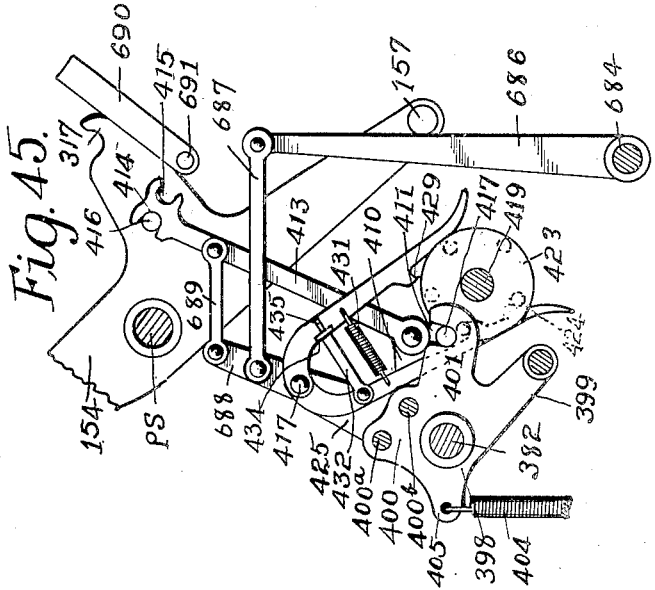

M. TEETOR.
CALCULATING MACHINE.
APPLICATION FILED MAR. 3, 1911.
1,344,191.
Patented June 22, 1920.
20 SHEETS—SHEET 15.
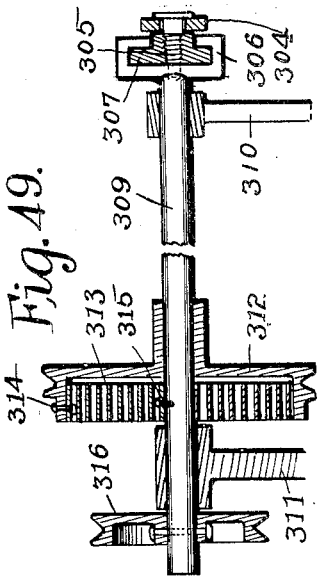
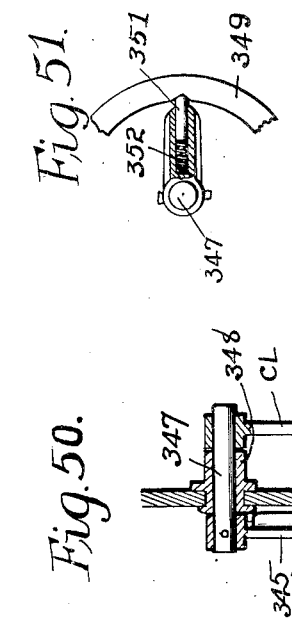
Witnesses
A. G. Hague
A. A. Thomas
Inventor
Martin Teetor
by Wallace R. Lane atty.

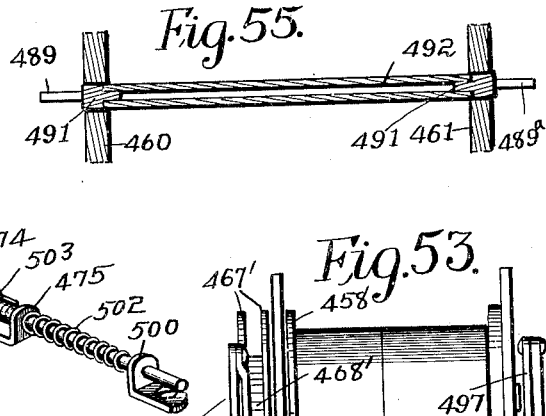
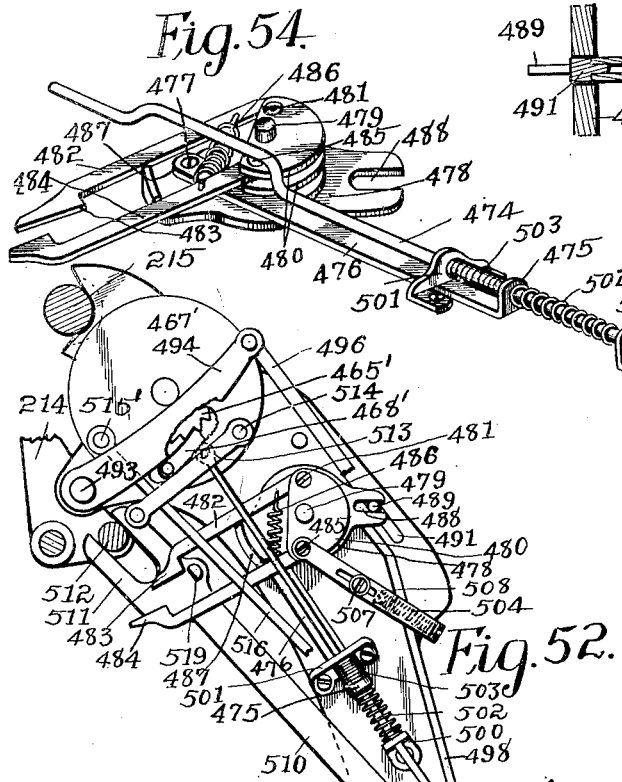
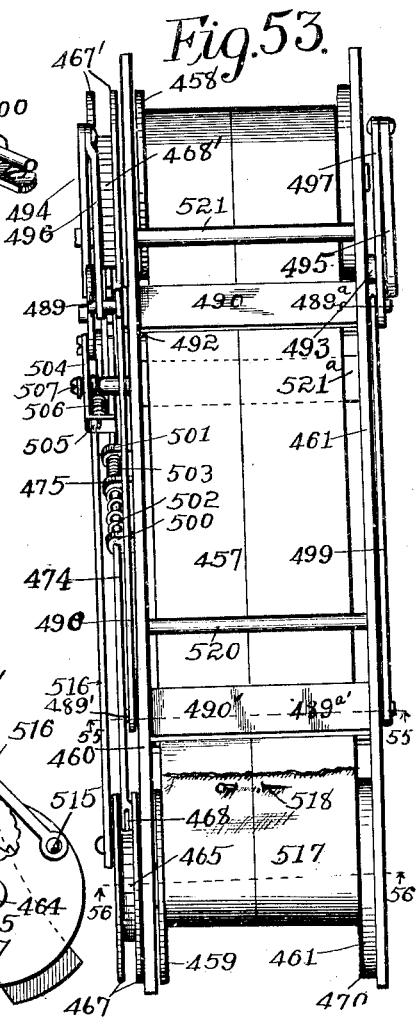
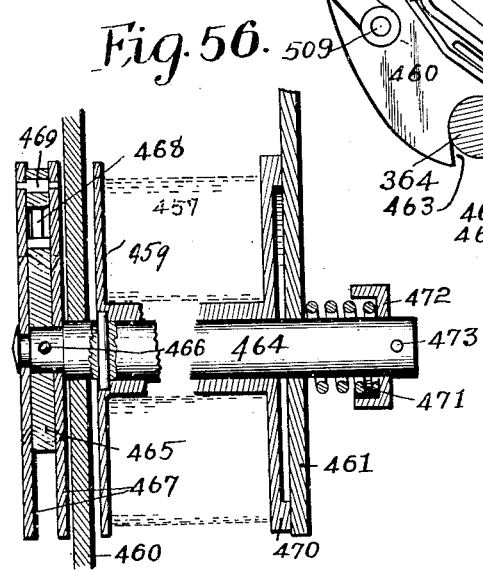

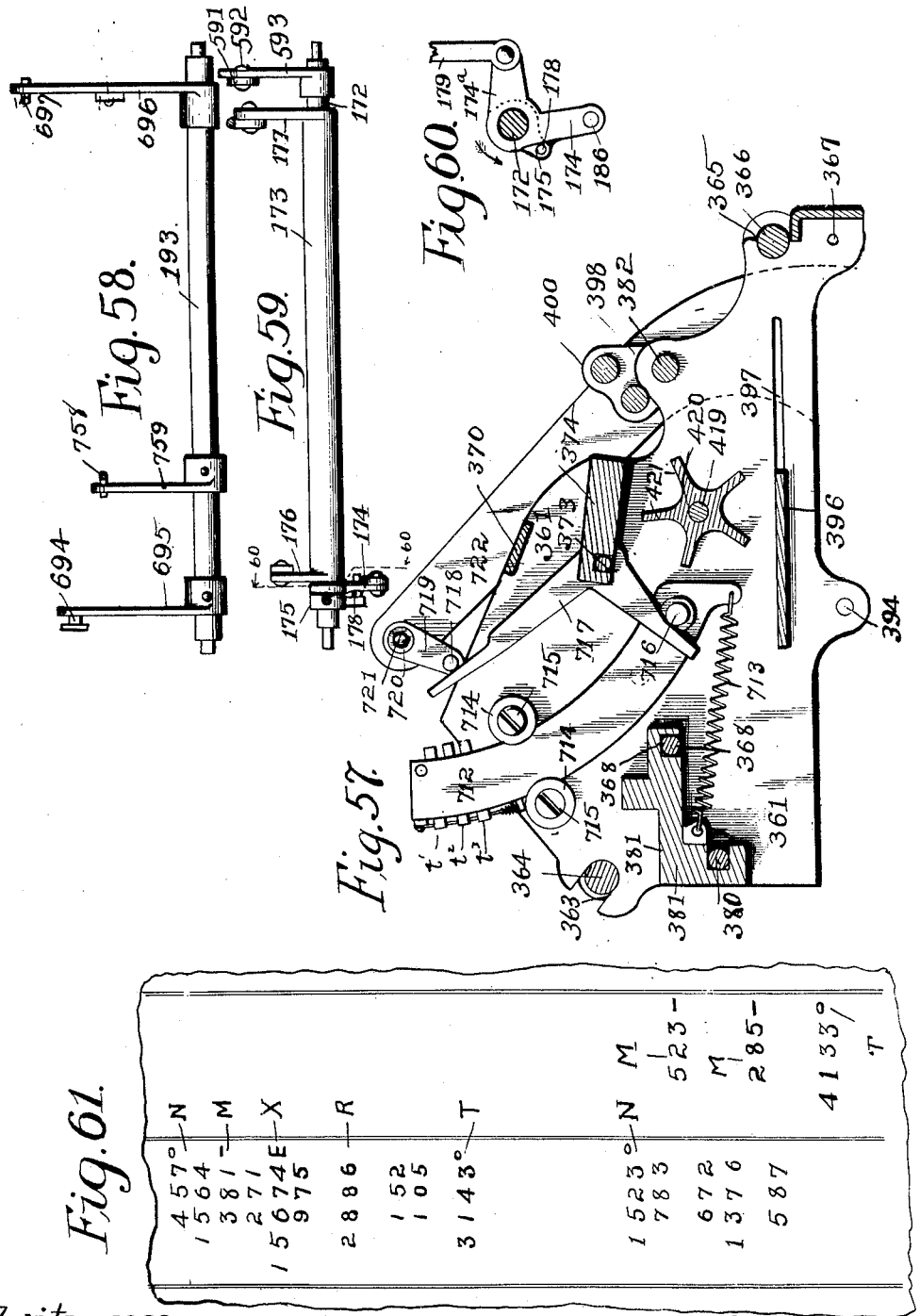

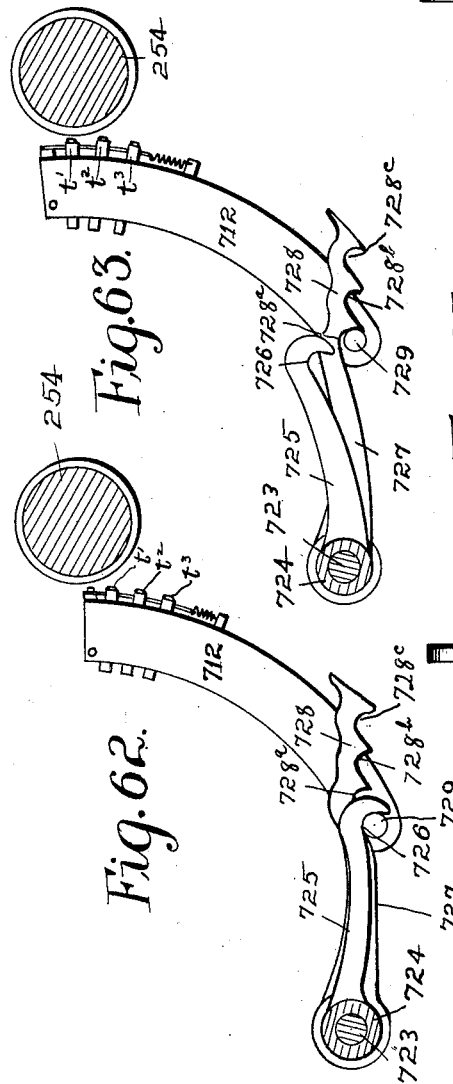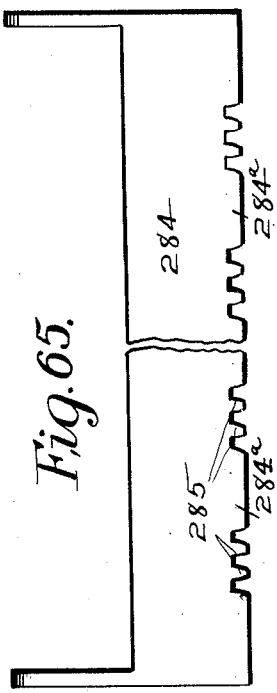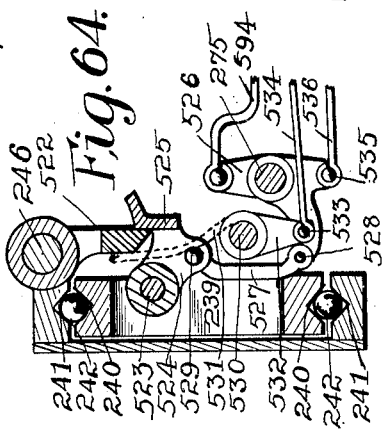

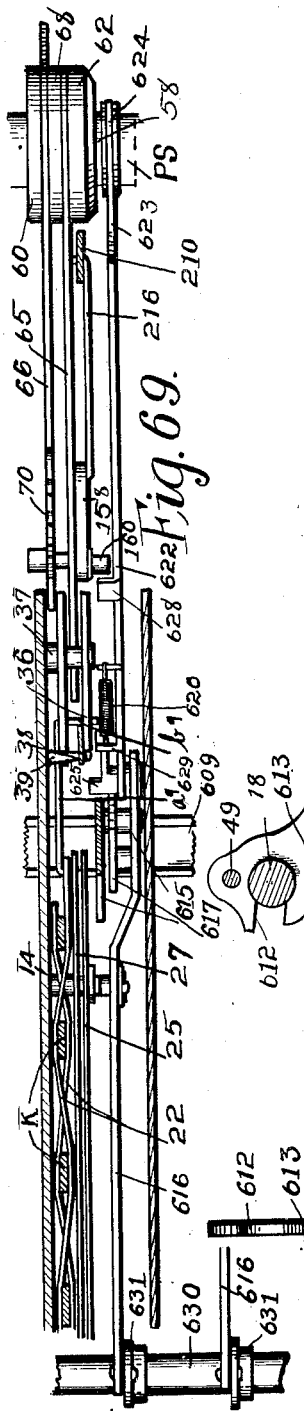
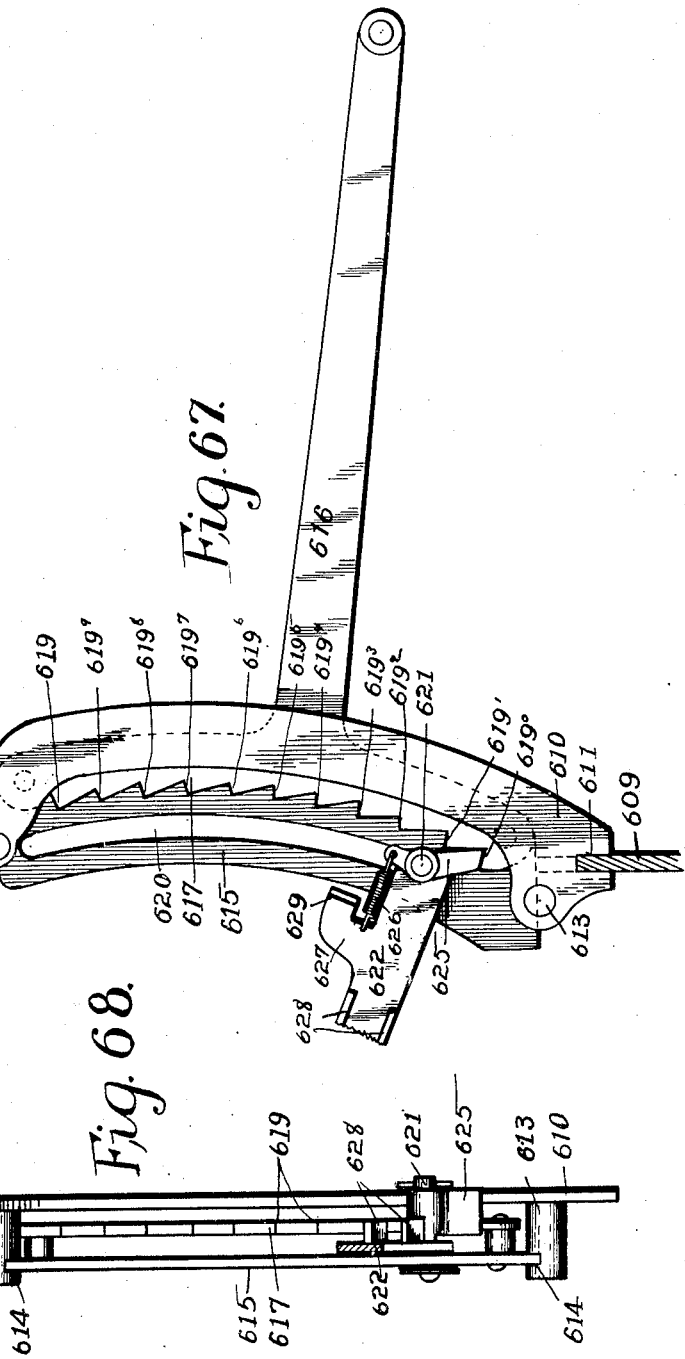

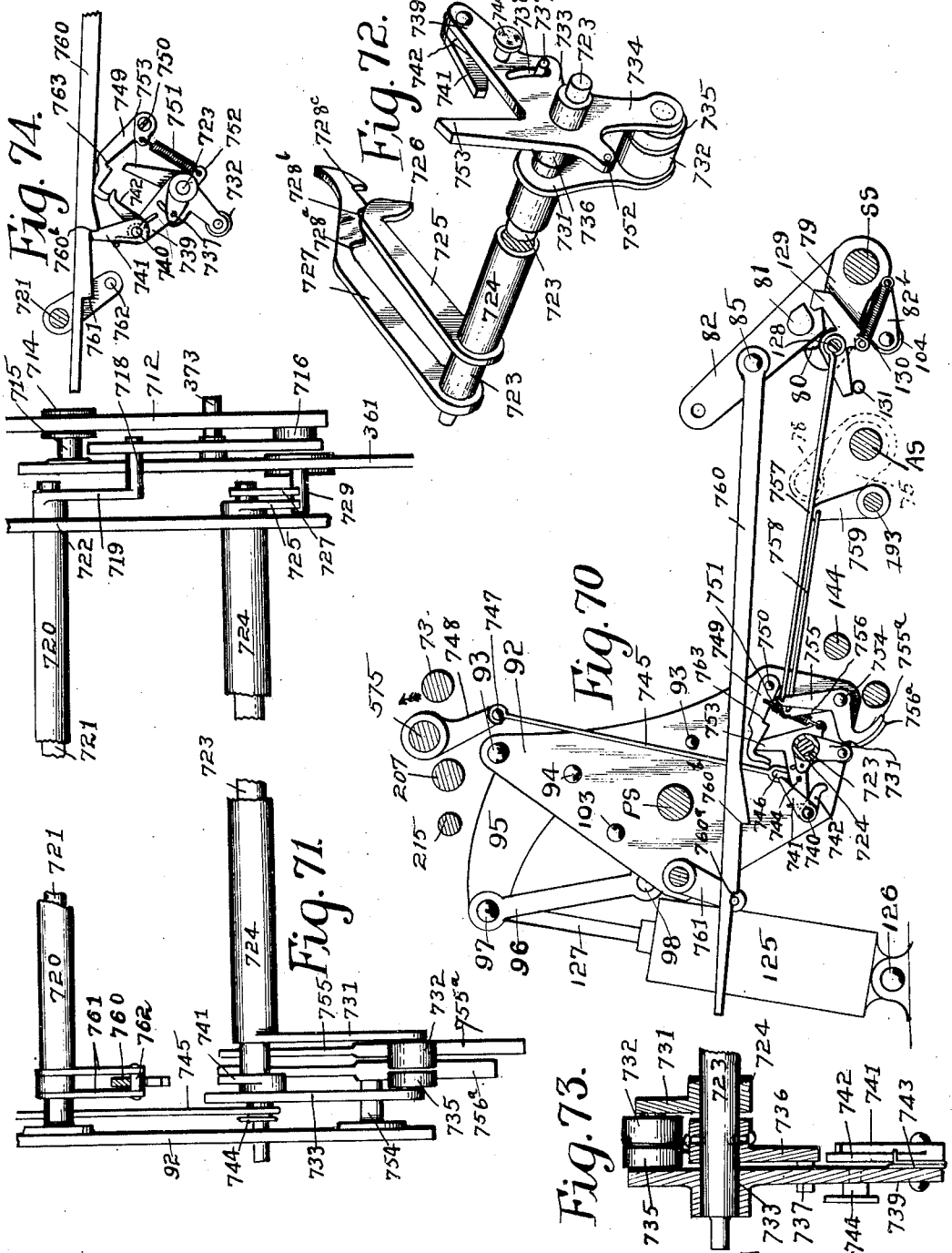

UNITED STATES PATENT OFFICE.

MARTIN TEETOR, OF DES MOINES, IOWA, ASSIGNOR TO TEETOR COMPANY, OF DES MOINES, IOWA, A CORPORATION OF IOWA.

CALCULATING-MACHINE.

1,344,191. Specification of Letters Patent. Patented June 22, 1920.

Application filed March 3, 1911. Serial No. 612,127.

*To all whom it may concern:*

Be it known that I, MARTIN TEETOR, a citizen of the United States, residing at Des Moines, County of Polk, and State of Iowa, have invented a new and useful Improvement in Calculating-Machines, of which the following is a specification.

Broadly stated, the object of my invention is to provide a calculating machine capable of performing adding and subtracting operations, these operations being indicated by calculating mechanism and recorded by printing mechanism, both of which mechanisms are controlled by a single keyboard.

My novel form of calculating machine which forms the subject-matter of this invention comprises various combinations of elements which operate to effect certain predetermined results. The many features of novelty which characterize my invention are productive of operations which machines of this class heretofore constructed are incapable of carrying out. Among the more salient features of novelty which are included in the subject-matter of this invention, I may here briefly mention the following:

1. A novel and simplified form of operative connections between the calculating wheels and the keyboard for controlling the actuation of the numeral wheels in accordance with the set-up on the keyboard, the actuation of the numeral wheels being in a positive or in a negative direction as the case may be, to add or subtract.

2. A novel and simplified form of carry-over mechanism associated with the calculating wheels.

3. A printing mechanism embodying various novel combinations of elements for actuating and controlling the printing hammers, for preventing operation of the machine when the printing platen is not in printing position, for shifting the printing ribbon after each printing operation, for controlling the position of the platen with respect to the hammers, for printing explanatory characters in connection with certain items to indicate the nature of those items—all as hereinafter fully described.

4. Connections between the keyboard and the calculating wheels whereby the total which is recorded by the printing mechanism may either be retained in the calculating wheels or cleared therefrom, as desired.

5. Mechanism for storing an item for any length of time in the machine and for subsequently entering that item into the calculating wheels, without in the least interfering with the other operations of the machine.

6. Mechanism for dividing or splitting the calculating wheels and the corresponding printing hammers into two or more independently operative sections, so that different sections of the keyboard may be assigned to as many different accounts, whereby the machine operates as though it were provided with a plurality of independent keyboards.

My invention includes such further objects, advantages and capabilities as will later more fully appear.

My invention further resides in the combination, construction, and arrangement of parts illustrated in the accompanying drawings, and while I have shown therein preferred embodiments I desire the same to be understood as illustrative only and not as limiting my invention.

In the accompanying drawings illustrating my invention,

Fig. 2 is a longitudinal sectional view taken approximately on line 2—2 of Fig. 1.

Fig. 3 is a view similar to Fig. 2, except that certain of the parts shown in Fig. 2 are omitted in order to expose certain other parts for the sake of clearness of illustration.

Fig. 4 is a longitudinal cross-sectional view taken approximately on line 4—4 of Fig. 1, certain parts of the printing mechanism being, for the sake of clearness, omitted.

Fig. 5 is a longitudinal sectional view taken approximately on line 5—5 of Fig. 1.

Fig. 6 is a view similar to Fig. 5, except that certain parts shown in Fig. 5 are omitted and other parts added to show certain operative connections hereinafter fully explained.

Fig. 7 is a transverse cross-sectional view taken approximately on line 7—7 of Fig. 1, certain of the parts being omitted to promote clearness of illustration.

Fig. 8 is a front end view of the machine, a portion of the front plate being broken away to expose certain parts within the casing.

Fig. 9 is a detached detailed view of the mechanism for actuating the numeral wheels from the main power shaft, and also showing the carry-over mechanism associated with the numeral wheels.

Fig. 10 is an edge view of Fig. 9 looking from left to right, certain of the parts at the left of Fig. 9 being omitted for the sake of clearness.

Fig. 11 is a fragmentary view in longitudinal cross section, showing the frictional driving connection between the power shaft and the arms which carry the calculating sectors as well as the printing type.

Figs. 12, 13 and 14 are cross-sectional views of Fig. 11, to show certain details of construction.

Fig. 15 is a fragmentary detailed view showing the key-controlled connections for returning the item-storing mechanism to initial position.

Fig. 16 is a fragmentary detailed view of the cam-plate and its immediately associated parts for controlling the operative position of the numeral wheels by means of the subtracting lever, the dotted lines indicating the position which the parts assume when the numeral wheels are in their operative position.

Fig. 17 is a fragmentary view into the interior of the casing showing a portion of the mechanism for storing any desired item in the machine.

Fig. 18 is a face view of the cam which is operated by the crank shown in Fig. 17, for actuating the item-storing arm to operative position.

Fig. 19 is a detailed view of certain locking dogs associated with the cam shown in Fig. 18.

Fig. 20 is a rear end view of Fig. 16 looking from right to left, certain connections not shown in Fig. 16 being shown in Fig. 20.

Fig. 21 is a fragmentary rear end view of certain parts shown in Fig. 4.

Fig. 22 is a cross-sectional detailed view taken approximately on line 22—22 of Fig. 8, showing the locking plate for the levers H and S indicated in Fig. 1.

Fig. 23 is a fragmentary plan view of the mechanism for temporarily locking the adding and the subtracting levers in actuated position and for preventing return movement of these levers before completion of the forward movement.

Fig. 24 is a rear end view, partly broken away, showing the subtracting shaft and associated actuating mechanism.

Fig. 25 is a fragmentary detailed view in side elevation, showing one of the error keys and certain of the associated connections, and also showing one of the levers which operate the mechanism for splitting or dividing the calculating mechanism and the printing mechanism, as hereinafter described.

Fig. 26 is a detailed plan view approximately on line 26—26 of Fig. 8, showing how the error key is retained in any one of its adjusted positions.

Fig. 27 is a plan view of the head of an error key.

Fig. 28 is a detached side view showing certain connections controlled by the general repeat key and the total key.

Fig. 29 is a fragmentary detailed view showing how the operation of the numeral wheels is controlled when the total is taken, this controlling of the numeral wheels being effected by the total key.

Fig. 30 is a fragmentary detailed view in plan showing how the numeral wheels are mounted on a suitable rock shaft, and also showing the actuating arm which connects the rock shaft with the slotted cam-plate shown in Fig. 16.

Fig. 31 is a detached view in perspective, partly broken away, of the common restoring bar running transversely of the machine near the front end thereof, for restoring the depressed keys.

Fig. 32 is a side view of the left end portion of the mechanism shown in Fig. 31.

Fig. 33 is a fragmentary detailed view taken on a longitudinal cross-sectional line of the machine casing, showing the common restoring bar in operative position.

Fig. 35 is a view in plan of the printing mechanism.

Fig. 36 is a sectional view taken approximately on the line 36—36 of Fig. 35.

Fig. 37 is an end view of the platen carriage and supporting frame taken approximately on line 37—37 of Fig. 35.

Fig. 38 is a detailed view in longitudinal cross-section of one of the hammer sections of the printing mechanism.

Fig. 39 is an edge view of Fig. 38 substantially on line 39—39, looking toward the left, certain of the parts shown in Fig. 38 being omitted and certain additional parts shown for the sake of clearness.

Fig. 40 is a fragmentary detailed view of the upper portion of the printing hammer.

Fig. 41 is a fragmentary detailed view of a slide-bar shown in Fig. 38 for throwing the associated hammer out of operation.

Fig. 42 is a detailed view in perspective showing the parts actuated by the bar shown in Fig. 41 for throwing the hammer out of operation.

Fig. 43 is a view in perspective of a bar which forms a part of the mechanism for transmitting motion from one hammer to the other to permit the printing of zeros to the right of a significant figure.

Fig. 44 is a face view of a portion of the type bar for printing certain explanatory characters in connection with the ordinary numerical items.

Fig. 45 is a fragmentary detailed view of the mechanism for releasing the printing hammers for actuation.

Fig. 46 is a reverse view of certain parts shown in Fig. 45.

Fig. 47 is a plan view of the mechanism shown in Fig. 45.

Fig. 48 is a detached view of the connections whereby the platen carriage is shifted when the adding or subtracting lever is operated.

Fig. 49 is a cross-sectional view of the lower right-hand portion of the mechanism shown in Fig. 48.

Fig. 50 is a detached detailed view showing the connections whereby the operation of the carriage shifting mechanism shown in Fig. 48 is adjusted by means of a crank secured to the side of the casing.

Fig. 51 is a partly cross-sectional view of the crank-controlled arm shown in Figs. 48 and 50.

Fig. 52 is a detached side view of the ribbon shifting mechanism.

Fig. 53 is a face view of the mechanism shown in Fig. 52 looking toward the left of that figure.

Fig. 54 is a perspective view of a portion of the mechanism shown in Fig. 52.

Fig. 55 is a transverse cross-sectional view taken approximately on line 55—55 of Fig. 53, showing the slotted rod through which the printing ribbon passes.

Fig. 56 is a transverse cross-sectional view taken approximately on line 56—56 of Fig. 53, and showing one of the ribbon spools.

Fig. 57 is a sectional view taken approximately on line 57—57 of Fig. 39 and showing the mechanism for operating the printing segment which carries the explanatory characters shown in Fig. 44.

Fig. 58 is a detached view showing the shaft operated by the printing key, and the arms secured to said shaft for actuating other connected parts.

Fig. 59 is a detached view of the shaft operated by the total key and the sleeve mounted on said shaft to be operated by the adding and subtracting keys.

Fig. 60 is a view taken on line 60—60 of Fig. 59.

Fig. 61 is a face view of a portion of a sheet taken from the machine showing items printed during the various operations of the machine, as hereinafter explained.

Fig. 62 is a fragmentary detailed view showing the inoperative or normal position of the printing sector which carries the explanatory characters shown in Fig. 44.

Fig. 63 is a view similar to Fig. 62 showing the printing sector in the first operative position, which, in the particular instance illustrated, is the position in which a minus sign (—) is printed opposite an item which is to be subtracted.

Fig. 64 is a cross-sectional detailed view of the locking mechanism for the platen, this view also showing a portion of the connections for controlling this locking mechanism.

Fig. 65 is a detached face view of one of the rack-bars mounted on the platen frame and designed to engage the platen shifting carriage.

Fig. 66 is a plan view of the two locking plates shown in Fig. 64 for locking the platen frame against movement out of printing position.

Fig. 67 is a side view of a portion of the item-storing mechanism.

Fig. 68 is an end view of Fig. 67 looking from left to right.

Fig. 69 is a cross-sectional view taken approximately on the broken line 69—69 of Fig. 3, certain of the parts being for the sake of clearness omitted, to show the item-storing mechanism.

Fig. 70 is a detached side view of a portion of the mechanism for operating the printing sector which carries the explanatory characters shown in Fig. 44.

Fig. 71 is substantially a left end view of Fig. 70.

Figs. 72, 73 and 74 are detailed views of various portions of Figs. 70 and 71.

Figure 1:
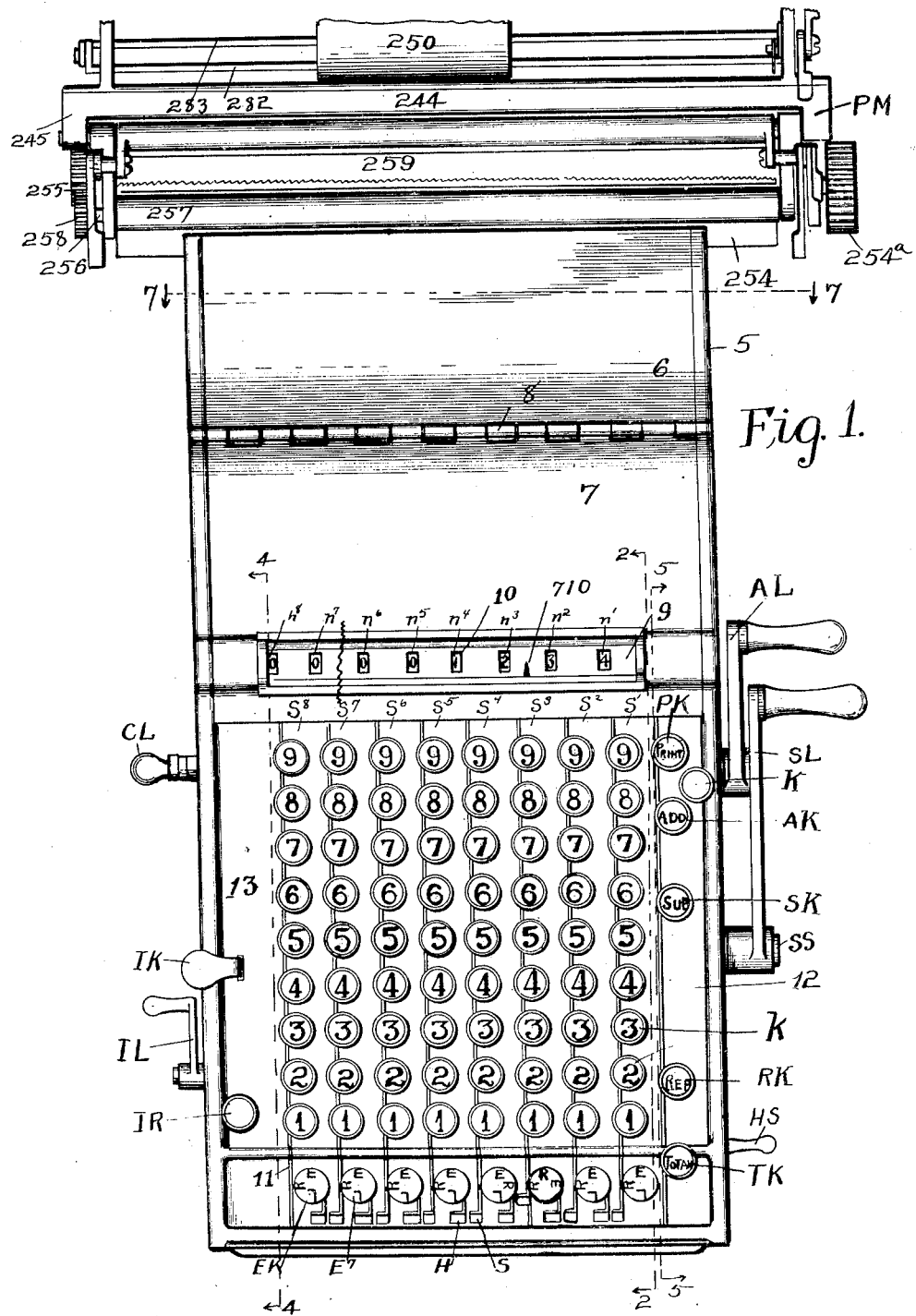
Figure 1 represents a plan view of a machine constructed in accordance with my invention.

Before attempting a detailed description of the construction and operation of the various mechanisms and connections which go to make up my new machine, I will set out a general description of the different operations capable of being carried out by the machine of this invention. With a general idea of the capabilities of my new form of adding machine, it will perhaps be easier to follow the subsequent detailed description of the figures in the drawings. For this preliminary and general description it will be necessary to refer only to the plan view shown in Fig. 1.

*General operation*, (Fig. 1).

It will be observed that the keyboard portion of the casing in which most of the operative parts are inclosed, is divided into longitudinal sections indicated by $S^1$ to $S^8$. With each section is associated an order or row of numeral keys $k$. There being eight rows of keys shown in the particular embodiment illustrated, the number of keyboard sections also is eight. These sections are removable each independently of the others. From each section extends a partition downwardly into the casing and on this partition are mounted various parts connected with the associated row of keys When, therefore, any particular section is removed from the keyboard a portion of the interior mechanism of the machine is also removed together with the corresponding order of keys. In this way it is possible to readily remove certain of the interior mechanism for inspection or repair, without disturbing other parts or connections. When it is desired to enter a certain number in the machine in a positive or adding direction, the number is first set up on the keyboard by depressing the particular key in each of the orders required by the number, whereupon the adding lever A L is drawn forwardly as far as its movement is permitted. The lever is then released, or rather it may be released, for it becomes locked in its actuated position until the parts which have been set in operation by the forward movement of the lever have caused rotation of the numeral wheels in accordance with the set-up on the keyboard. The numeral wheels are in Fig. 1 indicated by $n^1$ to $n^8$ inclusive, there being a numeral wheel for each order or row of numeral keys. The connections between each order of keys and the associated numeral wheel are such that the mechanism for operating that numeral wheel is controlled by the particular key depressed in that row. Consequently the number set up on the keyboard will appear on the numeral wheels through the sight openings 10. When the numeral wheels have thus been properly actuated, the adding lever is automatically returned to its initial or normal position. The forward movement of the adding lever A L causes not only the operation of the numeral wheels, but also the operation of the printing mechanism to print the number previously set up on the keyboard. The printing mechanism is attached to the rear of the machine and is in Fig. 1 indicated as a whole by the reference character P M. The printing mechanism is normally always in operative position and the mere operation of the adding lever is sufficient to cause the set-up on the keyboard to be entered in the numeral wheels as well as printed on a sheet of paper on the printing platen. If a second item is to be entered in the machine in a positive direction, the manipulation of the keyboard and the adding lever A L is repeated as just described, whereupon this second item will be added to the previous item in the numeral wheels and will be printed under the previous item on the paper in the printing mechanism. In this way any number of positive items may be entered in the machine. The numeral wheels show the sum of these items, while the printing mechanism prints these items one below the other in proper alinement.

When it is desired to subtract a number, the subtracting lever S L is operated instead of the adding lever, after the number to be subtracted has been set up on the keyboard. The effect of operating the subtracting lever S L is to cause operation of the numeral wheels in a negative or subtracting direction. At the same time the platen frame of the printing mechanism is shifted to bring the subtracting column into printing position. In other words, whereas the numbers to be added are printed in one column which may be called the adding column, the numbers to be subtracted are ordinarily printed in an adjacent column, which may be referred to as a subtracting column. By adjusting the crank C L shown at the left of the casing in Fig. 1, the negative items may be printed in the same column with positive items. In order to definitely identify negative items, no matter whether they are printed in a column by themselves or printed in the same column with the positive items, I have provided special means for automatically printing a suitable character or mark in connection with each negative entry to indicate that the particular entry is of a negative character and is to be subtracted. This identifying character is printed automatically when a negative entry is made, no other manipulation of the machine on the part of the attendant being necessary than the operation of the subtracting lever S L after the number has been set up on the keyboard. Since the numeral wheels are actuated in a positive direction when the adding lever A L is operated, and in a negative or reverse direction when the subtracting lever is operated, it is obvious that the indication of the numeral wheels at any time represents the arithmetical sum of the numbers entered into the machine.

To print the total (or "take the total," as it is usually called), the operator simply depresses the total key T K and then pulls the subtracting lever forward, no other manipulations than these being necessary on the part of the operator. The depression of the total key so controls the movement of the type bars of the printing mechanism that the number thus placed in printing position corresponds with the number which represents the total in the numeral wheels. When the total is in this way taken by the operation of the subtracting lever S L, the numeral wheels are returned to zero position and the total is said to be cleared out of the machine. To retain the total in the machine, the adding lever A L is used instead of the subtracting lever, whereupon the numeral wheels are first returned to zero position and then back to the position in which they were just before the total was taken. This back and forth actuation of the numeral wheels to retain the total when the sum is printed, is automatically accomplished by the mere pulling forward of the adding lever, after the total key T K has been depressed.

Instead of using the subtracting lever S L to clear the machine when the total is taken, the operator may depress the subtracting key S K and use the adding lever A L to accomplish precisely the same result. The subtracting key S K is so connected with the adding key A K, that when one of the keys is in depressed position the other is in raised position. When, therefore, the subtracting key S K is depressed the adding key A K is raised. The normal position of these two interconnected keys may be said to be the one in which the subtracting key is raised and the adding key is depressed, because it is in this position of the keys that the adding lever performs its normal function of causing the numeral wheels to operate in a positive or adding direction. This normal or positive function of the adding lever is converted into a negative or subtracting function by the depression of the subtracting key S K. It is, of course, obvious that the adding lever may by this means be used for subtracting purposes at any time during the operation of the machine and not merely at the time of adding the total. By depressing the adding key A K the associated parts are restored to their normal position and the adding lever performs only a positive or adding operation.

The depression of the total key T K in taking the total, automatically locks the printing platen in printing position and also locks all of the numeral keys on the keyboard against depression. Furthermore, there is a connection between the printing mechanism and the operating levers A L and S L, whereby the machine is locked against operation when the platen is not in printing position. It will be seen that these provisions positively prevent any tampering with the total by the operator. No fictitious total can be set up on the keyboard, nor can the machine be cleared unless the amount in the numeral wheels is permanently recorded by the printing mechanism.

Also no item can be entered in the machine without causing that item to be printed. However, to meet the exigencies of a case in which it might for some reason or other be desired to operate the calculating mechanism of the machine without the printing mechanism, I have provided a key K which, when depressed, throws the locking mechanism for the platen out of operation and allows the actuation of the numeral wheels independently of the position of the planten—whether the latter be in printing position or tilted back out of this position, or even removed entirely from the machine. This special key K furthermore throws the printing hammers into inoperative position by breaking the connection between the hammers and the power shaft, so that the mere depression of the key K virtually removes the printing mechanism from the field of operation and permits the machine to be used like a register having only indicating wheels. Such use of the machine may in some instances be found desirable. Ordinarily, however, the automatic locking connections between the printing mechanism and the operating levers A L and S L will remain in operative condition so as to render it impossible for the operator to use the machine without making a permanent record of the items entered and the totals taken. For this reason, the special key K is made removable and it will ordinarily be left out of the machine in care of the proper officer.

In tabulating items it becomes frequently necessary to associate with certain items some form of explanatory memoranda for the sake of convenience or identification. For instance, it may sometimes be necessary to put down the number of a car, as in a bill of lading. Now this number, although entered by the printing mechanism on the record sheet, should not be entered in the calculating wheels because it is not an item which is either to be subtracted or added. In order to cause the printing of such an explanatory item without affecting the calculating wheels, I have provided a certain mechanism which is controlled by the printing key P K. The actuation of this key prevents the numeral wheels from being thrown into operation when the adding or subtracting lever is operated to print the explanatory number. I have also provided means for indicating on the record sheet that a certain number has been entered merely as an explanatory or identifying number and that it is to be eliminated in the process of addition and subtraction. When the printing key P K is depressed the special printing device hereinbefore referred to is automatically set to a position in which it will print a mark adjacent to the explanatory number to indicate to the inspector of the record sheet that the number thus marked is to be neither added or subtracted. In the particular embodiment illustrated in the drawings the printing key P K performs another function besides the one specified. I have made the printing key removable from the keyboard and when it is removed the machine is automatically locked against operation. When, therefore, the operator wants to lock his machine so as to prevent unauthorized or mischievous tampering therewith by others—as when he leaves the machine during the noon hour or at the close of the day's work—all he has to do is to pull out the printing key P K, which he might either be permitted to retain in his possession or else deliver unto the custody of the proper person.

It some times happens that the same item is to be entered several times in succession in the machine. To obviate the necessity of successively setting up the same number, I have provided a general repeating key R K, which, when depressed, renders the key-restoring means inoperative, whereby the set-up is retained even after the operating lever and the connected parts have returned to normal position. The sum set up is retained on the keyboard as long as the repeating key R K remains depressed.

With each order or row of numeral keys there is associated a rotatably adjustable error key E K bearing thereon suitable characters to indicate the adjusted position of the key. For the sake of illustration, I have in the drawings shown these characters as consisting of the letters "E," "R" and "L." Each error key has independent control of the associated row of numeral keys. When an error key is in the position where the letter "E" is toward the rear of the machine, as shown in Fig. 1, the depressed numeral key of the associated row may be restored to original position—as, for instance, when the wrong key has been depressed and it is desired to correct the error. In this way, if the wrong key has been struck, that key may be restored without affecting the other depressed keys. When an error key is turned so that the letter "R" points rearwardly, the depressed key of the associated row of numeral keys will not be affected by the restoring mechanism, but will remain depressed as long as the error key remains in that adjusted position. It will thus be seen that in the "R" position (as this second position may be called), an error key operates as a repeating key individual to the associated row of numeral keys. When an error key is turned so that the letter "L" points directly to the rear of the machine, the error key is locked in depressed position, and thereby prevents operation of any key in the row controlled by that particular error key.

It will be observed in Fig. 1 that at the front of the machine there is associated with each keyboard section a pair of keys or levers H and S. When the lever H of a particular section is pushed down the corresponding hammer of the printing mechanism is automatically thrown out of operation, and no printing will be done by that hammer. When the lever S of a section is pushed down the printing hammers are split or divided at a certain point and operate in two independent sections. For instance, if the lever S of the sixth or hundred-thousand section $s^6$ be pushed down, the hammers corresponding to the keyboard sections $s^7$ and $s^8$ will, as it were, be isolated from the other hammers and perform their printing operations independently of those other hammers. Ordinarily, when an entry has the last significant figure in a higher order, (as for instance the number 34,000) the hammers automatically print the zeros to the right of the figure "4". However, when the hammers are split or divided at a certain point, the printing of zeros does not take place across the point of division. For example, if the hammers corresponding to the keyboard sections $s^7$ and $s^8$ are split from the other hammers, and an entry is made having the lowest significant figure in the seventh or millions row, no zeros will be printed to the right of that figure, although the lower order hammers are free to operate in accordance with the set-up on the lower-order keyboard sections. The operation of any particular lever S not only splits or divides the printing hammers, but it simultaneously divides the carry-over mechanism of the numeral wheels at a corresponding point. It will thus be seen that the purpose of the levers S, which may properly be called split levers, is to split the machine both in its printing mechanism and calculating mechanism, into two or more independently operative sections. The advantages of this will be more fully discussed hereinafter. The hammer-killing levers H and the splitting levers S are normally locked against operation, and it is necessary that the finger piece H S be depressed to release the levers and permit operation thereof.

It may sometimes be found desirable or necessary to clear the machine and yet it is desired to retain the number cleared for subsequent calculations. To this end I have provided what I call an item-storing mechanism which operates quite independently of the calculating wheels to store any entry which may be indicated by the calculating wheels. This item-storing mechanism is set in operation by means of the crank or lever I L projecting from one side of the casing, as shown in Fig. 1. To store an item or entry, the operator pulls the crank toward him as far as it will go, whereupon he may release it. Then having depressed the total button he operates either the adding lever A L or the subtracting lever S L, according as to whether the entry in the numeral wheels is to be retained or cleared. This causes the item-storing mechanism to operate in accordance with the entry in the numeral wheels and virtually stores that item. The machine may then be operated in the usual way to add or subtract any given items, without being in the least interfered with by the item-storing mechanism. When it is subsequently desired to enter the stored item into the numeral wheels, the operator depresses the key or lever I K and turns the crank I L one complete revolution in a direction reverse to that in which it was previously operated. If the stored item is to be entered in a positive direction, the adding lever is then operated. If the stored item is to be entered negatively, the subtracting lever is operated. By depressing the key I R the operator restores the item-storing mechanism to normal position.

I have under this heading endeavored to briefly set out the various operations which may be performed by my new form of adding machine, so as to give a general idea of the main characteristics that distinguish my invention. Many other features of novelty in addition to those which have been mentioned in this preliminary description, will become apparent from the detailed description of the structural embodiment of my invention, as illustrated in the drawings. To render the detailed description of the drawings as clear as possible, so that the same may be readily followed without confusion, I have thought it best to divide the description into sections or chapters, each of which takes up in detail the mechanism for accomplishing a certain operation or set of operations.

*Key-controlled mechanism for operation of numeral wheels*, (Figs. 1, 2, 4, 5, 8 to 14 inclusive, 16, 23, 24 and 25.)

The casing of the machine comprises a pair of side plates 1 and 2 and bottom piece 3, a front plate 4, and a top or cover indicated as a whole in Fig. 1 by 5. The rear section 6 of the cover is pivoted to the front section 7 at 8. The cover sections are shaped to fit over the side pieces and are firmly held in place by any suitable means. On the top section 7 is provided a plate 9 having sight-openings 10 opposite the calculating wheels so that the indications of the latter may be observed through the openings. The front portion of the cover forms part of the keyboard proper and is divided into a plurality of longitudinal sections, there being as many sections as there are orders or rows of numeral keys. As already explained, in connection with Fig. 1, in the particular embodiment illustrated in the drawings there are eight rows of numeral keys $k$ and consequently there are eight keyboard sections indicated by $s^1$ to $s^8$ inclusive. These section pieces are each preferably ribbed or beaded at one edge, as indicated at 11 in Fig. 8, the sections overlapping at that point so as to be firmly held together and at the same time present a neat appearance. However, this overlapping feature may be omitted, especially if it is desired that each section shall be removable without disturbing any of the other sections. As shown in Fig. 8 the sections are removable in the order from right to left. The two end sections 12 and 13 need not be removable and will ordinarily be integral with the cover. Through the end section 12 project the special keys P K, K, A K, S K, R K, and T K, which have briefly been referred to in the preceding chapter and will again be referred to hereinafter, in connection with other mechanisms. Through the other end section 13 extend the keys I K and I R, which have to do with the item-storing mechanism to be subsequently explained in detail. Within the front portion of the casing underneath the keyboard sections is a series of supporting plates or partitions 14, there being one plate for each order of keys, as shown in Figs. 2, 3 and 8. These plates are each provided with a lower hook portion 15 adapted to engage the fixed transverse shaft 16 and with an upper hook portion 17 for engaging the fixed transverse shaft 18, as shown in Fig. 3. The shafts 16 and 18 are rigidly mounted in the sides of the casing and constitute the supports for the plates 14. It will be seen that the hooked engagement between the plates 14 and the shafts 16 and 18 permits the plates to be readily removed from the shafts by simply sliding the plates a little forwardly. A bar 19 is secured to each of the plates 14 for pivotally supporting the bell-cranks 20. There are nine of these bell-cranks supported by each plate, and to the upper arm of each bell-crank is pivoted a numeral key $k$, the point of pivot being indicated at 21, as shown in Figs. 2 and 3. Each row of numeral keys comprises nine keys representative of the numerals 1 to 9 inclusive, the front key representing the numeral 1, the next key the numeral 2, and so on in succession. With each row of keys is associated a pair of leaf-springs 22 which are wound in and out between the key stems, as shown in Figs. 2, 3 and 69. These springs have sufficient frictional engagement with the keys to retain the latter in depressed or raised position and yet offer but little resistance to the movement of the keys. Each plate or partition 14 carries a stud 23 to which is pivoted the double bell-crank 24. To the upper arm of this double bell-crank is pivoted the combined locking and restoring plate 25, the point of connection being shown at 26. The other end of the plate 25 is pivotally connected to the partition 14 by means of the link 26ª. A spacing bar 27 is carried by the partition between the bell-cranks 20 and the restoring plate 25, as shown in Fig. 2. The lower arm of the double bell-crank 24 is provided with an inwardly-extending stud 28 adapted to engage the arm 29 which is rotatably mounted upon the stud 23, as shown in Figs. 2 and 25. With each row of keys is associated an error key E K which projects through the cover of the casing at the front of the machine. As indicated in Figs. 2, 3 and 8, each error key is provided with a rotatable sleeve 30 held in place by a pair of collars 31 fixed to the key stem. A link 32 connects the sleeve 30 with the forwardly-extending arm of the double bell-crank 24. As seen from Figs. 2 and 25, the restoring plate 25 is provided with openings 33 substantially rectangular in form, there being an opening for each key. The lower arms of the bell-cranks 20 carry lugs 34 which extend toward the associated plate 25 and are adapted to engage in the slots or openings 33. By reference to Fig. 2, it will be seen that when the keys are in their normal position the lugs 34 rest at the rear ends of the slots 33. When, therefore, any key in a row is depressed the bell-crank connected to the depressed key will slide the plate 25 rearwardly. To the lower end of each bell-crank 20 is pivotally connected a link extending toward the rear of the machine, these links being indicated by the reference characters $a^1$ to $a^9$, inclusive. The numerical suffixes of these reference characters are intended to identify the key to which any particular link is connected. Thus the link $a^1$ is connected to the "1" key; the link $a^6$ is connected to the "6" key, etc. These key links are at their rear ends provided with lateral setting pins $b^1$ to $b^9$, inclusive, respectively. A plan view illustrating the lateral relation of the pins $b^1$—$b^9$ is represented in Fig. 69, which shows the pin $b^9$ projecting laterally from the link $a^9$. The pins $b^1$—$b^9$ normally rest in the open ends of the radial slots 35 provided in the sector 36 which is secured to the partition 14 by means of studs or rivets 37, as shown in Figs. 2 and 9, the sector being spaced from the partition, as shown in Fig. 69. With each sector 36 is associated a retaining plate 38 for preventing the pins $b^1$—$b^9$ from slipping out of the slots 35. The retaining plate 38 is mounted on the partition 14 by means of the studs 39 which engage the hook portions at the upper and lower ends of the retaining plate, as best shown in Fig. 9. The retaining plate is situated in the space between the partition and the slotted sector 36, as shown in Fig. 69. The rear edge of the retaining plate is curved in the arc of a circle concentric with the curvature of the sector 36 and so arranged with respect to the slots that it prevents the pins from passing out of the slots. However, the retaining plate 38 does not interfere with the rearward movement of the pins. By reference to Figs. 2 and 25 it will be observed that the arm 29 has pivotally connected thereto the link $a^0$. The rear end of this link terminates in a lateral pin $b^0$ which normally rests in the base of the slot $35^0$ in the sector 36. The link $a^0$ will hereinafter be referred to as the zero link and the pin $b^0$ will henceforth be called the zero pin, for the sake of brevity and clearness. From the above description it will be apparent that when any numeral key of a row is depressed the corresponding setting pin is moved rearwardly toward the base of the slot 35 in which it works. At the same time the lower arm of the double bell-crank 24 is rocked forwardly and the lateral lug 28 on this arm draws the arm 29 forwardly, thereby moving the zero pin forwardly to the open end of the slot $35^0$. The purpose of the withdrawal of the zero pin when a numeral key is actuated will be presently explained.

Each partition 14 is at its lower front end provided with a lateral projection 40, as shown in Figs. 8 and 25. The lower portion of the stem of each error key E K works in the bearing lug 41 carried by the partition 14. Above the bearing lug 41 the error key is provided with a fixed block 42. As shown in Fig. 26, the block 42 has three flat sides adapted to coöperate with the leaf-spring 43 to hold the error key in any one of three positions to which it may be rotatably adjusted. The leaf-spring 43 is secured to the partition and the lower portion thereof is offset from the partition, as shown in Fig. 8, so as to yield toward the partition when the key is rotated. The lower end of each error key is provided with a lateral projection 44 which is adapted to engage the under surface of the lug 40 on the partition 14 to lock the key in depressed or normal position. On the shaft 45 which runs transversely of the machine and is secured at its opposite ends to the sides of the machine casing, is mounted the rotatable sleeve 46. As best shown in Fig. 31, the sleeve 46 carries at its ends a pair of forwardly extending arms 47 to which is secured the angular restoring-bar 48. As clearly seen from Fig. 8, the restoring-bar 48 is common to all of the keyboard sections. The arrangement of the locking bar 48, with respect to the error key E K, is such that when the toe or lug 44 of an error key is turned rearwardly the forward rocking of the common locking bar 48 pulls the raised error key downwardly and holds it in such depressed position, thereby causing forward movement of the restoring plate 25 to restore the depressed numeral key of that row to normal position. As long as the restoring-bar 48 remains in engagement with the toe 44 of an error key, the associated row of keys is locked against operation, as will be clearly understood. The bar 48 therefore not only performs a restoring function, but also a locking function. Furthermore, it will be apparent that the connection between the bar 48 and each row of numeral keys is controlled by the associated error key E K. Thus when the error key is in the position shown in Fig. 2, the toe 44 is out of the path of movement of the restoring-bar 48. This is also the case if the toe 44 is in a position at right angles to that shown in Fig. 2. These various positions of the error key are best shown in Figs. 26 and 27. In order that the operator may be informed of the position of the toe 44 the head of the error key is provided with suitable indicating characters. For the sake of illustration I have selected the letters "E," "R" and "L." When the error key is turned so that the letter "E" points directly to the rear, the toe 44 also points directly to the rear, as indicated by the dotted line position 44ᵉ in Fig. 26. In this position of the error key the forward rocking of the restoring-bar 48 engages the toe 44 and pulls the error key down to restore the associated row of keys to normal position, as already explained. It should in this connection be remembered that when any key of a row is depressed the associated error key is raised. This "E" position of the error key may therefore properly be called the error position because it permits the restoring of a depressed key, so that if that key happened to be the wrong one the error may be corrected. When the error key is turned to a position where the letter "R" points to the rear, the toe 44 assumes a position parallel with the restoring-bar 48, as indicated in the dotted line position 44ʳ in Fig. 26. It will be apparent that when the key is in this position the downward movement of the restoring-bar 48 is not accompanied by any movement of the error key and that consequently the set-up on the associated row of numeral keys remains. This retaining of a set-up is of great convenience when an entry is to be repeated, or when certain digits remain the same for several successive entries. In this second or "R" position, the error key really performs the function of an individual repeat key, so that the set-up in any row of numeral keys may be retained for any length of time by merely adjusting the associated error key to the "R" or "repeat" position. When the operator turns the error key to a position in which the letter "L" points to the rear, the toe 44 extend toward the front underneath the transverse lug 40 of the associated partition 14. It is obvious that when the error key is in this position it is locked against upward movement so that it is impossible to operate any numeral key of the corresponding row. Hence this third position of the error key is the "L" or "locked" position, which is shown in Fig. 2.

From what has been said above with regard to the partitions 14 and the different parts connected thereto, it will be seen that when a keyboard section is removed by first sliding it off the supporting shafts 16 and 18, and then raising it, the connected partition 14 and the parts carried thereby will be removed with the section. The fixed partitions 14 are normally locked in position within the casing by the transverse rod 49 which runs transversely across the entire machine and passes through openings in the rear upper ends of the partitions, as shown in Figs. 3 and 9. By simply withdrawing this rod the partitions are in condition to be removed from the casing. Furthermore this rod serves to hold the partitions in rigid alinement with each other. I regard this feature of the sectional keyboard and the removal of the mechanism directly connected with each row of numeral keys as one of importance. The advantages of this sectional keyboard construction are obvious. When it is desired to inspect or repair certain of the interior mechanism, access to the desired part may be had by removing the proper section or sections. This is readily done without the use of special tools and without the necessity of dismantling the entire machine or disturbing other portions of the machine where repair or inspection is not needed.

The main power shaft P S runs transversely of the machine and is rotatably mounted in suitable bearings carried by the sides of the casing. It is on this shaft that the members for actuating the numeral wheels are mounted. The shaft is provided with longitudinal key-ways 50, as shown in Figs. 11, 12 and 13. The driving connections between the power shaft and the actuating members mounted thereon are best shown in Figs. 11 to 14 inclusive, to which reference will now be had. Fig. 11 shows one end of the power shaft mounted in the bearing 51 on the side piece 2 of the casing. The sleeve 52 which is keyed to the power shaft P S adjacent to the casing 2 terminates at its inner end in a disk 53 provided with a peripheral friction flange 54. The coil spring 55 which surrounds the sleeve 52 bears at one end against the disk 53 and at the other end against the recessed collar 56. To permit adjustment of the tension of the spring the collar 56 is movable longitudinally on the sleeve by being in screw-threaded engagement with the split ring 57. A series of sleeve members 58 are keyed upon the shaft at regular intervals. These sleeve members terminate each at one end in a disk 59 provided with a peripheral friction flange 60 and at the other end in a disk 61 provided with a peripheral friction flange 62. The key connection between the power shaft and the sleeve members 58 is effected by the disks 63 which are keyed directly to the power shaft and provided with lugs 64 which enter slots in the disks 61. Mounted loosely on the power shaft between each opposing pair of peripheral friction flanges are the controlling arm 65 and the lever 66, these two members being separated by a washer 67 keyed to the shaft P S. This washer is provided with a peripheral friction flange 68. There are as many pairs of controlling arms 65 and levers 66 as there are rows of numeral keys or orders of numeral wheels. It will be clear from Fig. 11 that each controlling arm 65 and associated lever 66 has a frictional driving connection with the power shaft through the friction flanges which are firmly though yieldingly held against opposite sides thereof. The pressure exerted by the spring 55 is transmitted from the disk 53 at one end to the fixed disk 69 at the other end and serves to establish a substantially uniform frictional connection between the power shaft and the arms or levers 65 and 66. It will be apparent that because of this frictional connection between the power shaft and the members 65 and 66 the rotation of the latter may at any time be interrupted by interposing a positive stop, without interrupting the rotation of the power shaft. The advantage and necessity of this feature will be presently made clear. Since each row of numeral keys has associated with it a controlling arm 65 and an actuating lever 66, it will be sufficient to describe the relation between any one row of numeral keys and the corresponding controlling arm 65 and actuating lever 66. By reference to Fig. 9 it will be observed that the controlling arm 65 rests normally at its free end against the stud 37. Also the arm is locked against movement by the zero pin b° which, as previously stated, normally rests at the bottom of the zero slot 35°. The actuating lever 66 terminates at its forward end in the toothed sector 70 and at its other end in the curved printing arm 70' which carries printing type. The actuating sector 70 is adapted to engage the pinion 71 which is rigidly connected to the numeral wheel n. The numeral wheels with their connected pinions are rotatably mounted upon the shaft 72 which is supported from the rock shaft 73 by the arms 74, as best shown in Figs. 9, 10 and 30. The numeral wheels and the pinions are prevented from sliding longitudinally on the shaft 72. If desired, each numeral wheel with its connected gear may be mounted upon a separate stub shaft, but as a matter of preference I have shown all of the numeral wheels mounted upon a single shaft whereby a positive alinement of the numeral wheels is secured. It will of course be understood that there is a numeral wheel for each row of numeral keys.

I will now describe the connections whereby the power shaft P S is actuated by the adding and subtracting levers. Near the bottom of the machine extends transversely the adding shaft A S which is rotatably mounted in bearings carried by the sides of the casing. At its right end the adding shaft A S projects beyond the casing to receive the adding lever A L, as shown in Fig. 1. The subtracting shaft S S extends transversely across the casing in front of the adding shaft A S and is rotatably journaled in bearings mounted on the sides of the casing. At its right end the subtracting shaft projects beyond the casing to receive the subtracting lever S L, as shown in Fig. 1. On the adding shaft A S is rigidly mounted the short arm 75 having a recessed portion 76 to engage the pin 77 carried on the arm 78 which is loosely mounted on the adding shaft adjacent to the fixed arm 75. This is clearly shown in Fig. 5. The subtracting shaft S S has rigidly mounted thereon the arm 79 having a hook portion 80 adapted to engage the pin 81 on the bifurcated arm 82 which is rotatably mounted on the subtracting shaft. The arms 78 and 82 are connected together by the link 83 which is pivotally connected to the studs 77 and 81. An end view of the construction just described is presented in Fig. 24. It will be seen from this figure that the bifurcated arm 82 is rotatably mounted on the subtracting shaft S S by means of the sleeve portion 84. On the pin 85 carried by the bifurcations of the arm 82 is loosely mounted the plate 86 which is provided with a pair of perforated ears 87 (see Fig. 5), for receiving one end of the operating springs 88. The other end of the springs 88 is connected to the plate 89 similar to the plate 86. The plate 89 is loosely supported on a pivot stud 90 on the bell crank 91. The form of this bell crank is perhaps best shown in Fig. 6, the rear portion thereof being shown in Fig. 5. The bell crank 91 is rigidly mounted upon the power shaft P S near one side of the casing, as shown in Fig. 7. Viewing the machine from the front, the connections just described between the power shaft and the adding and subtracting levers are located near the right side of the machine. The fixed plate 92 is secured to the right side 2 of the casing by studs 93 which hold the plate 92 at some distance from the side piece, as best shown in Fig. 7. Between the side of the casing and the fixed plate 92 is rotatably journaled a stub shaft 94 on which is fixedly mounted one end of the arm 95. A link 96 is at one end pivoted to the stud 97 on the arm 95 and at the other end pivoted to the stud 98 on the bell crank 91, whereby the arm 95 and the bell crank 91 are connected together. The bar 99 which is at its rear end pivoted to the stud 90 on the bell crank 91 is provided with a slot 100 at its forward end, as shown in Fig. 5. The pin 85 on the bifurcated arm 82 receives the slotted end of the bar 99 (see Figs. 5 and 24). The outer end of the arm 82 carries a pin 101 to which one end of a pair of return springs 102 is connected, the other end of these springs being attached to the pin or stud 103 on the fixed plate 92. Pivoted to the stud 82$^a$ on the extension 82$^b$ of the arm 82 is a link 104, as shown in Fig. 24. The upper end of the link 104 is pivoted to the pin 105 carried by the free end of the arm 106, as best shown in Figs. 5 and 23. The arm 106 is fixed upon the stub shaft 107 journaled in the side 2 of the casing. Fixed upon the same stub shaft is a disk 108 which is provided with a cam 109. As shown in Figs. 5 and 6, this cam consists of two oppositely extending portions which terminate in a point near the periphery of the disk 108. The arm 106, the disk 108 and the cam 109 always rotate in unison as one rigid piece. On the side nearest the casing the disk 108 carries a roller 110, as shown in Figs. 6 and 23. A bracket 111 is secured upon the side 2 of the casing in proximity to the disk 108. This bracket is provided with a race-way 112 curved in the arc of a circle eccentric to the center of the disk, as best shown in Fig. 6. The race-way 112 is in alinement with the disk 108, as indicated in Fig. 23. A ball 113 is held in the race-way by the disk 108. It will be clear from Fig. 6 that the disk 108 is free to rotate in a counter-clockwise direction (as viewed in that figure), but is prevented from rotating in the reverse direction by reason of the ball 113 becoming wedged between the disk and the race-way. The stub shaft 114 which is secured to the side 2 of the casing has rotatably mounted thereon the arm 115 and the bell crank 116. The arm 115 rests normally in a substantially horizontal position in which it is held by the stop pin 117 engaging the rear end of the arm. The stop pin 117 is carried by the side 2 of the casing. In this position the free end of the arm 115 is adapted to engage the roller 110 when the same is in the position indicated in dotted lines in Fig. 6. An arm 118 is at one end pivoted upon the stud 119 carried by the side of the casing. The free end of this arm is provided with a roller 120 which is adapted to ride on the cam 109, as shown in Figs. 6 and 23. The roller is held against the cam by the spring 121 which has one end attached to the rear end of the arm 118 and the other end to the bell crank 116. A link 122 is at one end pivoted to the pin 123 carried by the lower end of the bell crank 116.

The other end of the link 122 is pivoted to the stud or pin 124 on the bell crank 91. A dash-pot 125 is pivoted to the bottom of the casing at 126. The arm 127 which is connected to the piston head of the dash-pot is at its outer end pivoted on the stud 97 carried by the arm 95. By referring to Fig. 5 it will be observed that the arm 79 which is fixed upon the subtracting shaft S S is provided with a pin 128 on which is pivoted the locking dog 129. A spring 130 is at one end attached to the arm 79 and at the other end to the dog 129 for normally holding the rear end of the dog against the stop 131. As seen from Fig. 4 the shaft 73 has fixed thereon a depending arm 132 near the left side 1 of the casing. The free end of the arm 132 is provided with a roller 133 (see Fig. 30) adapted to work in the cam slot 134 of the plate 135 which is pivoted upon the stub shaft 136. A fixed pin 137 operating in the slot 138 limits the movement of the cam plate 135. The normal position of the cam plate 135 is that shown in Fig. 4 and in full lines in Fig. 16. When the cam plate is in this its normal position, the rock shaft 73 is in position to hold the numeral wheels forwardly out of the path of movement of the gear sectors 70, as indicated in Fig. 2. However, when the cam plate is moved upwardly, the cam slot 134 will cause the arm 132 to rock the shaft 73 in a counter-clock-wise direction (as viewed in Figs. 4 and 9). This rocking of the shaft 73 brings the numeral wheels into operative position with respect to the sectors 70. The friction of the connected parts holds the cam plate 135 in elevated position until it is forced down again by mechanism to be presently described. Figs. 3 and 9 show the numeral wheels in operative position. Each of the partitions 14 is at its upper rear end provided with an extension 139 which carries a pin 140 adapted to engage the teeth of the pinions 71 when the numeral wheels are in their inoperative position, as shown in Fig. 2. The numeral wheels are thereby held against accidental movement while out of engagement with the actuating gear sectors 70. The pins 140 furthermore serve to hold the numeral wheels in alinement so that there will be no displacement of the numbers discernible through the side opening. At its lower edge the cam plate 135 is provided with a pin 141 on which is pivoted a hook member 142. A rock shaft 144 extends transversely across the machine near the bottom and is at its ends journaled in the sides of the casing. Associated with the cam plate 135 is the plate 145 which is rotatably mounted on the rock shaft 144. To the upper end of the plate 145 is pivoted the small bell crank 146 which is normally held by the spring 147 in the position in which it is shown in Fig. 16. The free end of the bell crank 146 is recessed to operatively engage the stud 141 on the opposite side of the cam plate, as shown in Fig. 20. It is clear from Fig. 16 that if the plate 145 be rocked counter-clockwise, the bell crank 146 will raise the cam plate 135 to the position shown in dotted lines, thereby moving the numeral wheels into operative position. The plate 145 is provided with a pin 143 to which is pivoted the rear end of the link 148. The front end of this link is pivoted on the pin 149 carried by the segment 150 which is fixed upon the subtracting shaft S S, as best shown in Fig. 4. The adding shaft A S has secured thereto the segment 151. The segment 150 is provided with an arc-shaped locking flange 152, while the segment 151 has an arc-shaped locking flange 153. As seen from Figs. 4 and 24 the arrangement of the locking flanges 152 and 153 is such that when either of the shafts S S and A S is actuated the other shaft is positively locked against operation. Nor is simultaneous operation of these shafts possible, but only one shaft can be operated at a time and the other shaft cannot be operated until the first shaft has returned to normal position. The bell crank 154 is rigidly mounted upon the power shaft P S near the left side of the casing, as shown in Figs. 4 and 7. The upper end of the bell crank 154 carries a stud 155 to which is pivoted the hook member 156. The lower end of the bell crank 154 is provided with a pin 157 adapted to engage the recessed end of the hook member 142 when the bell crank 154 is rotated to operative position.

The operation whereby the actuation of the adding shaft A S and subtracting shaft S S is transmitted to the gear sectors 70 will now be understood and is as follows:

For the sake of illustration let it be assumed that the numeral key $k^7$ in Fig. 2 has been depressed, this key being representative of the numeral 7. From what has been said before regarding the connection between the numeral keys and the links $a^0$—$a^9$, it will be clear that the actuation of the key $k^7$ throws the link $a^7$ forwardly so that the setting pin $b^7$ rests at the base of its slot 35 in the sector 36. At the same time the double bell crank 24 is rocked to draw the depending arm 29 forwardly, whereby the zero pin $b^0$ is drawn out of the path of movement of the controlling arm 65. Similar operations take place when the keys in the other rows are depressed. That is to say, the depression of a key moves the zero pin to inoperative position and thrusts the connected setting pin rearwardly into the path of movement of the controlling arm 65. After the desired set-up has been made by the actuation of the proper keys and it is desired to enter this set-up as a positive item, the adding lever A L is pulled forwardly to the limit of its movement. This rotates the adding shaft A S in the direction indicated by the arrow on the shaft in Figs. 4 and 5. The arm 78 which is fixed to the shaft A S, transmits the movement of the shaft to the bifurcated arm 82 through the link connection previously described. The arm 82 is therefore rocked forwardly and places the operating springs 88 under tension. During this forward movement of the arm 82 the pin 85 slides in the slot 100 of the link 99. It will be remembered that the link 104 is connected to the bifurcated arm 82 at a point intermediate of said arm. Consequently, when the arm 82 is rocked forwardly the link 104 is raised and rotates the stub shaft 107 on which the disk 108 and cam 109 are rigidly mounted. As the disk and cam rotate in the direction indicated by the arrow in Fig. 5, the roller 120 at the free end of the arm 118 rides over the edge of the cam. The rotation of the disk 108 and cam 109 continues until the pin 110 strikes against the opposed end of the arm 115, as indicated in dotted lines in Fig. 6. The actuated parts have now reached their limit of forward movement and it will be observed that the upper cam point is to the rear of the roller 120, so that the downward pressure exerted on the arm 118 by the spring 121 tends to rotate the cam and disk in the same direction as before. This overcomes the dead center of the arm 106 and when the return springs 102 assert themselves to return the parts to normal position, the rearward pull on the arm 82 will return the disk 108 to its original position in the same direction in which it was actuated by the forward movement of the arm 82. In other words, the back and forth movement of the arm 82 always causes rotation of the disk 108 in the same direction. It is to be observed that the point of connection between the link 104 and the arm 106 is not thrown to the rear of the dead center unless the pin 110 rests against the opposed end of the arm 115. Should the adding lever be released before the pin 110 is in this position, the tendency of the springs 102 will be to rotate the disk 108 in a direction reverse to that indicated by the arrow in Fig. 5. As previously explained, the disk is locked against rotation in this reverse direction by the ball 113. So that the adding lever cannot return to normal position unless it is pulled forwardly to the limit of its movement. The tensioning of the operating springs 88 by the forward movement of the arm 82 rocks the bell crank 91 forwardly. This movement of the bell crank is communicated to the power shaft P S on which the bell crank is rigidly mounted, as previously explained. The rotation of the power shaft P S in the direction indicated by the arrow in Fig. 9 is communicated to the controlling arms 65 and the associated sectors 70. These members are locked together in pairs by the hook 158 of the arm 65 engaging the pin 159 at the bottom of the sector 70. The hook 158 is pivoted on the pin 160 which extends from opposite sides of the controlling arm. On one end of this pin the link 158 is pivoted while the other end projects into the slot 161 of the sector. The controlling arm 65 and its associated sector 70 remain locked together except when the carry-over mechanism is operated, as will be explained later on. Since the zero pin $b^0$ was withdrawn when the numeral key of the corresponding row was depressed, the arm 65 and sector 70 are rocked upwardly as one piece by the power shaft until the free end of the arm 65 encounters the setting pin of the actuated key. In the particular example assumed for the sake of illustration the sector 70 in Fig. 9 reaches the limit of its upward movement when the free end of the controlling arm 65 encounters the setting pin $b^7$. In the same way will the actuating sector of each row of keys be actuated, the extent of upward movement of each sector depending upon the identity of the actuated setting pin. If keys of different numerical values are struck in the different rows, the sectors will move different amounts. This, however, does not interfere with the movement of the power shaft by the operating springs 88, because of the frictional connection between the power shaft and the sectors, as previously explained. If no key is depressed in any particular row, the corresponding sector will be held in locked position by the zero pin engaging the arm 65. The amount of rotation which is imparted to the power shaft by the springs 88 is sufficient to give the sectors the maximum movement required, which is a movement sufficient to rotate the numeral wheels nine spaces at one time. The forward rotation of the power shaft under the action of the springs 88 is also communicated to the bell-crank 154. By referring to Fig. 4 it will be seen that as the lower end of this bell-crank continues to swing toward the left, the pin 157 will come into engagement with the pendent hook member 142 and raise the cam plate 135 to rock the numeral wheels into operative engagement with the sectors 70. The strokes of the different moving parts are so calculated that the bell-crank 154 does not raise the cam plate 135 until after the sectors have reached the limit of upward movement. When the numeral wheels have thus been moved to operative position the parts are ready for return movement. It is at this point that the bell-crank 116 has been rocked sufficiently to bring the pin 162 upwardly against the arm 115 (see Fig. 6), thereby moving this stop arm out of the path of the roller 110 on the disk 108. This releases the disk and the return springs 102 become effective to rock the arm 82 rearwardly to normal position. As previously explained, the return movement of the disk is in the same direction as its forward movement. The return movement of the arm 82 causes the springs 88 to relax. It should be stated that when the bell-crank 91 is rocked forwardly by the tension of the springs 88, the slotted bar 99 is slid forwardly a sufficient distance to bring the rear of the slot 100 against the pin 85 of the bar 82, the latter being at that time locked in its forward position. Consequently, when the arm 82 is free to return to its normal position the pin 85 forces the bar 99 rearwardly to rock the bell-crank 91 back to its initial position. This return movement of the bell-crank 91 causes reverse rotation of the power shaft and downward movement of the sectors 70. It is during this downward or return movement that the sectors actuate the numeral wheels an amount corresponding to the set-up on the keyboard, when the adding lever is operated. When, however, the subtracting lever is operated to enter the set-up on the keyboard in a negative or subtractive direction, the numeral wheels are actuated during the upward movement of the sectors and are out of engagement therewith during the return movement of the sectors. How this is accomplished will be readily understood from Fig. 4. When the subtracting lever S L is operated the segment 150, which is fixed to the subtracting shaft S S, is rocked in a forward direction, as indicated by the arrow in Fig. 4. This rocks the plate 145 forwardly through the link connection 148. As previously explained, this movement of the plate 145 raises the cam plate 135. Therefore the initial forward movement of the subtracting lever causes the numeral wheels to be rocked into operative position. That is to say, the pinions associated with the numeral wheels are rocked to a position in which they engage the teeth of the gear sectors 70. This movement of the numeral wheels into operative position occurs before any motion is imparted to the sectors. By reference to Fig. 5 it will be seen that when the subtracting shaft S S is rocked forwardly, as indicated by the arrow, no movement is imparted to the arm 82 until the hook portion 80 of the short arm 79 (fixed on the subtracting shaft) encounters the pin 81 on the arm 82. It is during this initial movement of the subtracting lever that the numeral wheels are rocked to operative position. During the remaining forward movement of the subtracting lever the bifurcated arm 82 is rocked forwardly to place the operating springs 88 under tension. The parts thereupon operate in the manner above described in connection with the adding lever, except that the numeral wheels are actuated by the sectors during the upward movement thereof. The plate 145 carries a pin 145ª which engages the hook end of the link 142 and moves the latter forwardly out of the path of the pin 57 on the bell-crank 154, when the plate 145 is rocked forwardly.

It is obvious that when the adding lever is operated the cam plate should not be restored to normal or inoperative position until the actuating sectors 70 have come to rest in their normal position. On the other hand when the subtracting lever is operated, the cam plate must be restored to inoperative position before the parts begin their return movement. The mechanism which restores the cam plate 135 when the adding lever is operated has already been described and includes the hook member 156 which is suspended on the upper end of the bell-crank 154, as shown in Fig. 4. When the bell-crank 154 returns to normal position under the action of the return springs 102, the descending link 156 engages the top of the hook member 142 at a time after the sectors have come to rest and before the adding lever has reached the limit of its return movement. This engagement of the link 156 with the hook member 142 carried by the cam plate 135, forces the latter downwardly to its normal position. The roller 156′ journaled to the side of the casing engages the hooked end of the link 156 and accordingly forces the latter rearwardly out of contact with the link 142 after the cam plate has been restored to its normal position. From Fig. 4 it will be seen that normally the link 156 rests with its free end against the roller 156′. I will now describe the mechanism which causes the restoration of the cam plate 135 to normal position when the subtracting lever is operated.

The plate 145 which is loosely mounted on the transverse shaft 144 and is operatively connected with the subtracting shaft S S through the link 148 (as previously explained), is at its lower end provided with a pin 187. This pin is of considerable length, as shown in Fig. 20. On the pivot stud 188 is mounted the bell-crank 189 to the lower end of which is pivoted the lever 190, having a hook-shaped rear end 191 disposed in the path of travel of the pin 187. A spring 192 is secured at one end to the lever 190 and is at the other end attached to the shaft 193 without, however, interfering with the rotation of the shaft. The tendency of the spring 192 is to hold the hooked end of the lever 191 in the position shown in Fig. 4, the shaft 144 constituting a stop for the lever. From this it will be seen that when the plate 145 is rocked forwardly by the subtracting lever through the connections already described, the pin 187 engages the hooked end 191, and raises the same into the path of movement of the pin 157 carried on the bell-crank 154. This movement of the lever 190 does not substantially alter the position of the bell-crank 189, because the spring 192 holds the rear arm of the bell-crank 189 in substantially the position shown in Fig. 4. It will be remembered that the forward rocking of the plate 145 raises the cam plate 135 to operative position so that the numeral wheels are moved into the path of the sectors before the latter begin their upward travel. When the cam plate 135 has thus been moved to its upper or operative position, the top of the link 142 rests underneath the rear arm of the bell-crank 189. Consequently, when the pin 157 engages the hooked end of the lever 190 and thereby rocks the rear arm of the bell-crank downwardly, the cam plate 135 is forced back to normal position. It should be remembered that the pin 157 does not move the lever 190 forwardly until after the actuating sectors 70 have reached the limit of their upward travel, which occurs just before the parts begin their return movement. In this way it will be seen that the numeral wheels are rocked out of the path of downward travel of the sectors when the subtracting lever is operated.

As best shown in Fig. 24 the sleeve portion 84 is provided with an arm 163 which carries at its end a pin 164. This construction is also shown in Figs. 5 and 6. The sleeve 46 is provided with a downwardly-extending arm 165 which may be an extension of one of the arms 47, as shown in Figs. 28 and 31. The arm 165 is curved rearwardly, as shown in Figs. 5 and 6, and carries at its rear end a pin 166 on which is pivoted the extension 167. A spring 168 coiled about the pin 166 bears at one end on the lug 169 of the extension 167 and at its other end bears against the pin 170 on the arm 165, whereby the spring tends to force the extension 167 downwardly. When the bifurcated arm 82 is rocked forwardly by either the adding or subtracting lever the pin carried by the arm 163 rides along the under surface of the extension 167 and raises the latter. When the arm 82 has reached the limit of its forward movement the pin 164 on the arm 163 is below the recess 171 of the extension. Consequently, when the arm 82 is drawn rearwardly by the return springs 102, the pin 164 engages in the recess 171 and draws the extension rearwardly. This rocks the restoring bar 48 downwardly and restores the actuated keys to original position—provided, of course, that the error keys are in the "E" position, as shown in Fig. 25.

From the above detailed description of the operation of the machine to enter any desired set-up into the numeral wheels by means of the adding lever if the entry is to be added, and by means of the subtracting lever if the entry is to be subtracted, it will be understood that the numeral wheels are actuated by the sectors 70 only during one movement of the sectors. In the specific illustration of the invention herein set forth the numeral wheels are actuated in a positive direction when in engagement with the sectors during the downward or return movement thereof, and in a negative direction when in engagement with the sectors during the upward or forward movement thereof. It will, of course, be obvious that by simply reversing the order of the numbers on the numeral wheels, positive actuation of the numeral wheels will take place when the sectors engage them during forward movement, and negative actuation will be produced when the sectors engage the wheels during the return or downward movement.

It will be observed that the actuation of the power shaft is not directly due to the operation of the adding lever or the subtracting lever, but is directly effected by the operating springs 88. In order to steady the operation of these springs, I have provided the dash-pot 125 which is connected with the bell-crank 91 through the arm 95 and the link 96 as previously explained. Therefore, no matter how the adding lever or subtracting lever may be drawn forwardly to place the operating springs under tension, the power shaft rotates with a steady and uniform motion, allowing the connected parts sufficient time to properly perform the necessary operations.

Instead of using the subtracting lever to enter a given set-up in a negative direction, the operator may accomplish the same result by depressing the subtracting key S K and operating the adding lever A L. A brief reference to this point was made in connection with the general description of Fig. 1, and I will now describe in detail the mechanism whereby this operation is effected. On the transverse shaft 172 which is rotatably journaled in the sides of the casing, is loosely mounted the sleeve 173. A plan view of this arrangement is shown in Fig. 59. The bell-crank 174 is rotatably mounted upon the shaft 172 between one end of the sleeve 173 and the arm 175 fixed upon the shaft 172, as best shown in Figs. 59 and 60. One end of the sleeve 173 is provided with the rigid arm 176, while the other end of the sleeve has formed thereon the rigid arm 177. The purpose and operation of the arm 175 will be described subsequently in connection with the total-taking operation, which will be explained under a separate heading. The arm 175 is provided with a pin 178 which normally rests against one arm of the bell-crank 174, as best shown in Fig. 60. The arm 174ª of the bell-crank 174 has pivotally connected therewith the upright lever or bar 179, the upper end of which terminates just underneath the cam plate 135 and rests against the fixed pin or roller 180, as shown in Fig. 4. It has been previously stated that the plate 145 which is operatively connected with the subtracting shaft through the link 148, is rotatably mounted on the transverse shaft 144 (see Fig. 4). On this same shaft is also mounted rotatably the disk 181 spaced a short distance from the plate 145, as best shown in Fig. 20. The plate 181 is provided with a pin 182 to which are pivoted the links 183 and 184. The link 184 is at its other end pivotally connected to the arm 176 of the sleeve 173. The link 183 is at its forward end provided with a slot 185 in which works the pin 186 carried at the end of the forward arm of the bell-crank 174. Referring to Fig. 6 it will be seen that the arm 177 of the sleeve 173 has pivotally joined thereto the upright link 194. The upper end of this link is pivoted to the rear of the lever 195, which is mounted to rotate about the stud 196 fixed to the side of the casing. The forward end of the lever 195 carries a roller 197 arranged to work in the cam slot 198 of the plate 199. The stud 200 carried by the side of the casing forms a pivotal support for the plate 199. The stem of the subtracting key S K is at the lower end thereof pivoted to the plate 199, as indicated at 200′. When the plate 199 is rocked downwardly by the actuation of the subtracting key S K the upwardly curved slot 198 forces the rear end of the lever 195 downwardly, thereby rotating the sleeve 173 in a counter-clockwise direction, as viewed in Fig. 6, and in a clockwise direction as viewed in Fig. 4. This movement of the sleeve 173 rocks the arm 176 rearwardly and through the link 184 causes rotation of the disk 181 in the direction indicated by the arrow in Fig. 4. At the same time the link 183 is drawn rearwardly and rocks the connected bell-crank 174 to lift the upright arm 179. This arm in turn pushes the cam plate 135 upwardly to thereby rock the numeral wheels into operative position. When the disk 181 is rotated by the arm 176, the pin 181ª on the disk raises the hooked end 191 of the lever 190 into the path of the pin 157 on the bell-crank 154. This function of the pin 181ª is similar to the function of the pin 187 carried by the plate 145. The disk 181 also carries a short pin 201 extending inwardly (as viewed in Fig. 4), to engage the hook end of the link 142 and move the same out of the path of the pin 157, as the disk 181 rotates in the direction of the arrow. Fig. 20 shows the operative relation of the pin 201 to the link 142. It will now be apparent how, when the subtracting key S K is depressed, the numeral wheels are moved to operative position and the hooked end 191 of the lever 190 is moved into the path of the pin 157 on the bell crank 154. These same preliminary operations take place when the subtracting lever is actuated. When the adding lever is pulled forwardly after the actuation of the subtracting key S K, the numeral wheels are operated by the sectors during the upward movement thereof to subtract the set up on the keyboard, in the manner already described.

*Carry-over mechanism*, (Figs. 2, 3, 9 and 10.)

The carry-over mechanism associated with the numeral wheels for carrying one unit into a higher order wheel whenever the next lower order wheel completes one revolution, will now be described, special reference being had to Figs. 9 and 10. The carry-over mechanism comprises a plurality of independent sections, there being a section for each numeral wheel. The cross-sectional side view shown in Fig. 9 illustrates one of these sections, while the edge view shown in Fig. 10 illustrates two sections. Each carry-over section includes a pair of plates 202 and 203. The plate 202 is of the shape best shown in Fig. 2 and is longer than the companion plate 203, the form of which is best shown in Fig. 9. The plates of each pair are rigidly connected together by the transverse studs 204 and pivot studs to be presently referred to. The longer plate 202 is provided with a slot 205 at its forward end for engaging the shaft 18 which is fixed transversely of the machine casing. The rear upper end of the plate 202 is provided with a rounded slot 206 for engaging the fixed shaft 207 secured to the sides of the casing. The upper end of the shorter plate 203 is provided with a rounded slot 208 in alinement with the slot 206 of the companion plate so as to engage the shaft 207. From this it will be seen that each pair of plates is removably supported on the shafts 18 and 207. Furthermore, each section of the carry-over mechanism is independent of the other sections, so that any one pair of plates may be removed without disturbing the other pairs. In Fig. 9 I have indicated the long plate which is behind the short plate 203, by the reference numeral 202' to indicate that this long plate is not the companion plate of the short plate 203, but is one of the plates of the next pair. In Fig. 10 the reference numeral 203' indicates the short plate which forms the companion of the long plate 202'. Between each pair of plates is mounted a stud 209 on which is pivoted the double bell-crank 210 provided with the four arms $210^a$, $210^b$, $210^c$, and $210^d$, best shown in Fig. 9. A spring 211 is at its upper end attached to the pin 212 carried by the plate 202. The lower end of the spring is secured to the arm $210^a$, the normal tendency of the spring being to rock the double bell-crank counter-clockwise as viewed in Fig. 9. This tendency of the spring is counteracted by the stop shaft 213 against which the rear end of the arm $210^a$ abuts. The stop shaft 213 is mounted between a pair of arms 214 secured to the rock shaft 215, which is journaled in the sides of the casing. The arrangement of the arms 214 on the shaft 215 is perhaps best shown in Fig. 7 from which it will be seen that the shaft 213 runs clear across the carry-over sections and forms a common stop for all of the bell-cranks 210. Fig. 7 also shows the rear edges of the plates 202 and 203, together with the springs 211. The downwardly-extending arm $210^b$ of the double bell-crank has joined thereto one end of the link 216, which is at its other end connected to the locking dog 158. On the stud 217 carried by each section, is pivotally mounted the bell-crank 218. To the pin 219 carried between the section plates, is attached one end of the spring 220 which is at its other end connected to the bell-crank 218 to normally hold the arm $218^b$ of the bell-crank against the stop lug 221 mounted between the plates 202 and 203. The arm $210^c$ of the double bell-crank 210 is provided with a lateral flange 222 adapted to engage the projection 223 of the arm $218^b$. The bell-crank 210 is therefore locked against movement either as long as the projection 223 is in the path of the flange 222 or as long as the stop shaft 213 engages the rear arm $210^a$. There is an arm 74 adjacent to each numeral wheel, as previously described, and as shown in Figs. 10 and 30, these arms forming the supporting means for the shaft 72 on which the numeral wheels are rotatably mounted. Each arm 74 has slidably mounted thereon the trip rod 224 adapted to reciprocate in guide pieces 225 on the arm. The lower end of the rod 224 is provided with a roller 226 adapted to engage the periphery of the carry-over disk 227 rigidly secured to the numeral wheel so as to rotate therewith. The disk 227 is provided with a pointed cam projection 228 adapted to raise the trip rod 224 and thus rock the bell-crank 218 to release the shoulder 223 from the flange 222 on the bell-crank 210. The angular disposition of the cam projection 228 with respect to the numbers on the numeral wheels is such that it raises the trip rod 224 when the numeral wheel is passing from the "9" to "zero" position, as observed through the sight opening. The rock shaft 215 has secured near the right end thereof the actuating arm 229, as shown in Figs. 5, 6, and 7. Near the right end of the rock shaft 144, previously referred to, is rotatably mounted the sleeve member 230 provided with the angularly arranged arms 231 and 232, so that the member 230 may properly be considered a bell-crank. The free end of the arm 232 is notched or slotted as indicated at 233 to receive the pin 234 carried at the forward end of the bell-crank 91. A link 235 is at its upper end pivoted to the arm 229 and at its lower end to the arm 231, as best shown in Figs. 5 and 6. By virtue of this connection between the bell-crank 91 and the rock shaft 215, the forward rotation of the bell-crank (as explained in the preceding chapter) causes rocking of the shaft 215 in the direction indicated by the arrow in Fig. 6 and by the arrow in Fig. 9. The reason why the arrows in these two figures indicate reverse directions is due to the fact that Fig. 6 shows a view looking toward the right side of the machine, while Fig. 9 shows a view looking toward the left side. When, therefore, the power shaft P S is actuated upon operation of either the adding lever A L or the subtracting lever S L, as previously set forth in detail, the stop shaft 213 is moved out of engagement with the arm 210ᵃ of the double bell-crank 210. However, no movement of the bell-crank results until the shoulder 223 on the bell-crank 218 is moved out of the path of the flange 222 on the arm 210ᶜ. Whenever a numeral wheel passes from "9" to "zero" position the cam projection 228 trips the bell-crank 218 and allows the double bell-crank 210 to be rocked counter-clockwise (as viewed in Fig. 9) by the spring 211. This withdraws the dog 158 from the pin 159 on the sector 70. Because of the frictional mounting of the controlling arm 65 and the sector 70 on the power shaft P S, this unlocking of the sector 70 from the controlling arm 65 does not interfere with the synchronous movement of these two members until the controlling arm strikes the actuated setting pin. This arrests further movement of the controlling arm 65 and permits an additional one-space movement of the sectors 70 because of the slotted connection between the arms 65 and the sectors 70. By reference to Fig. 9 it will be observed that the pin 160 on the controlling arm 65 is normally in the center of the slot 161 on the sector. The slot is of such length that the additional movement of the sector just referred to gives the connected numeral wheel a one-space rotation—that is to say, the numeral wheel is rotated the distance of one tooth of the gear 71. There being ten teeth on this gear, a one-tooth rotation thereof enters one unit in the numeral wheel either in a positive or in a negative direction. Since the pin 160 of the arm 65 is normally in the center of the slot 161 the additional one-space movement of the sectors 70 can take place in either direction, so that the carry-over mechanism operates indifferently in the positive direction as well as in the negative direction. This feature is of high importance because it enables the machine to add and subtract with equal facility. The pointed cam projection 228 operates the same in either direction. It should in this connection be noted that the carry-over mechanism of a numeral wheel of lower order controls the locking connection between the controlling arm 65 and gear sector 70 of the next higher order. It should also be observed that the carrying into a higher-order wheel does not take place until after that wheel has been actuated the number of units indicated by the depressed key of that order. For instance, if the numeral wheels indicate 1748 and the number 362 is to be added, the units wheel is the first one to pass from the "9" to the "zero" position. In doing so it unlocks the sector of the tens wheel. The hundreds wheel is the next to pass from "9" to "zero" position, thereby unlocking the sector of the thousands wheel, and permitting that sector to give the thousands wheel a one-space advancement. The tens wheel which is actuated six spaces is the last one to pass from "9" to "zero." The hundreds sector does therefore not receive its one-space carrying movement until the tens sector has moved through five spaces. When the tens sector has moved through six spaces the associated controlling arm is stopped by the "6" setting pin, but the sector moves one additional space because of its having been previously unlocked from the controlling arm by the cam projection of the units wheel. The indication of the numeral wheels will therefore be 2—1—1—0. In the same manner does the carrying mechanism operate when a given set up is entered negatively in the numeral wheels, except that instead of one unit being added into a wheel of higher order, one unit is taken out of the numeral wheel.

Each sector 70 carries a pin 232ᵇ adapted to be engaged by the hook arm 232ᵃ mounted on the shaft 144. This arrangement holds the sectors in strict alinement.

From the preceding description it will be seen that my novel form of carry-over mechanism is of exceedingly simple construction as compared with carry-over mechanisms heretofore employed, is positive in its operation and is furthermore capable of working in a positive as well as in a negative direction. In some of the adding machines heretofore constructed it has been necessary to employ two sets of carry-over mechanisms to enable the machine to perform adding and subtracting operations. This necessitated the provision of additional appliances for throwing one set of carry-over mechanism into operative position for adding and throwing the other set into operation for subtracting. I have successfully avoided all of these complications by the single carry-over mechanism above set forth. In addition to the above noted features which characterize the carry-over mechanism of my invention, there is the feature of dividing the mechanism at any point into two or more independently operative sections. To promote clearness of description, however, I have reserved the detailed description of this last-mentioned feature for a subsequent chapter. The next in order for description is the printing mechanism mounted at the rear end of the machine.

*Printing mechanism*, (Figs. 34 to 66.)

Briefly stated, this mechanism comprises a platen for supporting the record sheet in printing position, arms carrying the printing type and adapted to be actuated simultaneously with the gear sectors 70, hammers for striking the type to print the entry, platen-controlling mechanism and ribbon shifting mechanism. In addition to this the printing mechanism includes a special means for printing explanatory characters, but in order to avoid possible confusion I will omit this special printing means from this chapter and describe it in detail in a separate chapter later on. Also the mechanism which I have devised for splitting the printing hammers into independently operative sections is omitted from this heading and will be set forth in a subsequent portion of the specification.

Figure 34:
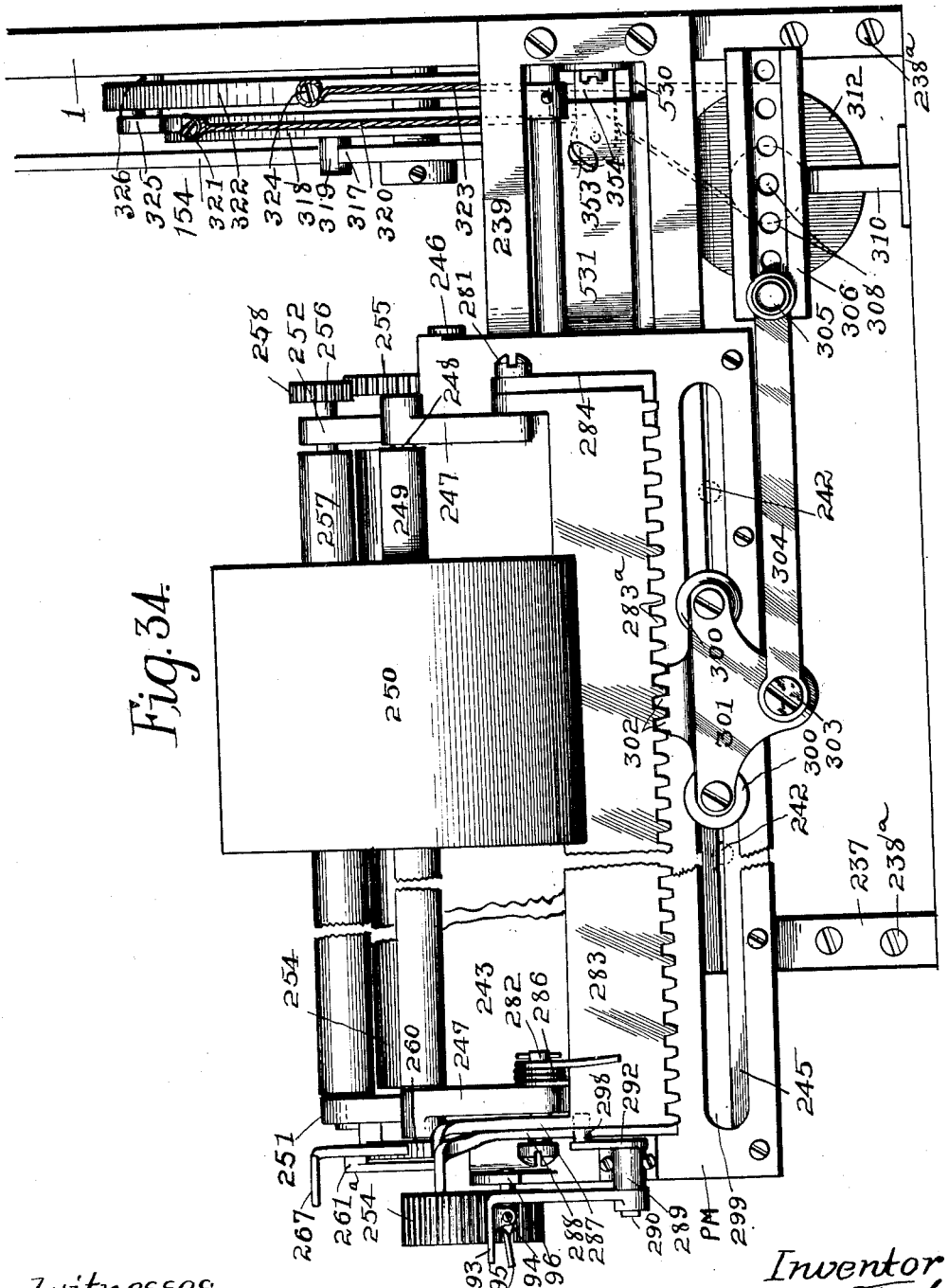
Fig. 34 is a rear end view of the printing mechanism.

The sides 1 and 2 of the machine casing are at the rear cut out to form extensions 236 (see Figs. 3 and 6) to which are secured the plates 237, of the form best shown in Fig. 37, the recessed portion 238 of each plate fitting over the extension 236. Suitable fastening means such as screws 238 hold the plates in position on the casing. The side plates 237 are connected together by the transverse plate 239, as shown in Figs. 34 and 37. The upper and lower edges of this transverse plate are provided with grooves or channels 240 which coöperate with corresponding channels 241 on the slidable platen carriage to form race-ways for the bearing balls 242. The structure of the slidable carriage includes a transverse plate 243 having secured thereto an upper bar 244 and a lower bar 245. As seen in Figs. 35 and 37 these bars extend over the plate 239 and provide the support for the slidable platen carriage on the stationary plate 239. The bar 244 is at its ends provided with a pair of forwardly projecting arms 245[a] which serve as bearings for the shaft 246 on which the platen frame is pivoted. The plate 243 is provided with rearwardly and upwardly extending arms 247 which constitute supporting brackets for the shaft 248 on which is journaled a sleeve or roller 249 for carrying the paper roll 250. This is clearly shown in Figs. 6, 34 and 35. On the shaft 246 are mounted the side pieces 251 and 252 of the platen frame. These side pieces form the support for the rotatable platen shaft 253 on which is fixed the platen 254. The left end of the platen shaft 253 (as viewed in Fig. 34) is provided with a cylindrical finger piece 254[a] while the right end of the shaft has fixed thereto the large gear wheel 255. The members 251 and 252 of the platen frame carry in their upper extensions the shaft 256 on which is mounted the feed roller 257. On one end of the shaft 256 is fixed the pinion 258 which meshes with the gear 255 on the platen shaft. The object of this arrangement is to produce positive rotation of the feed roller from the platen shaft. In printing mechanism of this class heretofore constructed, the feed roller was adapted to be driven by frictional contact with the record sheet. I have found, however, that when several sheets were used the feeding of the paper was not uniform, the outer sheets slipping with respect to the inner sheets, due to the fact that a feed roller had to depend for its movement merely upon frictional contact with the outer sheet. This difficulty is eliminated by the arrangement which I have just described where the feed roller is positively actuated. The ratio of transmission between the platen shaft and the feed shaft is such that the surface speeds of the feed roller and the platen are equal. This compels all of the sheets to travel uniformly. A serrated cutting bar 259 is secured to the side pieces 251 and 252, as shown in Figs. 35 and 36. This bar is so arranged that the paper which has been fed from the platen passes below the cutting edge, so that when it is desired to sever a printed section of paper it is only necessary to pull the printed section forwardly, whereby it will come into engagement with the serrated edge of the printing bar and be severed. Fixed upon the platen shaft 253 near the left end thereof (as viewed in Fig. 34) is the ratchet wheel 260. A bell-crank 261 is rotatably mounted on the platen shaft 253 adjacent to the ratchet wheel 260. Mounted at the other end of the shaft 253 beside the platen is an arm 262, as shown in Fig. 36. The bell-crank 261 and the arm 262 are connected together by the rock shaft 263 which extends transversely across the machine. To the upper end of the bell-crank 261 is pivoted the lever 264, the point of pivot being indicated at 265. The lever 264 is in the form of a bell-crank, one arm being in the shape of a pawl 266 adapted to engage the teeth of the ratchet 260. The other arm of the bell-crank 264 terminates in a finger piece 267. To the stud 268 on the side piece 251 is pivoted the retaining dog 269 which is normally held against the teeth of the ratchet by the spring 270, secured at one end to the stud 268. The other end of the spring 270 bears against the shaft 256.

The rear end of the retaining dog 269 is provided with a pin or roller 271 adapted to be engaged by the bell-crank 264 when the latter is depressed. A spring 272 secured at one end to the stud 268 and at the other end to the pin 273 on the bell-crank 261, normally holds the latter in the position shown in Fig. 37. From this figure it will be apparent that when the upper end of the bell-crank 264 is depressed the pawl 266 is moved out of contact with the ratchet. At the same time the bell-crank 264 engaging the roller 271 depresses the rear end of the dog 269 and lifts the forward end thereof away from the teeth of the ratchet. Consequently the platen is free to be rotated in either direction by means of the corrugated finger piece 254. I have provided means for automatically rotating the platen so as to bring successive lines into printing position. This operation of the platen is usually termed spacing. Referring to Fig. 6, it will be seen that the arm or lever 274 abnormally rests against the rock shaft 263. The arm 274 is fixed upon the shaft 275 which is pivotally mounted in the sides of the casing. Upon the shaft 275 is also fixed the downwardly extending arm 276 provided with a series of openings 277. A link 278 is at its forward end pivoted to the arm 231 of the bell-crank 230 which, as previously stated, is fixed upon the shaft 144. The rear end of the link 278 terminates in a yoke or bifurcated member 279 which is connected to the arm 275 by the pin 280. It will be remembered that the arm 232 of the bell-crank 230 is operatively connected with the bell crank 91 fixed upon the power shaft P S. When, therefore, the bell-crank 91 is rocked forwardly upon operation of the adding or the subtracting lever (as previously explained) the link 278 is forced rearwardly. This rocks the arm 274 forwardly and operates the bell-crank 261 in the direction indicated by the arrow in Fig. 37 to advance the platen one space. This operation takes place at the beginning of the forward movement of either the adding or subtracting lever. The amount of spacing may be varied by adjusting the pin connection between the arm 276 and the link 278. The three openings 277 in the arm 276 provide for three different spacings—namely, one-line, two-line, or three-line spacings.

I will now describe the mechanism for shifting the platen transversely of the machine so as to bring the desired column on the record sheet into printing position. Referring particularly to Figs. 34 and 35, it will be observed that the bracket arms 247 carried by the plate 243 carry the pivot studs 281 and 282 to which are pivoted the racks 283 and 284. The rack 283 which may be called the outer rack is provided with continuous teeth 283ª, while the inner rack 284 is provided with sets of intermediate teeth 285, as best shown in Fig. 65. A coil spring 286 wound on the stud 282 bears at one end against the rack 283 and at the other end against the rack 284 to normally force the racks toward each other, as indicated in Fig. 35, without interfering with the independent movement of these racks. The outer rack 283 is at its left end (as viewed in Fig. 34) provided with an upwardly and forwardly extending finger piece 287, while the inner rack 284 is at the same end provided with an upwardly and rearwardly extending finger piece 288. As seen from Figs. 35 and 37, these two finger pieces cross each other at the point of pivot of the racks. The plate 243 has secured thereto a bearing piece 289 for supporting the pin 290. As best shown in Fig. 34, the pin 290 extends through the bearing piece 289 and has at one end secured thereto the lever 291, while the crank arm 292 is fixed to the other end of the pin. The lever 291 is at its upper end bent outwardly to provide a finger piece 293 to which is pivoted at 294 the dog 295. From the left upper edge (as viewed in Fig. 34) of the plate 243 extends rearwardly the sector 296 provided with slots 297 with which the dog 295 cooperates to hold the arm 291 in any of its adjusted positions. The crank arm 292 carries at its free end the pin 298 which extends between the racks 283 and 284. This is clearly shown in Figs. 34 and 35. The plate 243 is at its lower portion provided with a longitudinal slot 299 which is adapted to receive the rollers 300 of the carriage 301. At its upper end this carriage is provided with teeth 302 arranged to mesh with the teeth of either the rack 283 or the rack 284. By means of the lever 291 the racks may be adjusted to bring either one of them into operative engagement with the carriage 301 or to hold both of the racks out of engagement with the carriage. There are thus three different positions to which the racks may be adjusted. The sector 296 is therefore provided with at least three slots. By pressing upwardly on the outer end of the dog 295 the latter is drawn out of engagement with the sector 296 and the arm 291 may be adjusted to the desired position. When the dog 295 engages the left slot (as viewed in Fig. 37), the rack 283 is in engagement with the carriage 301. When the dog is in the middle slot, both of the racks are out of engagement with the carriage. When the dog is in the righthand slot, the pin 284 has forced the rack 283 sufficiently to the rear of the machine to cause the spring 286 to bring the rack 284 into alinement with the teeth of the carriage 301. To the stud 303 at the lower end of the carriage 301 is pivoted one end of the connecting rod 304. The other end of the connecting rod 304 is pivoted to the pin 305 carried by the channeled crank arm 306. As best shown in Fig. 49, the pin 305 screws into the block 307 which is slidably mounted on the crank arm. The single end of the pin passes into one of the openings 308 provided on the crank arm, as shown in Fig. 34. As the crank arm is rotated or oscillated by means of mechanism to be subsequently described, the carriage 301 is reciprocated and draws with it the framework on which the platen is mounted, provided either one of the racks 283 or 284 is in engagement with the carriage. The stroke of the carriage may be regulated by changing the position of the pin 305 either toward or away from the axis of rotation of the crank arm 306, according as it is desired to decrease or increase the stroke. I will now describe the purpose of the two rack-bars. Normally the carriage 301 is in engagement with the rack bar 284 which, as previously stated, is provided with sets of intermediate teeth 285. As the crank arm is rotated 180 degrees from the position shown in Fig. 34, the carriage shifts the platen-supporting frame the distance of a column on the record sheet so as to bring an adjacent column into printing position; for instance, if the column which is in printing position with the carriage in the position shown in Fig. 34 is the adding column rotation of the crank arm 306 through an angle of 180 degrees causes the platen to be shifted so as to bring the subtracting column into printing position. After the printing in the subtracting column has been done, the carriage is shifted back to normal position. It will, therefore, be seen that the back and forth movement of the carriage 301 brings alternately one or the other of two adjacent columns into printing position. Suppose that it is desired to bring a second pair of columns into printing position. To do this the operator presses down on the finger piece 288 sufficiently to disengage the teeth of the rack-bar 284 from the teeth of the carriage 301 and shifts the carriage-supporting frame just enough to bring the previously operative set of teeth 285 out of alinement with the teeth on the carriage. The operator may then release the finger piece 288 and the smooth edge 284ª of the rack 284 will bear against the teeth of the carriage. The platen-supporting frame is then shifted to the right until the next set of teeth 285 come into alinement with the teeth 302 of the carriage. When this occurs the alined teeth snap into engagement with each other and the movement of the platen-supporting frame is arrested. When the operator hears the click of the rack 284 snapping into engagement with the carriage, he knows that the platen has been adjusted to a position in which the desired pair of columns has been brought into the printing field. Referring to Fig. 65, the sets of teeth are spaced apart a distance of two columns. So that when the carriage is in engagement with the first set of teeth, the first pair of columns works in the field of the printing mechanism; when the carriage 301 is in engagement with the second set of teeth 285, the second pair of columns works in the printing field, and so on. Ordinarily the rack 283 with its continuous row of teeth will not be necessary. However, where a record sheet is used having columns of less or greater width than those for which the rack 284 has been designed, the shifting of the platen-supporting frame through a distance equal to the space between adjacent sets of teeth on the rack 284 would not bring the next pair of columns into proper printing position. This contingency is met by the use of the rack 283. Since this rack has a continuous line of teeth at its lower edge the platen-supporting frame may be adjusted to any position with respect to the carriage to bring the desired pair of columns into proper printing position. In this way columns of any width may be brought into the field of the printing mechanism. The rack 283 may therefore be said to supplement the rack 284 to permit the platen to be adjusted in any desired position with respect to the carriage 301.

The mechanism for operating the crank arm 306 is best shown in Figs. 48 to 51 inclusive, to which reference will now be had. The crank arm 306 is rigidly secured to the rear end of the shaft 309 journaled in the standards 310 and 311. A grooved pulley 312 is rotatably mounted on the shaft 309 between the standards. The pulley is recessed and houses the spiral spring 313 which has its outer end secured to the rim of the pulley at 314 and its inner end secured to the shaft 309 by the pin 315. The inner end of the shaft 309 has secured thereto the grooved pulley 316. The bell-crank 154 (which as previously stated is fixed upon the power shaft P S) is provided with a hook portion 317. The sector 318 which is loosely mounted on the power shaft opposite the bell-crank 154 carries a pin 319 which engages the hook portion 317 of the bell-crank 154. One end of a rope or cord 320 is attached to the sector 318 at 321, while the other end of the rope is secured to the grooved wheel 316. Loosely mounted on the power shaft adjacent the sector 318 is the larger sector 322. One end of the rope or cord 323 is attached to the sector 322 at the point 324, while the other end of the rope is fastened to the pulley 312. A pawl 325 is pivoted to the pin or stud 326 which is fixed to the adjacent side of the machine casing. One end of the pawl is provided with a hook 327 which normally engages the projection 328 on the sector 318. The other end of the pawl 325 carries a transverse pin or roller 329 which works in the slot 330 of the sector 322. The segment 150 fixed upon the subtracting shaft S S carries a pin 331. A lever 332 is at its rear end pivoted to the stud 333 on the sector 322 and is at its other end provided with a slot 334 in which the pin 331 normally rests. On the stud 335 carried by the left side of the casing is pivoted a T-shaped lever comprising an upper arm 336 and a pair of lower arms 337 and 338. A connecting rod 339 is at one end pivoted to the lever 332 and at the other end to the arm 337. A second connecting rod 340 is at one end pivoted to the arm 338 and at the other end to the lever 341 which is pivoted to the stud 333. The free end of the lever 341 is formed into a hooked portion 342 adapted to engage the pin 343 carried by the segment 151. As previously stated this segment is fixed upon the adding shaft A S and is actuated whenever the adding lever is operated. In order to avoid confusion the segments 150 and 151 are in Fig. 48 indicated in dotted lines. The upper arm 336 of the T-shaped lever is provided with a slot 344 in which works the pin 345 carried by the arm 346. This arm is fixed upon the inner end of the stub shaft 347 which is journaled in the bearing 348 in the side 1 of the casing. The outer end of the shaft 347 carries the controlling lever C L. To the side 1 of the casing is fixed the circular strip 349 provided with a series of notches 350ª, 350ᵇ and 350ᶜ. The arm 346 is provided with a hollow portion in which works the pin 351. A spring 352 tends to push the pin 351 outwardly against the strip 349, so that as the arm 346 is rotated the pin 351 will slip into the notches on the strip 349 and hold the arm in any of its adjusted positions. When the arm 346 is in the position shown in Fig. 48 the hook end of the lever 332 is in engagement with the pin 331 carried by the segment 150. When therefore the subtracting lever is operated the lever 332 is pulled forwardly (to the left as viewed in Fig. 48). This rocks the segment 322 and by means of the cord 323 the pulley 312 is rotated to place the spring 313 under tension. The initial movement of the sector 322 draws with it the smaller sector 318 and after slight movement of the sector 322 the forward end of the dog 325 is released from the lug 328. The segment 318 therefore moves rearwardly as the lower arm of the bell-crank 154 is rocked forwardly. It should be observed that the ropes or cords 320 and 323 are wound reversely upon their respective pulleys, as indicated in Figs. 34 and 48. The cord 320 is guided from the wheel 316 to the sector 318 by a roller 353 mounted in a bracket 354 on the side of the casing. This is indicated in dotted lines in Fig. 34. When the sector 318 is thus released from the dog 325, the spring 313 which has been placed under tension by the forward rocking of the sector 322 rotates the shaft 309. This rotation is permitted because the smaller sector 318 is free to move rearwardly and allow the rope 320 to be wound upon the wheel 316 which is fixed to the shaft 309. It should be remembered that during this rearward movement of the sector 318 the hook portion 317 on the bell-crank 154 is moved downwardly out of the path of the pin 319. The downward movement of the sector 318 is arrested when the projection 328 thereon encounters the stop 355 carried by the sector 322. This short rearward movement of the smaller sector 318 is just sufficient to allow the shaft 309 to make one-half a revolution under the action of the spring 313. This rotates the crank arm 306 through a distance of 180 degrees and causes the connected carriage 301 to shift the platen so as to bring the adjoining column (usually the subtracting column) into printing position. When the subtracting shaft S S returns to normal position the sector 322 is pushed back by the lever 332 to normal position. At the same time the return of the bell-crank 154 brings the hook portion 317 into engagement with the pin 319 on the sector 318 and rocks this sector upwardly. During this upward or return movement of the sector 318, the shaft 309 is rotated in the reverse direction for one-half a revolution and the platen is shifted back to its previous position where the adding column is in the field of the printing mechanism. It will thus be seen that by a single operation of the subtracting lever the platen is shifted from the adding column to the subtracting column and brought back to the adding column. This automatic return of the platen obviates any special or additional manipulation of the machine by the operator, as has been necessary in machines heretofore constructed where the platen was shifted at one time and returned at another time. When the arm 346 is shifted to the middle position where the pin 351 engages the notch 350ª, the levers 332 and 341 assume the position indicated in dotted lines in Fig. 48. It will be seen that in this position the two levers are disconnected from their respective segments 150 and 151, so that the platen-supporting carriage is not shifted by either the adding lever or the subtracting lever. When the arm 346 is in the position in which the pin 351 engages the notch 350ᵇ the lever 341 engages the pin 343 on the segment 151 fixed upon the adding shaft A S, while the lever 332 remains out of engagement with the segment 150. With the two levers in this position the operation of the subtracting shaft does not cause shifting of the carriage.

However, when the adding shaft is operated the carriage is shifted from one column to the next in the manner described above in detail, in connection with the subtracting lever. This shifting of the carriage by the adding lever is demanded in cases where the normal position of the platen is in the subtracting column and the adding column is to the right thereof. Ordinarily the platen operates normally in the adding column and the subtracting column is to the right. In this instance the carriage is shifted to the subtracting column when the subtracting lever is operated. However, when the order of the columns is reversed and it becomes necessary to shift the platen from the subtracting to the adding column, the arm 346 is adjusted to the third of the positions above described, so as to cause shifting of the platen when the adding lever is operated.

I will now describe the printing hammers and the associated mechanism whereby the set-up entered into the machine is printed on the record sheet wound over the platen. This portion of the printing mechanism is shown in Figs. 3 and 7, and is shown in detail in Figs. 38 to 43, inclusive, to which reference will now be had. It will be remembered from the description set forth in the chapter on the mechanism for operating the numeral wheels that the levers 66 terminate at the rear end in the arc-shaped type bars 70'. These bars are provided with radial openings in which type pieces 356 are slidably inserted. These type pieces are held in their normal or initial position by means of a thin yieldable rod 357 which passes through slots in the type pieces. One end of the rod 357 is secured to the type bar 70' at 358 (see Fig. 9) while the other end of the rod is attached to the spring 359 secured to the lug 360 on the type bar. When the inner ends of the type pieces are struck by the hammers to be presently described, the rod 357 yields sufficiently to permit the outward movement of the type pieces to printing position. The spring 359 at once returns the actuated type piece to normal position when the hammer is withdrawn. It will thus be seen that I have provided a simple and effective means for operatively mounting the type pieces in the type bars. In order to bring the type bars side by side the rear portions of the levers 66 are made to converge as shown in Fig. 7. It will, of course, be understood that the type bars are arranged in printing relation to the platen. The mechanism for actuating the printing type is mounted so as to be readily removable from the casing as one unit or section. This hammer section, as it may be properly called, comprises a pair of side plates 361 and 362. Figs. 2, 3 and 57 show the side plate 361, while Fig. 38 best shows the side plate 362. These side plates are provided with slots 363 for engaging the transverse shaft 364 fixed in the sides of the casing. At their front ends the side plates are provided with slots 365 for engaging the transverse shaft 366. The shafts 363 and 366 therefore form the support for the hammer section. A rod 367 passes through the side plates 361 and 362 at the lower forward ends thereof, as shown in Figs. 2, 3 and 38. This rod also passes through the sides of the machine casing and is accessible from without. On removing this rod the hammer section with its connected parts may be disengaged from the shafts 364 and 366 and removed from the casing through an opening in the bottom thereof. On the shaft 368 mounted in the side plates 361 and 362 are pivoted the hammers 369$^a$, 369$^b$, 369$^c$, etc., being respectively the units hammer, the tens hammer, the hundreds hammer, etc. Fig. 39 which illustrates a portion of the hammer mechanism, shows the units, tens and hundreds hammers; while Fig. 38 shows the tens hammer 369$^b$ in side elevation, together with certain of the associated parts to be presently referred to. The hammers 369 are mounted in alinement with the type bars. For the sake of clearness the units type bar is in Fig. 39 indicated by 70$^a$, the tens type bar by 70$^b$, and the hundreds type bar by 70$^c$. Across the hammer section between the side plates 361 and 362 runs the bar 370 which is slotted to accommodate the hammers. Each hammer carries a transverse pin indicated in Fig. 40 by 371. For the sake of distinction the transverse pin on the units hammer 369$^a$ is indicated by 371$^a$; the transverse pin on the tens hammer 369$^b$ is indicated by 371$^b$ and the transverse pin on the hundreds hammer 369$^c$ is indicated by 371$^c$. Viewing the machine from the front the transverse pins 371 extend from the left side of the hammers. With each hammer is associated a Y-shaped trigger, as best shown in Fig. 38. The trigger associated with the units hammer 369$^a$ is marked 372$^a$; the trigger associated with the tens hammer 369$^b$, is marked 372$^b$ and so on with the other triggers which are not indicated in the drawings. These triggers are pivoted upon the shaft 373 mounted in the side plates 361 and 362. A strengthening bar 374 runs between the side plates and the shaft 373 rests in a recess in that bar, as shown in Fig. 38. Each hammer is provided with a slot 375 shaped to form a shoulder 376. Each trigger has pivoted at its lower end a lever 377 having a transverse lug 378. The lever connected to the lower end of the trigger 372$^a$ in Fig. 38 is for the sake of distinction indicated by 377$^a$. The lever connected to the lower end of the trigger 372$^b$ is in Fig. 39 indicated by 377$^b$. The free end of each lever 377 rests upon the projection 378ᵃ carried by the arm 379 which is pivotally mounted on the shaft 380. This shaft extends between the plates 361 and 362. A strengthening piece 381 runs transversely between the sections and is provided with grooves or channels in which the shafts 368 and 380 are housed, as is shown in Fig. 38. The strengthening piece 381 is of course slotted to allow movement of the hammers 369 and the arms 379. The strengthening piece 374 is also slotted to accommodate the triggers 372. The transverse lug 378 of the units lever 377ᵃ extends into the slot of the tens hammer 369ᵇ; the tens lever 377ᵇ extends into the slot of the hundreds hammer 369ᶜ, and so on. On the shaft 382 which is fixed in the sides 361 and 362 of the hammer section, are mounted the slotted links 383, one for each hammer. Each link 383 has pivoted thereto a lever 384. This lever is in Fig. 38 indicated by the additional reference character 384ᵃ to show that it is associated with the units type bar 70ᵃ. The units lever 384 is in Fig. 39 indicated by 384ᵃ and the tens lever, namely the lever associated with the tens hammer 369ᵇ, is indicated by 384ᵇ. Each type bar is at its lower end provided with a transverse pin extending toward the right as viewed from the front of the machine. The pin carried by the units type bar 70ᵃ is in Figs. 38 and 39 indicated by 385ᵃ. The pin carried at the lower end of the tens type bar 70ᵇ is in Fig. 39 indicated by 385ᵇ. The pin of the hundreds type bar 70ᶜ is marked 385ᶜ. The free end of the lever 384ᵃ is curved toward the right (as viewed from the front) so as to be in alinement with the pin 385ᵃ of the units type bar. Similarly the free end of the lever 384ᵇ is bent so as to be in alinement with the pin of the tens type bar 70ᵇ, and so on with the other levers 384. A bar 386 extending across the hammer section, is slotted to support the free ends of the levers 384 and hold them in proper alinement with the pins of the type bars. A spring 387 is at one end attached to the rear portion of each lever 384 and is at the other end secured to the associated trigger 372 at the point 388. The transverse shoulder 389 on the lever 384 normally rests against the arm 390 of the Y-shaped trigger 372. The tendency of the spring is to hold the shoulder 389 against the arm 390. To the lower end of each hammer is pivoted one end of a spring 391, the other end of which is secured to the bar 392. This bar is slidably mounted on the guide member 393 pivoted on the shaft 394 which is fixed in the sides of the hammer section. The guide member 393 is provided with hook-shaped extensions 394ᵃ which form guideways for the bar 392, as best shown in Fig. 42. The front end of the bar 392 is provided with an extension 395 adapted to normally engage the front edge of the sliding plate 396. The side plates 361 and 362 are provided with alined slots 397 in which the transverse plate 396 reciprocates. I will now describe the connections whereby the plate 396 is operated. On one end of the shaft 382, which is fixed between the side plates of the hammer section, is rotatably mounted the bell-crank 398 having a lower arm 399 and upper arm 400, and an intermediate arm 401, as best shown in Fig. 45. On the other end of the shaft 382 is rotatably mounted an arm (not shown) in alinement with the arm 400. These two arms are connected by the rods 400ᵃ and 400ᵇ. The purpose of the rod 400ᵃ is to hold the slotted links 383 in proper position on the shaft 382. The purpose of the bar 400ᵃ is to return the links 383 to normal position when the bell-crank 398 is rocked counter-clockwise, as viewed in Fig. 38. Referring to Fig. 2, the lower arm 399 of the bell-crank has pivoted thereto one end of the link 402 which is at its other end secured to the transverse plate 396, as indicated at 403 in Fig. 2. A spring 404 secured at its upper end to the ear 405 of the bell-crank 398 and at its lower end to the machine casing, normally tends to hold the plate 396 at its rearward limit of movement, as shown in Fig. 38. In the fixed bearings 406 and 407 is mounted the shaft 408 in alinement with the shaft 382. On the shaft 408 is loosely mounted the sleeve 409 which at one end is provided with the arm 410 and at the other end with the arm 411. To the pin 412 on the arm 410 is pivoted the lower end of the link 413, best shown in Figs. 45 and 47. The upper end of the link 413 is provided with the slots 414 and 415. The bell-crank 154 which is fixed upon the power shaft P S carries the pin 416 adapted to rest in the slot 414 of the link 413. The arm 411 carries a pin 417 which rests in the slot 418 provided on the intermediate arm 401 of the bell-crank 398. From the above described connection between the power shaft and the bell-crank 398, it will be seen that when the bell-crank 154 is rocked in the direction indicated by the arrow in Fig. 45 when either the adding lever or the subtracting lever is pulled forwardly, the link 413 is forced downwardly. This rotates the sleeve 409 and rocks the connected arm 411 downwardly, whereby the lower arm 399 of the bell-crank 398 is rocked forwardly and draws with it the sliding plate 396. This forward movement of the sliding plate places the springs 391 under tension, as may be seen from Fig. 38.

I will now describe the mechanism which trips the hammers and allows them to be operated at the proper time by the springs 391. On the shaft 419, which is rotatably mounted in the side plates 361 and 362 is fixed the fluted tube or cylinder 420 provided with longitudinal flanges 421 extending radially from the core of the shaft, as best shown in Fig. 38. Each hammer is provided with a tail 422 adapted to be engaged by one of the flanges 421 to hold the hammer in inoperative position. As shown in the plan view in Fig. 47, one end of the shaft 419 extends beyond the side plate 362 of the hammer section and has fixed thereto the disk 423. On the disk 423 are provided a plurality of transverse pins 424 spaced equidistantly from each other, as shown in Figs. 45 and 46. In the specific embodiment illustrated in the drawings the pins on the disk 423 are five in number to correspond with the number of flanges 421 on the cylinder or trip shaft 420. The pins 424 are arranged in longitudinal alinement with the flanges 421. From the sleeve 409 extends the intermediate arm 425. The outer end of this arm carries the pin 426 on which are pivoted the pawls 427 and 428. The pawl 427 has a downwardly extending hook 429 while the pawl 428 has an upwardly extending hook 430. The pawls are arranged in radial alinement with the pins 424. The spring 431 fastened at its ends to the pawls tends to draw the pawls together and thereby hold them against the pins 424. The inward movement of the pawls under the actuation of the spring 431 is limited by the link 432 which is at one end pivoted to the pawl 428 at 433. The pawl 427 carries the perforated lug 434 through which extends the removable pin 435 inserted in the end of the link 432. From the above description it will be apparent that when the arm 425 is rocked downwardly (as explained in the preceding chapter), the hook 429 of the pawl 427 operatively engages one of the pins on the disk 423 and rocks the trip shaft 420 in the direction indicated by the arrow in Fig. 38. This suddenly trips the hammers and allows them to quickly move against the type under the action of the tensioned springs 391—provided the hammers are not otherwise held against actuation, as will presently be described. This sudden movement of the hammers 369 to operative position under the action of the springs 391 produces a sharp blow against the type which is thereby caused to print the proper number on the record sheet through the interposed printing ribbon. When the operative parts return to normal position and the arm 425 is rocked back upwardly, the hook 430 of the pawl 428 operatively engages one of the pins 424 and rotates the trip shaft 420 in the same direction as before to bring the next longitudinal flange 421 into locking engagement with the tails of the hammers. So that at the end of the return movement of the parts the hammers are in the same position as at the beginning of the forward operation of the various parts.

I have already stated that the hammers 369 are provided with transverse pins 371. This pin is normally in engagement with one arm of the associated Y-shaped lever 372. Referring specifically to Figs. 38 and 39, it will be seen that the pin $371^a$ on the units hammer $369^a$ rests against the recessed arm of the units lever $372^a$. Similarly, the pin $371^b$ of the tens hammer rests against the recessed arm of the tens lever $372^b$. And so on with the other pins and levers. It will be seen that this engagement between a hammer and its lever 372 prevents operation of the hammer unless the lever is tripped to release the pin 371. The normal or zero position of the type bars with respect to the hammers is that shown in Fig. 38. It will be seen from this figure that if the hammer associated with the type bar $70^a$ be actuated, the zero type $356^o$ will be struck into printing position. It will also be observed from this figure that rearward movement of the units lever $384^a$ is prevented by reason of the free end of the lever resting against the pin $385^a$ on the units type bar. Suppose now that the units type bar $70^a$ has been operated to bring any one of the nine significant figures into printing position. In this case when the units hammer $369^a$ is released by the trip shaft 420, as previously explained, the pin $371^a$ rocks the Y-shaped trigger $372^a$ and at the same time permits the spring 387 to draw the lever $384^a$ rearwardly. The slotted connection between the arm $377^a$ and the next hammer in the series, namely the tens hammer $369^b$, allows the trigger $372^a$ to be rocked by the units hammer in the manner described. If the units type bar $70^a$ is in zero position, as shown in Fig. 38, the units hammer will not operate under the tension of the connected spring 391, even when tripped, because the trigger $372^a$ is locked against movement by the pin $385^a$. What has just been said about the units hammer applies, of course, to all the other hammers. Although a hammer is not actuated by the connected spring when the corresponding type bar is in zero position, I have provided a carry-over mechanism between the hammers, whereby the action of a hammer is transmitted to the hammer at the right. The purpose of this arrangement is to cause the printing of zeros to the right of the last significant figure of an entry, when that figure is in a higher order row. Suppose the number to be printed is 800. The hundreds type bar $70^c$ will accordingly be operated to bring the figure "8" into printing position, but there will be no operation of the tens and units type bars. When the operating springs 391 have been placed under tension and the trip shaft 420 actuated to trip the hammers, the only hammer that will be operated by its connected spring 391 is the hundreds hammer 369ᶜ. The manner in which the tens and units hammers are actuated to print zeros in the tens and units rows, is as follows:

When the hundreds hammer 369ᶜ is actuated by its connected spring 391 the shoulder 376 engages the transverse lug 378 of the lever 377ᵇ and shifts this lever rearwardly. This causes the connected trigger 372ᵇ to rock in a clockwise direction (as viewed in Fig. 38) and to break contact with the pin 371ᵇ of the tens hammer 369ᵇ. Being thus released the tens hammer is free to operate under the tension of its connected spring 391 and strikes the zero type of the tens type bar to print a zero in the tens column. The actuation of the tens hammer 369ᵇ rocks the units trigger 372ᵃ through the lever 377ᵃ, in the same way that the hundreds hammer rocks the tens trigger. The rocking of the units trigger 372ᵃ releases the units hammer 369ᵃ and the latter is actuated by its connected spring 391 to print a zero in the units row. However, the higher order hammers to the left of the hundreds hammer 369ᶜ are not released for action because the associated triggers 372 are not moved to releasing position. Thus zeros are printed to the right of a significant figure and not to the left.

I will now describe the means for throwing any particular hammer out of operation or "killing" the hammer, as it may be termed in mechanical parlance. On the shaft 394 is slidably mounted the lever 436 by means of the slot 437. The rear end of the lever 436 terminates in a transverse lug 438 which is adapted to engage the cam projection 439 on the guide bar 393 when the lever is pulled forwardly. It is to be understood that there is a lever 436 operatively associated with each guide bar 393. To the forward end of the lever is secured one end of the connecting rod 440 (see Figs. 2, 3 and 38). The other end of each rod 440 is connected to the lower end of a lever H which terminates outside of the casing at the front end of the keyboard, as shown in Figs. 1 and 8. The levers H have already been referred to as the hammer-killing levers in connection with the general description of Fig. 1, as set forth in the foregoing chapter. The levers H are pivoted on the studs 23 carried by the partitions 14, as best shown in Figs. 8 and 25. When the operator pushes any one of the levers H rearwardly the lower end of the lever is rocked forwardly and the connected lever 436 rocks the forward end of the sliding bar 392 downwardly out of engagement with the actuating plate 396. This rocking of the sliding bar 392 into inoperative position is caused by the shoulder 438 on the lever 436 engaging the cam projection 439 on the guide bar 393. In this way it is within the control of the operator to cut out any desired hammer without interfering with the proper operation of the other hammers.

I have also provided means for preventing the release of the triggers 372 by the hammers through the levers 377. To the lower end of each arm 379 is pivoted one end of a rod 441, as shown in Figs. 3 and 38. To the other end of the rod 441 is connected the link 442. The forward end of each of these links is pivotally connected to the lower end of the lever S which projects beyond the top of the keyboard, as shown in Figs. 1, 8 and 25. The levers H and S are arranged in pairs on the keyboard (see Fig. 1), a pair being associated with each row of numeral keys. The levers S which have previously been referred to as the hammer-splitting levers, are pivoted on the studs 23 like the hammer-killing levers H. The keyboard is provided with slots 443 and 444 in which the upper ends of the levers H and S operate. Referring specifically to Fig. 38, it will be seen that if the lever S associated with the units row of keys be operated, the arm 379 is rocked to the left and the shoulder 378 raises the lever 377ᵃ sufficiently to move the lug 378 into the upper or longer portion of the slot 375 out of the path of the shoulder 376. With the lever 377ᵃ in this its inoperative position, the operation of the tens hammer 369ᵇ will not rock the trigger 372ᵃ and will therefore not release the units hammer to print a zero. In the same way will the hammers be split (as it may be properly termed), at any point by simply operating the corresponding hammer-splitting lever S. The splitting of the hammers is always accompanied by a corresponding splitting of the carry-over mechanism for the numeral wheels. The means whereby this operation is effected will be described under a subsequent heading, together with the purpose and object of the splitting operation.

The levers H and S are normally locked against operation by mechanism best shown in Figs. 8, 22 and 25 to which reference will now be had. To the front of the casing near the lower end thereof, is secured the plate 445 which runs transversely of the casing and is provided with slots 446 for receiving the levers H. The levers S are accommodated in the slots 447. The slots 446 and 447 are of considerable depth, as may be seen from Fig. 22. In their normal position the levers H and S are about half way within the slots. On top of the plate 445 is slidably mounted the locking bar 448 provided with hooks 449. As seen from Fig. 22 each of these hooks is adapted to extend across a pair of slots in front of the levers H and S and thereby prevent operation of the levers. A spring 450 abutting at one end against the left side of the casing and at the other against the upturned lug 451 of the locking bar, normally tends to hold the bar in locking position. Near its right end the locking bar 448 is provided with a lug 452 to which is pivoted the lower arm of the bell-crank 453. This bell-crank is pivoted to the stud 454 carried by the front plate of the casing. The upper arm of the bell-crank 453 is rigidly connected with the lever H S which projects out of the casing. When the operator pushes down on the lever H S the bell-crank 453 shifts the locking bar 448 to the left. In this position of the locking bar the hooks 449 are withdrawn from the slots 446 and 447 and the levers H and S are free to operate. After the desired lever H or S has been actuated (which is done while the lever H S is held depressed), the operator releases the lever H S and the locking bar moves back to normal position under the action of the spring 450. This locks the actuated lever H or S in operative position. In Fig. 22 the lever H' is shown in locked operative position, the other levers being locked in unoperated position. To steady the movement of the locking bar 448 a link 455 connects the locking bar with the fixed bracket 456.

I will now describe the ribbon-shifting mechanism which is associated with the printing platen, special reference being made to Figs. 52 to 56, inclusive. The printing ribbon 457 is wound on spools 458 and 459 which are journaled in the side plates 460 and 461 of the frame which supports various parts of the ribbon-shifting and ribbon-reversing mechanism. The side pieces 460 and 461 are at the upper end supported by the shaft 215 and at their lower end rest upon the shaft 364. Slots 463 in the side plates afford a firm seating for the frame on the shaft 364 and at the same time permit the frame to be readily removed from the casing. The lower spool 459 is keyed to the shaft 464 which is journaled in the ribbon frame and extends beyond the sides of the frame. A ratchet 465 is secured to one end of the shaft by the pin 466. On either side of the ratchet 465 is mounted a disk 467 between which is pivoted the pawl 468 on the pin 469. The disks 467 are rotatably mounted on the shaft 464. One side of the spool 459 is provided with a peripheral friction flange 470 which is held against the side piece 461 by the spring 471. This spring is coiled about one of the projecting ends of the shaft 464 and bears at its outer end against the dished washer 472 which is held on the shaft by the pin 473 or any suitable means. The tension of the spring 471 is just sufficient to keep the ribbon taut. The structure shown in Fig. 56 applies equally to the upper spool 458. I will only make special reference to the ratchet 465' and the pawl 468' which are associated with the upper spool 458 and correspond to the ratchet 465 and the pawl 468 of the lower spool. The teeth of the ratchet 465 run in a reverse direction to that of the teeth of the ratchet 465'. So that the pawl 468 actuates the ratchet 465 in a clockwise direction (as viewed in Fig. 52), while the pawl 468' rotates the ratchet 465' in a counter-clockwise direction. The pawls 468 and 468' are connected together by the rod 474 which is rigidly secured to the upturned lug 475 of the slidable bar 476. This bar is at its upper end pivoted at 477 to the plate 478 which is pivotally mounted on the stud 479 fixed upon the side piece 460. A pair of segments or half disks 480 are pivoted on the stud 479. To the pin 481 carried by the segments is pivoted the lever 482 having a hooked end 483. A similar lever 484 is pivoted to the pin 485 carried by the segments 480. A spring 486 connected to these levers tends to draw them together against the upturned shoulder 487 formed on the plate 478. The plate 478 is provided with a slot 488 in which works the pin 489 carried at one end of the slotted bar 490 which extends across the ribbon frame and is slidably mounted thereon. The ends of the slotted bar 490 project through slots 491 in the side pieces 460 and 461. A second slotted bar 490' is slidably mounted in the lower portion of the ribbon frame, the ends of this bar working in slots 491'. In the particular embodiment illustrated, these two slotted bars are each built up of a pair of spaced strips leaving a slot or opening 492 between them. The ribbon 457 is adapted to pass through these slotted bars for a purpose to be presently described. To the ends of the shaft 493, rotatably mounted in the sides of the ribbon frame, are fixed the arms 494 and 495. A link 496 is at one end pivoted to the arm 494 and at the other end is connected to the pin 489 of the slotted bar 490. A similar link 497 is connected at one end to the arm 495 and at the other end to the pin 489$^a$ of the slotted bar 490. The link 498 connects the pin 489 of the slotted bar 490 with the pin 489' of the slotted bar 490', while the link 499 connects the pins 489$^a$ and 489$^{a\prime}$ at the other end of the bars 490 and 490', respectively. The rod 474 which connects the two pawls together passes through the perforated lugs 500 and 501 fixed on the side plate 460. The lug 501 also forms a guide for the slidable bar 476. On the connecting rod 474 between the lug 475 on the bar 476 and the stationary lug 500 is mounted the coil spring 502. A similar spring 503 is mounted on the rod 474 between the lug 475 and the stationary guide lug 501. The tendency of the springs 502 and 503 is to hold the lug 475 substantially midway between the lugs 500 and 501. To the pin 485 on the segments 480 is pivoted the lever 504 having an inturned toe 505 to which is fastened one end of the spring 506. The other end of this spring is secured to the stud 507 carried by the side plate 460. The stud 507 projects at its outer end through the slot 508 in the lever 504. The tendency of the spring 506 is to pull the lever 504 upwardly and thereby hold the segments 480 in either of the two adjusted positions into which they are rocked, as will presently be explained. To the pin 509 fixed on the side piece 460 is pivoted the lever 510 provided with a slotted head 511. The shaft 512 on the free end of the rock arm 214 is arranged to operatively engage the slotted head 511. As previously stated the rock arm 214 is fixed upon the shaft 215 which is operated from the power shaft P S through connections heretofore explained, whenever the adding or the subtracting lever is pulled forwardly. To the slotted head 511 is pivoted one end of the link 513. The other end of this link is pivotally connected to the outer disk 467' at the point 514. To the pin 515' on the outer disk 467', is connected one end of the rod 516, the other end of which is connected to the pin 515 carried by the outer disk 467. From the above description it will be apparent that whenever the arm 214 is rocked rearwardly (to the right as viewed in Fig. 52) the link 513 is pushed upwardly and rotates the disk 467'. This causes the pawl 468', which is pivoted between these disks and is in engagement with the ratchet 465', to rotate the upper spool 458 and thereby shift the ribbon. This operation takes place during the initial movement of the adding or subtracting lever. It should be noted that as long as the pawl 468' is in the operative position, the pawl 468 remains in an inoperative position. The step-by-step shifting of the ribbon by the pawl 468' winds the ribbon from the spool 459 on to the spool 458. To each of the spools is rigidly secured a piece of tape 517 to which is fastened one end of the printing ribbon by means of an ordinary pin 518 or similar suitable means. I have shown this connection only between one end of the printing ribbon and the lower spool 459, but it is to be understood that a similar connection exists between the other end of the ribbon and the upper spool 458. When the ribbon has been wound off the spool 459 the pin 518 encounters the slotted bar 490' and carries the same along with it, the slot in the bar not being sufficiently wide to allow the pin to pass therethrough. This movement of the slotted bar 490' is transmitted to the upper bar 490 through the links 498 and 499. The movement of the slotted bar 490 is in turn communicated to the plate 478 through the slot-and-pin connection previously described. The plate 478 is therefore rocked in a counter-clockwise direction (as viewed in Fig. 52). This causes the shoulder 487 formed on the plate 478 to draw the hooked levers 482 and 484 downwardly until the hook portion 483 of the lever 482 is in the path of travel of the lug 519 on the lever 510. The counter-clockwise rotation of the plate 478 pushes down the sliding bar 476 and with it the connecting rod 474, whereby the upper pawl 468' is moved away from the ratchet 465' and the lower pawl 468 is moved into engagement with the ratchet 465. Consequently, when the rock arm 214 is operated the pawl 468 rocks the spool-shaft 464 in a clockwise direction (as viewed in Fig. 52) and the movement of the ribbon is reversed. When the lever 510 returns to normal position for the first time after the reversal of the ribbon operation, the lug 519 engages the hooked end 483 of the lever 482 and rocks the segments or half disks 480 counter-clockwise against the tension of the spring 506. This brings the point of connection 479 between the segments 480 and the lever 504 to the right of a line adjoining the pivot pin 479 and the stud 507 so that the tendency of the spring 506 holds the segments 480 against clockwise rotation. This prevents the springs 502 and 503 from moving the connecting rod 474 out of actuated position. The step-by-step shifting of the ribbon in a downward direction by the pawls 468 continues until the ribbon has been unwound from the spool 458, whereupon the upper pin 518 will move the slotted bars 490 and 490' downwardly. This rocks the plate 478 in a clockwise direction and shifts the rod 474 upwardly to place the pawl 468' again in operative position. The clockwise rotation of the plate 478 brings the hooked lever 484 into the path of travel of the lug 519 carried by the lever 510. When, therefore, this lever returns to normal position the lug 519 engages the hooked lever 484 and the segments 480 are rocked in a clockwise direction into the position shown in Fig. 52, thereby holding the rod 474 in actuated position. In passing from one roller to the other the ribbon is guided by the rods 520 and 521 which engage the outer side of the ribbon and at the same time serve as connecting rods for the side plates 460 and 461. The guide bar or plate 521$^a$ engages the under side of the ribbon.

In the fore part of the specification I have referred to the locking connections between certain special keys on the keyboard and the printing mechanism whereby the machine cannot be operated when the platen is not in proper printing position. I will now describe these connections in detail, reference being had to Figs. 6, 36, 37, 64 and 65. On the side plates 251 and 252 of the platen carriage are formed downwardly extending arms 522. In the sides of the frame 239 is journaled the shaft 523 to which are fixed the arms 524 carrying the locking bar 525, as best shown in Fig. 66. As shown in Figs. 36, 37 and 64 the locking bar 525 is normally in engagement with the arms 522 and thereby prevents rocking of the platen carriage. On the shaft 275, which as previously stated is journaled in the sides of the casing, is rotatably mounted the bell-crank 526. A link 527 is pivoted to this bell-crank at 528 and to one of the arm 524 at 529. On the transverse shaft 530 journaled in the sides of the casing is fixed a spring locking plate 531 which extends upwardly into engagement with the back side of the arms 522. On the shaft 530 is also fixed the depending arm 532. To the pin 533 on the arm 532 is pivoted one end of the rod 534. To the pin 535 on the bell-crank 526 is pivoted one end of the rod 536. Referring to Fig. 6 it will be seen that the plate 537 is pivotally mounted on the stub shaft 538' fixed to the adjacent side of the casing. The plate 537 is provided with curved slots 538 and 539. The forward end of the rod 534 terminates in a transverse pin 540 which operates in the slot 538, while the rod 536 terminates in a pin 541 which operates in the slot 539. The plate 537 has formed thereon the forwardly extending arm 542 which extends upwardly at its free end. On the pin or stud 544 fixed to the side 2 of the casing is pivoted the locking lever 545 provided at its rear end with a locking shoulder 546. The locking arm 545 is also provided with a transverse lug 543 arranged to be in the path of movement of the upturned end of the arm 542. Referring now to Figs. 35, 36 and 37 it will be seen that on the platen shaft 253 are pivotally mounted the arms 547, one on either side of the platen. Each arm is provided at its rear end with a cam portion 548 adapted to engage the upper edge of the locking bar 525 and move the same downwardly clear of the arms 522 so as to unlock the platen carriage and permit the same to be rocked out of printing position. A spring 549 is connected at one end to each arm and at the other end to the side of the platen carriage whereby the arms 547 are normally held in the position shown in Figs. 36 and 37. The arms 547 terminate each in a finger piece 550 for convenience of manipulation. When the operator rocks the arms 547 in the direction indicated by the arrow in Fig. 36 to unlatch the carriage platen by moving the locking plate 525 downwardly, the link 527 (see Fig. 64) is pushed down and the bell-crank 526 is rocked in a counter-clockwise direction. The rod 536 is thus pushed forwardly and rocks the plate 537 to throw the free end of the arm 542 upwardly against the lug 543 of the locking lever 545. This moves the shoulder 546 of the lever 545 against the roller 110 carried by the disk 108. From the previous detailed description of the disk 108 and its connection with the adding and subtracting levers, it will be remembered that when either the adding or the subtracting lever is operated the disk 108 is rotated in a counter-clockwise direction as indicated by the arrow in Fig. 5. However, with the locking shoulder 546 of the lever 545 against the roller 110 the disk 108 is locked against movement and consequently neither the adding or subtracting lever can be pulled forwardly to operate the machine. From this it will be seen that when the platen 254 has been moved out of printing position, the machine is locked against operation. This prevents the operator from entering an item in the machine without causing the item to be recorded by the printing mechanism. A spring 551 connected at one end to the casing and at the other end to the rod 536 returns the rod 536 to normal position. When the locking bar 525 is moved downwardly out of engagement with the arms 522 of the platen carriage, the spring plate 531 moves forwardly as the carriage platen is lifted, and to a certain extent presses the arms 522 upwardly. In other words, as the platen carriage is raised after being unlatched from the locking bar 525, the spring locking bar 531 follows the movement of the arms 522. This rocks the arm 532 rearwardly and draws the link 534 back until the pin 540 rests in the rear end of the slot 538 of the plate 537. It should be remembered that when the pin 540 is in this position the plate 537 is in the position to which it was actuated by the rod 536. The pin 540 therefore holds the plate 537 in its actuated or locking position and the return of the locking bar 525 does not unlock the machine. If it were not for the locking plate 531 the operator could first unlatch the platen carriage by depressing the bar 525 and then after the locking bar 525 had been returned to normal position, operate the machine with the platen out of printing position, because on the return of the rod 536 the weight of the arm 542 would rock the plate 537 back to normal position and thereby release the locking lever 545. However, the second locking plate 531 locks the plate 537 in actuated position and holds the machine locked even after the return of the locking bar 525. It is therefore impossible to operate the machine when the platen is not in proper printing position. The spring 552 secured at one end to the side of the casing and at the other to the rod 534 returns the latter to normal position.

It may sometimes be desired, however, to operate the calculating wheels without recording the entry by the printing mechanism. To permit this operation I have provided means for rendering the locking action of the spring locking bar 531 ineffective. Referring to Fig. 6 it will be observed that the shaft 18 mounted in the sides of the casing has pivoted thereon the lever 554. To the pin 555 at the free end of this lever is pivoted the special key K as well as the link 556. To the stud 557 fixed in the side of the casing is pivoted the lever 558 which is at its upper end connected with the link 556. The lower end of the lever 558 is in engagement with the lug or block 559 secured upon the rod 534. When the key K is depressed the lower end of the lever 558 is rocked forwardly and carries with it the rod 534. This places the pin 540 of the rod 534 in the forward end of the slot 538 and consequently allows the plate 537 to return to normal position with the rod 536 after the platen carriage has been raised. The notch 560 provided in the stem of the key K engages with the casing and locks the key in depressed position. The return of the plate 537 to normal position allows the rear end of the locking lever 545 to drop, whereby the machine is unlocked and may be operated with the platen out of printing position. The spring 561 is at one end secured to the lug 562 on the lever 554 and at its other end to the key K. This causes the key to snap into locked position when the notch 560 comes into alinement with the top of the casing. As the key K is intended for use only on special occasions and is ordinarily not intended for the operator, I have made the key removable. The lower portion 563 of the key stem is provided with a pin 564. If it is intended that the operator shall not be able to work the machine unless the platen is in printing position, the key K is removed from the machine and would be in the custody of a proper official.

*Total-printing and clearing operations,*
(Figs. 5, 6, 9, 28, 29, 31 and 59.)

I will now describe the operation of the machine when the total is printed or "taken" as it is generally called, and also the operation whereby the calculating wheels are cleared or brought back to zero position. Most of the mechanism by which these operations are accomplished has been described in the foregoing part of the specification. When the operator desires to print the total shown in the numeral keys he first depresses the total key T K and then operates either the adding lever or the subtracting lever. In either case the total is printed. However, when the adding lever is operated in printing the total, the entry in the numeral wheels remains, while the operation of the subtracting lever clears the entry out of the numeral wheels and returns the latter to zero position.

I will first describe the operations that take place when the total key is depressed and the adding lever operated. The total key T K is pivoted to the pin 565 carried by the plate 566 which is secured upon the shaft 45, as shown in detail in Fig. 31. The pin 565 extends over the arm 47 of the sleeve 46 which, as previously described, is rotatably mounted on the shaft 45. On the stud 567 which is fixed to the right side piece of the casing is pivoted the cam plate 568. The link 569 is at one end connected to the cam plate 568 by the pin 570 and at the other end connected to the plate 566 by the pin 571. This is clearly shown in Figs. 5, 6 and 28. The cam plate 568 is provided with a cam slot 572 in which works the pin or roller 573 carried by the arm 574. This arm is rigidly secured upon the shaft 575 which is journaled in the sides of the casing. On the shaft 575 are also fixedly mounted the arms 576. One of these arms is associated with each numeral wheel. Each arm 576 is at its free end provided with a transverse lug or toe 577 arranged in the path of movement of the lug 578 formed on the disk 579 which is secured to one side of each numeral wheel, as by means of rivets. When the arm 576 is in operative position, as shown in full lines in Fig. 29, the toe or shoulder 577 is diametrically opposite the side opening. Normally the arms 576 are in the position indicated in dotted lines in Fig. 29 and shown in full lines in Fig. 9. In this position of the arms 576 the lugs 578 do not encounter the shoulders 577 and the numeral wheels are free to rotate any amount in either direction. When the total key T K is depressed the plate 566 is rocked forwardly drawing with it the cam plate 568 through the link 569. The rocking of the cam plate 568 from the position shown in Fig. 6 to the position shown in Fig. 28, rocks the arm 574 to the position shown in full lines in Fig. 28 in the direction indicated by the arrow. This rocks the shaft 575 in a counter-clockwise direction (as viewed in Figs. 28 and 29) and throws the controlling arm 576 into operative position. The total key T K is held in depressed position by the bell-crank 580 pivoted on the stud 581 which is fixed to the side 2 of the casing. The link 569 is provided with an enlargement 582 which at its rear end terminates in a shoulder 583. When the total key is in its elevated or normal position the front arm of the bell-crank rests on the enlargement 582, as shown in Fig. 6. When, however, the total key is depressed and the link 569 drawn forwardly, the bell-crank snaps into engagement with the shoulder 583 and prevents the return of the total key T K. To the pin 584 on the bell-crank 580 is pivoted the pawl 585. A spring 586 is at one end fastened to the bell-crank 580 and at the other end to the pawl 585 to force the free end of the bell-crank upwardly and at the same time hold the dog 585 against the stop pin 587, which is fixed to the casing. The spring 588 secured at one end to the link 569 and at the other end to the pin 589 on the casing, tends to draw the link 569 rearwardly and thereby return the total key to normal position. To the pin 590 on the link 569 is pivoted one end of the link 591, the other end of which is pivoted at 592 to the arm 593 rigidly fixed upon the rock shaft 172. This is best shown in Figs. 28 and 59. As previously explained, the shaft 172 runs transversely of the machine and is journaled in the sides of the casing. It will be remembered that on the shaft 172 is also rigidly mounted the arm 175 provided with the pin 178 which rests against the bell-crank 174, as best shown in Fig. 60. From this it will be clear that when the link 569 is drawn forwardly on depression of the total key, the shaft 172 is rocked forwardly in the direction indicated by the arrow in Fig. 60. The pin 178 rocks the arm 174ª of the bell-crank 174 upwardly and raises the vertical arm 179. As previously explained the upward movement of the arm 179 raises the cam plate 135, whereby the shaft 173 is rocked to move the numeral wheels into operative position, as shown in full lines in Fig. 29. When, therefore, the adding lever is pulled forwardly, the sectors 70 operate the numeral wheels (as heretofore explained in detail) until the lugs 578 encounter the shoulders 577 on the arms 576. The angular position of the lugs 578 with respect to the numbers on the numeral wheels is such that when the lugs engage the shoulders 577 the numeral wheels stand in zero position as seen through the sight openings. It will thus be seen that in the operation just described each sector is moved upwardly to rotate the associated numeral wheel backwardly to zero position. Consequently, the amount of downward movement of each type bar 70' (see Fig. 9) is proportional to the figure or digit cleared out of the corresponding numeral wheel by the connected sector, and the number printed will correspond with the number taken out of the numeral wheels. When the adding lever returns to normal position under the action of the return springs 102 (as previously explained), the numeral wheels remain in engagement with the sectors 70 and are rotated in the reverse or positive direction the same amount that they are rotated in the negative direction during the upward movement of the sectors. The total is thus retained in the numeral wheels when the adding lever is used in the total-taking operation.

If it is desired to clear the machine when the total is taken, the operator uses the subtracting lever after depressing the total key T K. Under these circumstances the operation is precisely the same as that described in connection with the adding lever, except that during the return movement of the sectors the numeral wheels are out of engagement therewith and are thus left in cleared position. This movement of the numeral wheels to inoperative position during the downward movement of the sectors 70 when the subtracting lever is operated, has been described in detail in the foregoing portion of the specification and need not therefore be repeated here. It will be seen from the above that I have provided very simple means for clearing the machine and that this clearing takes place in one operation with the printing of the total.

The total key controls the locking mechanism of the platen so that it is impossible to clear the machine without printing the number cleared. Referring to Fig. 28 it will be seen that one end of the rod 594 is connected to the arm 593 by means of the pin 595 which works in the slot 596 provided at the forward end of the rod. As shown in Fig. 64 the rear end of the rod 594 is pivoted to the pin 597 on the upper arm of the bell-crank 526. When the total key T K is depressed and the arm 593 rocked forwardly the pin 595 on that arm is moved to the forward end of the slot 596. This prevents rearward movement of the rod 594 and consequently locks the bell-crank 526 against counter-clockwise rotation, (as viewed in Fig. 64). As a result the locking bar 525 is held against downward movement and it is impossible for the operator to unlatch the platen carriage. In this way lifting of the platen carriage is prevented when the total button has been depressed. The total key also locks the keyboard against operation so that it is impossible for the operator to set up on the keyboard a fictitious total. As best shown in Fig. 31 it will be seen that when the total key is depressed the pin 565 forces the restoring bar 48 downwardly over the toes 44 of the error keys E K. This, as previously described in detail, prevents rearward shifting of the restoring plates 25 and thereby prevents operation of the numeral keys.

In order to permit the operation of the sectors 70 when the total is taken it is of course necessary that the zero pins $b^o$ be withdrawn from the path of movement of the controlling arms 65. This is automatically accomplished when the total key T K is depressed through the following connections. To the rock shaft 45 is fixed the arm 598 between the plate 566 and the adjacent arm 47, as best shown in Figs. 31 and 32. Adjacent the other arm 47 is the arm 599, also fixed upon the shaft 45. The arms 598 and 599 are connected together by the rod or roller 600. The plate 566 is provided with a lateral lug or shoulder 601 adapted to engage the arm 598. As seen from Fig. 2, the depending arms 29 which are rotatably mounted on the studs 23 fixed to the partitions 14, (as previously explained), extend into the path of movement of the roller 600. When the plate 566 is rocked forwardly on depression of the total key T K, the lug 601 rocks the roller 600 forwardly and with it the arms 29. Since the zero rods $a^0$ are connected to the arms 29 the forward movement of these arms withdraws the zero pins $b^0$ out of the path of travel of the controlling arms 65.

When the subtracting lever is operated in taking the total the cam plate 135 must be released from its elevated position by the bar 179 just prior to the downward movement of the sectors 70. I have provided the following means for tripping the upright arm 179 at the end of the forward stroke of the subtracting lever. An arm 602 is pivoted at one end on the pin 603 carried by the bell-crank 154, as shown in Fig. 4. The forward end of the arm is adapted to rest on the shaft 16. This arm is provided with a lateral pin 604. The arm 179 which is raised when the total button is pressed, is provided with a lug 605. When the arm 179 is in operated or raised position the lug 605 is in the path of movement of the pin 604. The pin is so arranged that it trips the bar 179 just before the pin 157 on the bell-crank 154 encounters the arm 190. When, therefore, the rear arm of the bell-crank 189 is rocked downwardly at the end of the forward movement of the bell-crank 154, the cam plate 135 is free to be pulled down to normal position.

During the return movement of the operated parts the total key T K is automatically restored to elevated position. On the stub shaft 94, which, (as previously explained) is rotatably mounted on the fixed plate 92, (as shown in Fig. 5) is fixed the arm 606. The arm is provided at its free end with a transverse pin 607. As shown in Fig. 28 the pin 607 is adapted to engage the hooked end of the pawl 585 when the shaft 94 is rocked forwardly. Upon return movement of the shaft 94 the pin 607 draws the pawl 585 rearwardly whereby the bell-crank 580 is tripped out of engagement with the link 569. The spring 588 thereupon draws the link 569 rearwardly and raises the total key T K to normal position. During the rearward movement of the pawl 585 the shoulder 608 thereon rides under the pin 587. This forces the hooked end of the pawl 585 out of engagement with the pin 607, leaving the arm 606, the pawl 585, and the bell-crank 580 in the position shown in Fig. 6.

*Item-storing mechanism*, (Figs. 3, 4, 15, 17, 18, 19, 67, 68 and 69.)

Next in order of description is the item-storing mechanism whereby an item or entry may be stored in the machine without in any way interfering with the normal operation of the machine and whereby the stored item may subsequently be entered into the numeral wheels. As shown in Fig. 3 there is a support 609 secured to the bottom of the machine casing. This support extends upwardly and has firmly seated thereon the lower end of the sector plate 610, the slot 611 of this plate receiving the upper end of the support. This is also shown in Fig. 67. The upper end of the sector plate 610 is provided with a slot 612 for receiving the fixed shaft 18. In this way the plate 610 is rigidly held in place by the shaft 18 and the support 609. It is to be understood that there is one of these sector plates for each row of numeral keys, but as the connected parts associated with each sector plate are the same for all of the plates, it will not be necessary to describe in detail more than one of the sector plates and connected parts. Each sector plate 610 is provided with studs 613 which are notched at 614 to receive the movable plate 615 formed on the rear end of the arm 616. The plate 615 has rigidly secured thereto the ratchet sector 617 by means of the studs or pins 618. The ratchet sector 617 is provided with ten teeth numbered $619^0$ to $619^9$. The plate 615 is provided with an arc-shaped slot 620 in which works the pin 621 carried by the free end of the arm 622. As shown in Fig. 3 the arm 622 is at its rear end formed into a yoke 623. By reference to Fig. 11 it will be seen that each of the sleeve members 58 is provided with an annular groove 624. The purpose of these grooves is to accommodate the yoke-shaped ends 623 of the arms 622. By means of this connection the arms 622 are permitted to slide back and forth without being affected by the rotary movement of the sleeve members 58 which are fixed upon the power shaft P S. On the pin 621 is pivoted the pawl 625 of a width sufficient to span the distance between the ratchet 617 and the fixed plate 610, as best shown in Fig. 68. A spring 626 is at one end connected with the pawl 625 and is at the other end fastened to the lug 627 which raises from the arm 622. The pawl 625 is thus normally held against the teeth of the ratchet by the spring 626. The arm 622 is near its free end provided with a pair of lateral flanges 628, the purpose of which will appear later. The lug 627 terminates in a lateral extension 629 adapted to engage one of the setting up pins $b^1$—$b^9$, when the arm 622 is moved rearwardly a sufficient distance. The rock shaft 630, which is rotatably journaled in the sides of the casing, has rigidly mounted thereon a plurality of arms 631, one for each item-storing section—as each of the plates 610 and associated parts may be properly termed. On the pin 632 carried by the free end of each arm 631 is pivoted the front end of the associated arm 616, as shown in Fig. 3. Near the left end of the shaft 630 is fixed an arm 632$^a$ provided at its free end with a roller 633, as shown in dotted lines in Fig. 4. On the stud 634 fixed to the left side of the casing is rotatably mounted the cam disk 635. A face view of this disk is shown in Fig. 18 from which it will be seen that the disk is provided with a cam groove 636. It is in this groove that the roller 633 is arranged to work. The cam disk 635 is provided with the pin 637 to which is fastened one end of the spring 638. The other end of this spring is secured to the pin 639 carried by the side of the casing. The tendency of the spring 638 is to rock the cam disk in a clockwise direction, as viewed in Fig. 4. Rotatably mounted on the stud 634 opposite the cam disk 635 is the arm 640 which is provided with the cam slot 641. The roller 633 of the arm 632 extends into the cam slot 641. The key I R is at its lower end pivoted to the arm 640 by means of the pin 642. When this key is in normal or elevated position the roller 633 rests in the lowermost portion of the slot 641. A spring 643 secured at one end to the key I R and at the other end to the side of the casing tends to hold the key in elevated position. On the stud 644 fixed to the left side of the casing are pivoted the lever 645 and the double bell-crank 646. As best shown in Fig. 19 the vertical arm of the double bell-crank 646 terminates in the hooked portion 645. The upper end of the lever 647 terminates in the fingers 648 and 649 which form a yoke or fork. To the arm 650 of the double bell-crank 646 is fastened one end of the spring 651. The other end of this spring is attached to the pin 652 which is fixed to the left side of the casing. The spring 651 holds the upper end of the bell-crank 646 against the stop pin 653 fixed in the side of the casing. The lever 645, is provided with a transverse flange 654 adapted to engage the bell-crank 646. The spring 655 fastened at one end to the arm 656 of the double bell-crank 646 and at the other end to the extension 657 of the lever 645, holds the flange 654 against the double bell-crank. In the normal position of the parts the finger 649 of the lever 645 rests against the stop pin 653. The arm 656 of the double bell-crank is provided with a transverse pin 658 the purpose of which will be presently explained. A lever 659 is pivoted on the stud 660 secured to the left side of the casing. The rear end of this lever carries a pin 661 to which is pivoted the lower end of the key I K. The spring 662 which is at one end fixed to the casing and at the other end to the rear portion of the lever 659 tends to depress the forward end of the lever. The forward end of this lever is provided with a hook portion 663 and a second hook portion 664. The hook portion 663 is adapted to engage the pin 665 carried by the cam disk 635. The hook portion 664 is adapted to engage the stop pin 653.

The operation of the item-storing mechanism will now be understood from the above description. When the operator desires to store a certain entry or amount indicated by the numeral wheels, he pulls the crank I L forwardly. This crank, it should be stated, is rigidly connected with the shaft 634. This operation of the lever I L rotates the cam disk 635 in the direction indicated by the arrow in Fig. 4, until the pin 665 strikes the fork or yoke of the lever 645. This not only arrests the movement of the cam, but the latter is locked against return movement by the engagement with the pin 665 of the hooked end 647 of the double bell-crank 646. This forward movement of the cam disk rocks the arm 632 and the shaft 630 rearwardly or in a clockwise direction, as viewed in Figs. 3 and 4. The connected arms 616 are thereby pushed rearwardly, which motion is toward the right as viewed in Fig. 3, and toward the left as viewed in Fig. 67. During this rearward movement of the arms 616 the plates 615 slide in the notches of the lugs 613 which are carried by the fixed sector plates 610. Since the pin 621 of the arms 622 engage the slots 620 of the plates 615 the rearward movement of the arms 615 is accompanied by a corresponding rearward movement of the arms 622. This rearward movement of the arms 622 places the lateral flanges 628 into alinement with the pins 160 carried by the controlling arms 625, as previously explained. In other words when the arms 622 are in actuated position the pins 160 are situated in the channels formed by the pairs of flanges 628. It is to be understood that when the arms 622 are thus operated by the forward movement of the crank I L, the controlling arms 65 stand in zero position. It will therefore be seen that the purpose of moving the arms 622 rearwardly is to lock them to the associated controlling arms 65 by means of the pins 160 and the flanges 628. After the crank I L has been drawn forward to the limit of its movement, the total button T K is depressed and either the adding or the subtracting lever is operated. As explained in detail in the preceding chapter, the depression of the total key and the subsequent operation of the adding lever or the subtracting lever, moves each arm 65 upwardly an amount corresponding to the figure indicated by the associated numeral wheel. The rotation of the controlling arms 65 is accompanied by the rotation of the arms 622 by virtue of the previously described connection between these two sets of arms. As the arms 622 move upwardly the pawls 625 ride up the ratchets 617. The number of ratchet teeth which the dog 625 of a given arm moves upwardly during this item-storing operation is the same as the number indicated by the corresponding numeral wheel. Thus, if the numeral wheel associated with the arm 622 shown in Fig. 67 stood at "8" when the adding or subtracting lever was operated, the dog 625 of that arm will engage the eighth tooth of the ratchet, namely, the tooth marked 619⁸. It may therefore be truly said that the item-storing arms 622 set up the number indicated by the numeral wheels. The dogs 625 retain the arms 622 in their actuated position. As the bell-crank 154 reaches the limit of its forward movement the inclined end 666 of the rod 602, which is pivoted to the bell-crank, engages the pin 658 on the double bell-crank 646. The pin rides up on the inclined end 666 and the double bell-crank 646 is rocked in a counter-clockwise direction, as viewed in Figs. 4 and 19. This releases the pin 665 of the cam disk 635 and allows the spring 638 to draw the cam disk 635 in a clockwise direction, as viewed in Fig. 4. This clockwise or reverse rotation of the cam disk rocks the arm 632 forwardly, whereby the arms 616 and 622 are pulled forwardly to their normal position. This moves the flanges 628 out of the path of travel of the pins 160 carried by the controlling arms 65 so that the latter are free to return to normal position during the return movement of the adding or subtracting lever. The arms 622, however, are retained in their actuated position and thus store the item or number indicated by the numeral wheels. The reverse or clockwise rotation of the cam disk 635 is arrested when the pin 665 enters the hook-shaped portion 663 of the lever 659. The choice of the adding or subtracting lever during this item-storing operation depends upon whether the total stored is to be retained in the numeral wheels or whether it is to be cleared therefrom. This is explained in detail in the preceding chapter and need not be repeated at this point.

To enter the stored item into the numeral wheels the operator first depresses the key marked I K. This releases the pin 665 from the lever 659 and permits the cam disk 635 to be rotated in a clockwise direction. While holding the key I K depressed the operator turns the crank I L toward the rear one complete revolution. This rotates the cam 635 one complete revolution in a clockwise direction, as viewed in Fig. 4. The movement of the cam is arrested when the pin 665 again engages the hook portion 663 of the lever 669. It is to be understood that after the crank I L has been given its initial rearward movement the key I K is released so as to bring the hook portion 663 of the lever 659 into the path of travel of the pin 665. During this clockwise rotation of the cam the arm 632 and with it the shaft 630 are rocked rearwardly a greater amount than during the item-storing operation. The connected arms 616 and 622 are therefore shifted toward the rear sufficiently to cause the lateral extension 629 on the arms 622 to draw the alined setting up pins $b^1$ to $b^9$ rearwardly into operative position, just the same as if the corresponding numeral keys had been depressed to operate the setting-up pins. It will thus be seen that the rearward operation of the crank for one complete revolution produces an automatic set-up on the keyboard representative of the number which had previously been entered in the item-storing mechanism. This complete revolution of the cam disk 635 is not prevented by the hooked end 647 of the double bell-crank 646, because when the pin 665 engages the finger 648 of the lever 645 the latter is forced to the left by the pin 665. Since the lateral flange 654 is adapted to engage the bell-crank 646, the hooked end 647 is forced to the left simultaneously with the finger 648 out of the path of movement of the pin 665. When the operator returns the crank I L to its initial position by giving it one complete revolution in the reverse direction the arms 622 are drawn forwardly until the dogs 625 encounter the rear edges of the plates 610. This trips the dogs out of engagement with the ratchet teeth and allows the arms 622 to fall to the bottom of the slots 620. The operator then actuates either the adding lever or the subtracting lever according as to whether the stored item is to be entered positively or negatively into the numeral wheels. The operation of the adding or subtracting lever actuates the numeral wheels in the manner previously explained to enter the number which had been stored in the item-storing mechanism.

It should be observed that the item-storing mechanism does not in any way interfere with the operation of the machine to add or subtract any set up made on the keyboard. A number may be retained in the item-storing mechanism for any length of time and returned into the numeral wheels at any time desired.

*Operation of special keys P K and R K,* (Figs. 4, 6, 7, 28, 45, 47 and 58.)

By reference to Fig. 6 it will be observed that the printing key P K is slidably mounted on the keyboard between guideways 670 secured to the top of the casing. The stem of the key P K is provided with a cam portion 671 adapted to engage the roller 672 carried at the upper end of the arm 673. The horizontal arm 674 is integral with the vertical arm 673 and the two constitute a bell-crank which is pivoted on the stud 675 carried by the right side of the casing. The horizontal arm 674 is provided with a hooked end 676 adapted to engage the pin 110 on the disk 108 when the arm is moved upwardly. A spring 677 is at its upper end secured to the side of the casing and at the lower end to the horizontal arm 674 and tends to rock this arm upwardly. The key P K is removable from the keyboard. It will be clear from Fig. 6 that when the key is withdrawn, the hooked end 676 is rocked upwardly by the spring 677 into engagement with the pin 110. This positively locks the disk 108 against movement, so that the machine becomes locked against operation. In this way I have provided a very simple means for preventing unauthorized or malicious tampering with the machine. If for instance, the operator wants to lock his machine when he leaves it at noon or at the end of the day's work, he simply pulls out the key P K whereby the machine becomes automatically locked against all operations.

The lower end of the key P K is slotted and is adapted to fit over the pin 678 on the bell-crank plate 679. The stud 680 fixed to the side 2 of the casing affords a pivot for the bell-crank plate 679. The link 681 is at its front end conencted to the rod 556 through the pin 682 carried by the bell-crank 558. The rear end of the link 681 is pivoted to the arm 683 which is fixed upon the rock shaft 684. As shown in Fig. 7 the shaft 684 is journaled in bearings 685 secured to the bottom of the casing. The opposite end of the shaft 684 from that to which the arm 683 is fixed, has rigidly connected thereto the arm 686, as shown in Figs. 6, 45 and 47. The link 687 is at one end pivoted to the arm 686 and at the other end to the arm 688, which is rotatably mounted on the shaft 408, as shown in Fig. 47. A link 689 is at one end joined to the arm 688 and at the other end to the lever 413. A depending arm 690 is rigidly fixed to the side of the casing and is at its lower end provided with a lateral pin 691 arranged in the path of movement of the slot 415 on the lever 413. A spring 692 is at one end connected to the link 681 and at the other end to the upper arm of the bell-crank plate 679. When the printing key P K is depressed the bell-crank plate 679 is rocked forwardly and the spring 692 placed under tension. The spring therefore draws the link 681 forwardly and rocks the shaft 684 in a clockwise direction, as viewed in Figs. 6 and 45. This movement of the shaft shifts the lever 413 away from the pin 416 into engagement with the pin 691. It will be seen from Fig. 45 that this movement of the lever 413 breaks the connection between the power shaft P S and the shaft 419 on which the fluted trip shaft 420 is fixed, whereby the printing hammers are locked against operation. When the printing key is released the spring 692 restores the connected parts to normal position.

The bell-crank plate 679 is at its front end provided with the cam slot 693 in which works the roller 694 carried at the free end of the arm 695. This arm is fixed upon one end of the previously mentioned shaft 193 journaled in the sides of the casing. Near the other end of the shaft 193 is fixed the arm 696, as shown in Figs. 4 and 58. A link 697 is at one end connected to the arm 696 and at the other end to the arm 698 rotatably mounted on the shaft 136. The free end of the arm 698 is provided with the roller 699 which normally rests against the link 142. From the above described connections between the bell-crank plate 679 and the arms 698 it will be clear that when the printing key P K is depressed the arm 695 is rocked forwardly and draws with it the arm 698. This causes the roller 699 to move the link 142 forwardly out of the path of the pin 157 on the bell-crank 154. This prevents the elevation of the cam plate 135 into operative position and the numeral wheels therefore remain in an inoperative position when the power shaft is actuated by either the adding lever or the subtracting lever. In this way it is possible to print a number on the record sheet without entering the same into the calculating wheels. This would be necessary in cases where a number is printed only for identification purposes—as for instance, the number of a freight car or a schedule or the like. Obviously such a number is not to be entered into the calculating wheels. To print such an identifying number the operator has only to depress the printing key P K before operating the adding lever. The advantages and utility of this feature of my invention will be apparent to those skilled in the art and will require no further explanation. It should be observed that the above arrangement dispenses with the necessity of separate or special keys for printing identifying numbers, but the same set of keys is used for making numerical entries in the numeral wheels and identifying entries on the record sheet.

In addition to the two functions above described, the printing key also performs a third function, namely that of controlling a special printing device to indicate on the record sheet that a printed number is for identification purposes only. For the sake of clearness I have reserved the description of this third function of the printing key P K for a subsequent chapter.

Coming now to the general repeat key R K, the purpose of this key is to render the restoring mechanism inoperative for the entire keyboard so that the same set up may be retained any number of times. Referring to Figs. 6 and 28 it will be seen that the repeat key R K is at its lower end pivoted on the pin 700 carried by the lever 701 which is pivoted to the stud 702 secured to the side of the casing. The rear end of the lever 701 carries a transverse pin 703 adapted to engage the rear end of the hook 167 previously referred to. When the general repeat key R K is depressed, the pin 703 throws the hook 167 upwardly and removes the same out of the path of travel of the pin 164 carried by the arm 163. When therefore the arm 163 returns to normal position, the hook 167 is not actuated and the restoring bar 48 is not rocked downwardly, whereby the depressed keys are not restored to normal position. When the repeat key R K is depressed the slot 704 engages the cover of the casing to hold the key in depressed position. A spring 705 secured at one end to the side of the casing and at the other to the key R K restores the latter to elevated position when the slot 704 is released from the casing.

*Operation of splitting carry-over mechanism and printing hammers*, (Figs. 1, 9, and 25.)

In a previous chapter I have described in detail how the operation of the levers S splits or divides the hammer section at a point determined by the particular lever which is operated. I will now describe in detail the connections whereby the operation of the lever S also splits the carry-over mechanism of the numeral wheels at a point corresponding to that where the hammer section is split. Referring to Fig. 9 it will be seen that the rod 706 is slidably supported at the rear end on the roller 707 and at the front end on the slotted lug 708 fixed on the plate 202. The roller 707 is supported on the plate 203. It is of course to be understood that each pair of section plates 202 and 203 of the carry-over mechanism has associated therewith a rod 706. The front end of the rod 706 is looped or perforated to receive the downwardly extending end 709 of the rod 702. As shown in Fig. 25 the rod 702 is at its front end pivoted to the associated lever S. Each of the rods 702 is at its rear end provided with an indicating pointer 710. When any one of the levers S is operated the connected rod 702 is pushed rearwardly and with it the rod 706. This places the free end of the rod 706 into engagement with the transverse lug or shoulder 711 formed on the arm $210^d$ of the double bell-crank 210. This locks the bell-crank of that particular section against actuation, even when released by the rod 213 and the bell-crank 218. The locking of any particular carry-over section also locks the sections to the left by rendering them inoperative because the carrying operation takes place from right to left,—that is to say, from a lower order to a higher order. This was fully explained in the chapter on the carry-over mechanism. When a lever S is operated the pointer 710 on the connected rod 702 is brought into view, as shown in Fig. 1, so that the operator may know at what point the carry-over mechanism and hammer section are split.

I will now describe how the keyboard is divided into two independent sections by the operation of one of the levers S. Let it be supposed that the lever $S^6$ of the sixth order (see Fig. 1) is operated. This locks the sixth section of the carry-over mechanism and prevents the carrying from the sixth to the seventh section. Or, as viewed in Fig. 1, the locking of the sixth carry-over section prevents the carrying from numeral wheel $n^6$ to numeral wheel $n^7$. At the same time the hammer section is split at a corresponding point so as to prevent the hammers to the right of the seventh order hammer from printing zeros. This was fully explained in the chapter on the printing mechanism. To illustrate: Suppose the operator actuates the "3" key in the eighth order; the "6" key in the seventh order; the "1" key in the third order; the "4" key in the second order and the "8" key in the first or units order, and then operates the adding lever A L without operating any of the levers S, the printing mechanism will print this set-up as follows, on the record sheet:

36000148.

The indicating wheels will show the same number. Suppose now that with this same set-up the operator actuates the sixth order lever $S^6$ and then turns the adding lever. The set-up will now be printed by the printing mechanism as follows:

36   148.

The zeros are not printed in the second instance to the right of the seventh order hammer because the operation of the lever $S^6$ split or divided the hammer section between the sixth and seventh order hammers. The indication of the numeral wheels in the second instance will be the same as in the first, because the numeral wheels of the fourth, fifth and sixth order remain at zero in both cases. It will be clear from this that in the particular instance illustrated the machine is split or divided into two independently operable sections. The seventh and eighth order keys can be used for one account and the other rows of keys for the second account. The numeral wheels and printing hammers associated with the seventh and eighth order of keys are not affected by the operation of the other numeral wheels and printing hammers. In the second instance above illustrated the number "36" might be some identifying number—such as the number of the account against which "148" has been entered. To illustrate how the splitting of the carry-over mechanism divides the numeral wheels into two independent sections: Suppose that the carry-over mechanism is split between the sixth and seventh order sections by the operation of the sixth order lever $S^6$ and that the indication of the eight numeral wheels reads:

36999999.

In this case the righthand section of the numeral wheels, represented by the first to the sixth order wheels, has reached the limit of its capacity and should the operator enter say a "1" into this section of the machine, the first six numeral wheels would each show zero while the seventh and eighth order of wheels would remain unaffected and show "36" the same as before. In effect the seventh order numeral wheel in the example just illustrated is the units wheel of the lefthand section of the numeral wheels. This division of the numeral wheels and printing hammers into independent sections renders it possible to automatically indicate and print the numbers of the items entered into the machine. By rotating the error key $E^7$ of the seventh order (see Fig. 1) to the "R" or "repeat" position, and depressing the "1" key of the seventh row, the numeral wheels $n^7$ and $n^8$ will operate as a counter for automatically counting the items as they are entered into the machine—it being supposed of course that the lever $S^6$ has been operated to divide the numeral wheels and printing hammers as previously explained. The adjustment of the error key $E^7$ to the "R" position retains the set-up "1" in the seventh row of keys so that at every operation the numeral wheel $n^7$ is advanced one unit.

I have not attempted to set forth all of the advantages resulting from the splitting feature of my invention, nor have I thought it necessary to describe all of the various uses to which the invention may be put as a result of this feature, inasmuch as such other advantages and uses will readily suggest themselves to those skilled in the art.

*Mechanism for printing explanatory characters*, (Figs. 2, 3, 44, 57, 58, 61, 62 and 63, 70 to 74 inclusive.)

I have provided mechanism for printing explanatory characters in connection with certain entries. In the particular embodiment illustrated this special printing mechanism, as it may be called, is operated: First, when a negative item is entered to indicate that the item is to be subtracted; second, when a number is entered which is only for identifying purposes, to indicate that this number is to be eliminated in totalizing the numerical entries; third when a total has been cleared and a new item entered into the numeral wheels, to indicate that the numeral wheels were cleared when that total was taken and that the new item is the first one after a cleared total. Referring to Fig. 44 which shows a face view of the type bar carrying the explanatory characters the "—" is printed adjacent an item whenever the subtracting lever is operated; the "E" is printed whenever the printing key P K is operated to print an identifying number which is not to be entered into the numeral wheels; "□" is printed whenever a total is cleared out of the numeral wheels, and also in connection with the first item entered after the cleared total.

As shown in Fig. 57 the sector-shaped type bar 712 carries at its free end the three type pieces $t^1$, $t^2$ and $t^3$, representing respectively the three characters shown in face view in Fig. 44. These type pieces are mounted in the bar 712 similar to the type pieces 356 in the type bars 70', as previously explained in connection with Fig. 9. The lower end of the type bar 712 has connected thereto one end of the spring 713 which is at its other end fastened to a lug on the transverse bar 381. The tendency of the spring 713 is to move the type bar 712 upwardly. A pair of grooved guide rollers 714 are pivoted on studs 715 fixed to the side plate 361 of the hammer section. The type bar 712 is arranged to move between the guide rollers in the arc of a circle. A stud or roller 716 is fixed near the lower end of the type bar 712 to engage the lower arm of the bell-crank 717 which is pivotally mounted on the rod 373 carried by the side plates 361 and 362. The upper end of the bell-crank 717 is adapted to engage the pin 718 on the arm 719 formed at one end of the sleeve 720, as perhaps best shown in Fig. 71. The sleeve 720 is rotatably mounted on the shaft 721 which is at one end supported by the fixed plate 92. A standard 722 fixed to the bottom of the casing forms the support for the other end of the shaft 721 and the sleeve 720. As shown in Figs. 7 and 71, the fixed standard 722 is situated adjacent the side plate 361 of the hammer section. The rock shaft 723 is at one end journaled in the fixed plate 92 and at the other end in the side plate 361 in the standard 722. The sleeve 724 is rotatably mounted on the shaft 723, the right end of this sleeve (as viewed in Figs. 7 and 71) being journaled in the standard 722. The sleeve 724 is at one end provided with an arm 725 having a hook-shaped end 726 (see Fig. 72). The adjacent end of the shaft has fixed thereto the arm 727 which terminates in a hook-shaped portion 728 having recesses 728$^a$, 728$^b$ and 728$^c$, as best shown in Figs. 62 and 63. The pin 716 on the type bar 712 extends through the side plate 361 and terminates in an extension 729 arranged to engage the hook-shaped ends of the arms 725 and 727. The side plate 361 is provided with an arc-shaped slot 730 (see Fig. 3) for accommodating the pin extension 729. At its other end the sleeve 724 has fixed thereto the arm 731 which carries the roller 732. The same end of the shaft has rotatably mounted thereon the plate 733 having an arm 734 which carries at its free end the roller 735. An arm 736 is fixed upon the shaft 723 between the plate 733 and the arm 731. The arm 736 is at its free end provided with transverse pin 737 arranged to work in the slot 738 on the plate 733. This is best shown in Fig. 72. A plate 733 has formed thereon the extension 739 which carries the pin 740. A pair of arms 741 and 742 are pivoted on the pin 740. These arms are rigidly connected together and operate as one piece. A spring 743 (see Fig. 73) is at one end fastened to the extension 739 and at the other end to the arms 741 and 742 to normally hold these arms in the position shown in Figs. 70 and 72. The extension 739 is provided with a pin 744 which is connected to the slotted end of the link 745, as shown in Fig. 70. The elongated slot 746 formed at the lower end of this link is adapted to engage the pin 744. The upper end of the link 745 is connected to the pin 747 carried at the free end of the arm 748 which is fixed upon the shaft 575. A dog 749 is pivoted on the pin 750 carried by the plate 92. One end of the spring 751 is fastened to the dog 749 while the other end of the spring is secured to the lug 752 formed on the plate 733. The dog 749 is arranged to rest at its free end upon the arm 753 of the plate 733. On the pin 754 carried by the plate 92 are pivoted the bell-cranks 755 and 756 which terminate at their lower ends in cam portions 755$^a$ and 756$^a$, respectively. As best shown in Fig. 71 the bell-crank 755 is arranged to engage the roller 732 only, while the bell-crank 756 is arranged to simultaneously engage both of the rollers 732 and 735. A link 757 is at one end connected to the upper terminal of the bell-crank 755 while the other end thereof is connected to the pin 128 carried by the arm 79. It has already been explained that the arm 79 is fixed upon the subtracting shaft S S. A link 758 is at one end joined to the upper terminal of the bell-crank 756. The other end of the link 758 is connected to the free end of the arm 759 which is fixed upon the transverse shaft 193. The arrangement of the arm 759 on the shaft 193 relative to the other arms fixed upon that shaft, is best shown in the plan view of Fig. 58. The trip rod 760 which is pivoted at one end on the pin 85 carried by the arm 82 is provided with the hook portions 760$^a$ and 760$^b$. The sleeve 720 is at one end provided with a pair of arms 761 connected together at their outer ends by the pins 762. The free end of the trip rod 760 is arranged to enter between the arms 761 so as to operatively engage the pin 762 and hold the same in the hook portion 760$^a$.

The operation whereby the above described connections actuate the special printing device, is as follows:

I will first take up the operation whereby a minus sign is printed when an item is entered by means of the subtracting lever. When the subtracting lever is drawn forwardly the link 757 rocks the bell-crank 755 in a clockwise direction, as viewed in Fig. 70. This brings the cam portion 755$^a$ into contact with the roller 732 and forces the arm 731 upwardly. This raises the arm 725 through the medium of the sleeve 724 to which the arm 731 and 725 are rigidly connected. The raising of the arm 725 out of contact with the pin 729 of the type bar 712 unlocks the latter for subsequent movement. During the forward movement of the arm 82 by the subtracting lever the trip rod 760 rocks the arms 761 in the direction indicated by the arrow in Fig. 70, and thereby the sleeve 720. The arm 719 which is rigidly connected with the sleeve 720 is therefore rocked in the direction indicated by the arrow in Fig. 57 and the bell-crank 717 is released. This causes the spring 713 to rock the type bar 712 upwardly until the pin extension 729 engages the recess 728$^a$ of the arm 727, as shown in Fig. 63. In this the first operative position of the type bar 712 the type piece $t^1$ is brought into printing position to print the minus sign (—). It is to be understood that with the type bar 712 there is associated an actuating hammer the same as with each of the tye bars 70'; as shown in Fig. 38 and described in detail in the foregoing chapter on the printing mechanism. I have not though it necessary to illustrate the hammer associated with the type bar 712 since that would be substantially a duplication of what is shown in Fig. 38. When the printing hammers are operated to print a number set up on the keyboard a minus sign will be printed opposite the number which constitutes the entry. This is indicated at M in Fig. 61 which represents part of a record sheet. During the return movement of the arm 82 the trip rod 760 rocks the arm 719 back to normal position, whereby the type bar 712 is forced down to its original position by the bell-crank 717. The return movement of the type bar 712 does not begin until after the printing hammers have been actuated.

The printing of the character "E" takes place when the printing key P K is depressed to prevent the numeral wheels from being thrown into operation when the adding or subtracting shaft is actuated. As previously stated the printing key P K is used when a number to be printed is not one that enters into the process of addition or subtraction, but is a number for identification purposes only. How the depression of the printing key P K prevents the numeral wheels from being thrown into operative position with respect to the sectors 70 has already been explained in detail in the preceding chapter and need not therefore be repeated at this point. It will only be necessary to describe here how the operation of the type bar 712 is controlled by the printing key. When the printing key P K is depressed the shaft 193 is rocked, through the connections previously described, in the direction indicated by the arrows in Figs. 6 and 70. This rocks the arm 759 forwardly (toward the right, as viewed in Fig. 70), whereby the bell-crank 756 is rocked to throw the cam portion 756$^a$ against the alined rollers 722 and 735. The resultant rocking of the arms 731 and 734 raises the arm 725 out of engagement with the pin 729 on the type bar 712 and simultaneously raises the arm 727 sufficiently to bring the recess 728$^b$ into the path of movement of the pin 729. Consequently, when the type bar 712 is rocked upwardly by the spring 713 on the return movement of the arm 82, as previously explained, the movement of the type bar is not arrested until the pin 729 engages the recess 728$^b$. When this occurs the "E" type piece $t^2$ is in printing position, and the character "E" will therefore be printed opposite the entry. Such an explanatory entry is indicated at "X" in Fig. 61.

The total key T K controls the operation of the type bar 712 as follows:

When the total key T K is depressed in adding the total, the arm 574 is rocked in the direction indicated by the arrow in Fig. 28, thereby causing the shaft 575 to rock in the same direction. This movement of the shaft 575 is communicated to the arm 748 as indicated by the arrow in Fig. 70. The connected link 745 is therefore raised, rocking the plate 733 in the direction to throw the extension 739 upwardly. This movement of the plate 733 is transmitted to the shaft 723 through the medium of the pin 737 and the arm 736 which carries the pin and which is fixed upon the shaft 723. The amount of rotation which is thus imparted to the shaft 723 is sufficient to raise the arm 727 so as to bring the recess 728$^c$ into the path of travel of the pin 729. When the subtracting lever is operated after the depression of the total key the arm 725 is raised out of engagement with the pin 729 and the type bar 712 is actuated upwardly, as described in the foregoing portion of this chapter. The upward movement of the type bar 712 continues until the pin 729 engages the outermost recess 728$^c$ of the arm 727. When this occurs the type piece $t^3$ having thereon the character "□" stands in printing position. It will be remembered from the description set forth in a previous chapter that when the total key T K is depressed and the subtracting lever then operated, the total indicated by the numeral wheels is printed and at the same time cleared out of the numeral wheels. Every cleared total is indicated by the character "□", as shown at T in Fig. 61. When the adding lever is operated after the depression of the total key to print the total without clearing the same from the numeral wheels, the type bar 712 is not operated. A retained total is indicated at "R" in Fig. 61. The character "□" is also used in connection with the first item entered after the total has been cleared. This is done by preventing the return of the locking arm 719 during the rearward movement of the trip rod 760. When the extension 739 on the plate 733 is raised upon depression of the total key, the arm 741 is thrown up into the path of the rod 760. At the same time the arm 753 of the plate 733 is rocked into engagement with the shoulder 763 on the pawl 749, whereby the plate 733 is held in actuated position. As the trip rod 760 moves rearwardly the hook portion 760$^b$ engages the free end of the arm 741, thereby rocking this arm and raising the trip rod 760 out of engagement with the pin 762. This prevents the shaft 721 and consequently the arm 719 from being moved back to original position. When the arm 741 is rotated about the pivot 740 by the trip rod 760, the arm 742 is also raised and comes into contact with the free end of the pawl 749. The latter is thus tripped out of engagement with the arm 753, with the result that the plate 733 drops down to normal position. This also lowers the trip rod 760. When this occurs, however, the hook portion 760$^a$ is moved beyond the pin 762 and continued rearward movement of the trip rod 760 produces no motion of the arms 761. The type bar 712 is therefore left in its previously actuated position. When the next item is entered in the machine the character "□" is printed the same as when the total was taken and cleared. Such items are indicated at N in Fig. 61.

While I have described and illustrated one specific embodiment of my invention, it is to be understood that various changes and modifications may be made by those skilled in the art without departing from the scope of the invention as defined in the appended claims. Furthermore, it is obvious that certain features of my invention may be used without certain other features.

Having thus described my invention what I claim as new and desire to secure by Letters Patent of the United States is:

1. In a calculating machine, the combination of a series of numeral wheels, means for selectively operating the same predetermined amounts, carrying over mechanism, means for printing the amounts indicated by said wheels including means for filling in zeros, means for splitting said carry over mechanism, and means for splitting said zero filling mechanism, said last two mentioned means being operated by a single means.

2. In a calculating machine, the combination of a series of numeral wheels, means for selectively operating the same predetermined amounts, carrying over mechanism, means for printing the amounts indicated by said wheels including means for filling in zeros, and means for simultaneously splitting said carry over mechanism and said zero filling mechanism for the purpose described.

3. In a calculating machine, the combination of a series of numeral wheels, means for selectively operating the same predetermined amounts, carrying over mechanism, means for printing the amounts indicated by said wheels including means for filling in zeros, and means for simultaneously splitting said carry over mechanism and said zero filling mechanism, and means adjustable to a repeat position to cause the repeating of any number depressed in its respective row whereby the numeral 1 may be depressed in the row to the left of the split and the section corresponding to said last mentioned row will act as an automatic counter.

4. In a calculating machine, the combination of a series of numeral wheels, a toothed sector associated with each numeral wheel for operating the same a predetermined amount, a key-controlled arm associated with said sector for controlling the operation thereof, a pin-and-slot connection between each sector and its arm to permit a one-space movement of the sector in either direction independently of the associated arm, means for normally locking each sector and its arm together for simultaneous operation, connections between the numeral wheels and said locking means, whereby a lower-order wheel on passing through zero automatically releases the sector of a higher-order wheel to carry one unit into the higher-order wheel, said connections including a pair of normally interlocked bell-cranks, one of which is connected with the associated numeral wheel and the other with said locking means, so that the numeral wheel trips the connected bell-crank and thereby releases said other bell-crank to render the locking means ineffective.

5. In a calculating machine, a series of numeral wheels each having associated therewith a toothed sector, an arm associated with each of said sectors, and releasable means for locking each of said sectors and its respective arm together, said means comprising a pair of normally interlocked bell-cranks, one of which is arranged to be operated as its associated numeral wheel rotates through zero and in turn release the other bell-crank, a pin-and-slot connection between each sector and its respective arm, the pin being released for movement in said slot by said other bell-crank whereby to permit a one-space movement of said sector with relation to said arm.

6. In a calculating machine, a numeral wheel having a toothed sector associated therewith, a stop nose arm associated with said sector to normally move therewith, a pin and slot connection between said sector and said arm to permit a one-space movement of the sector in either direction independent of said arm, and means including a pair of normally interlocked bell cranks for operating said connection to permit said one-space movement.

7. In a calculating machine, the combination of a series of calculating members, an adding lever for actuating said members in a positive direction, a subtracting lever for actuating said members in a negative direction, and a key for causing said adding lever to actuate the calculating members in a negative direction.

8. In a calculating machine, the combination of a series of calculating members, a pivotally mounted sector associated with each member for actuating the same a predetermined amount, an adding lever for operating the sectors to normally cause positive actuation of the calculating members, a subtracting lever for operating the sectors to normally cause negative actuation of said calculating members, and means for so controlling the operative relation between the calculating members and the sectors that the operation of said adding lever causes negative actuation of said members.

9. In a calculating machine, the combination of a series of calculating members, a pivotally mounted sector associated with each member for actuating the same a predetermined amount, an adding lever for operating the sectors to normally cause positive actuation of the calculating members, a subtracting lever for operating the sectors to normally cause negative actuation of said calculating members, and a key for so controlling the operative relation between the calculating members and the sectors that the operation of said adding lever causes negative actuation of said members.

10. In a calculating machine, a series of calculating members, pivotally mounted sectors adapted to actuate said members a predetermined amount, means for moving said members into and out of operative relation to said sectors, an adding lever for operating said sectors to normally cause positive actuation of the calculating members, a subtracting lever for operating the sectors to normally cause negative actuation of said calculating members, and a key for so controlling said means that the operation of said adding lever causes the sectors to actuate the calculating members in a negative direction.

11. In a calculating machine, the combination of a series of calculating members, a subtracting lever, an adding lever for operating the same in either direction a predetermined amount, and a pair of keys for controlling the direction of operation of said calculating members by said adding lever.

12. In a calculating machine, the combination of a series of calculating members adapted to be operated in either direction, an adding key for causing the operation of said members in an adding or positive direction, a subtracting key for causing the operation of said members in a subtracting or negative direction, an adding lever, a subtracting lever, and means to effect subtraction upon the operation of the adding lever.

13. In a calculating machine, the combination of a series of calculating members adapted to be operated in either direction, an adding key for causing the operation of said members in an adding or positive direction, a subtracting key for causing the operation of said members in a subtracting or negative direction, and means for so interconnecting said keys that when either one is in its operative position the other is in its inoperative position.

14. In a calculating machine, the combination of a hand lever for operating the machine, a removable key, and means operated solely by the removal of said key to automatically lock said lever against operation.

15. In a calculating machine, the combination of an adding lever, a subtracting lever, a removable key, and means operated solely by the removal of said key to automatically lock both of said levers against operation.

16. In a calculating machine, calculating mechanism, a key-board, a depressible key mounted in said key-board, said key being removable, and means operated solely by the removal of said key to automatically lock said mechanism against operation.

17. In a calculating machine, calculating mechanism including numeral pinions and driving elements therefor, said pinions being movable into and out of engagement with said elements, a removable key, means connecting said key and said mechanism whereby operation of said key will prevent said pinions from engaging said elements, and further means connecting said key and said mechanism to automatically lock said mechanism against operation upon the removal of said key.

18. In a calculating machine, calculating mechanism, a removable key, means connecting said key and said mechanism to hold said mechanism in inoperative position upon the operation of said key, and automatic means operable upon the removal of said key to lock said mechanism against operation.

19. In a calculating machine, calculating mechanism, a removable key, printing mechanism, said key having means connected therewith whereby when the key is operated the calculating mechanism is held in inoperative position and the printing mechanism controlled, and when the key is removed the calculating mechanism is automatically locked against operation.

20. In a calculating machine, calculating mechanism, printing mechanism for printing explanatory characters, a removable key, and means connecting said parts whereby when said key is depressed the calculating mechanism will be held in inoperative position and an explanatory character printed to indicate that fact, and when said key is removed the calculating mechanism will be automatically locked.

21. In a calculating machine, the combination of a printing mechanism including means for supporting a record sheet in printing position, an adding lever for operating said mechanism to print positive items, a subtracting lever for operating said mechanism to print negative items, connections between said supporting means and each of said levers for shifting said supporting means back and forth by a single operation of either lever, and means for throwing said connections out of operation at will.

22. In a calculating machine, the combination of a pivoted platen-supporting carriage, mechanism for locking said carriage in printing position regardless of whether or not the platen be swung away from printing position, means for releasing the carriage from said mechanism, and means for automatically locking the machine against operation as a calculator when the carriage is unlocked regardless of whether or not the platen be swung away from printing position.

23. In a calculating machine, the combination of printing mechanism including a platen, calculating mechanism, a lever for simultaneously operating said mechanisms to enter a predetermined item, means for automatically locking said lever against operation when the platen is out of printing position, and further means operable upon swinging of said platen away from printing position to lock said lever locking means against release.

24. In a calculating machine, the combination of printing mechanism including a platen, means for locking said platen in printing position, means for releasing said locking means to permit raising of the platen out of printing position, calculating mechanism, a lever for simultaneously operating said mechanisms to enter a predetermined item, and connections between said locking means and said lever, whereby the latter is automatically locked against operation when the platen is moved out of printing position.

25. In a calculating machine, the combination of printing mechanism including a platen, calculating mechanism, means for operating said mechanisms to enter a predetermined item, means for moving said platen out of printing position, and key-controlled connections for preventing such movement of the platen.

26. In a calculating machine, the combination of totalizing mechanism comprising a sector and associated alining gear, a lever for normally actuating the same with said gear and sector intermeshing in both directions by a single operation thereof, carry over mechanism operative upon a single operation in either direction, and means for throwing the gear and sector out of engagement during the return movement of said lever.

27. In a calculating machine, the combination of totalizing mechanism comprising a sector and associated alining gear, transfer mechanism operative upon a single operation of the machine, a lever for normally actuating the totalizing mechanism with said gear and sector intermeshing in both directions by a single operation thereof, and a key for throwing the gear and sector out of engagement during the return movement of said lever.

28. In a calculating machine, the combination of a pivoted platen-supporting carriage, mechanism for locking said carriage in printing position, means for releasing the carriage from said mechanism, means for automatically locking the machine against operation when the carriage is unlocked, and key-controlled connections for rendering said last mentioned means ineffective.

29. In a calculating machine, the combination of printing mechanism including a platen, calculating mechanism, a lever for simultaneously operating said mechanisms to enter a predetermined item, means for automatically locking said lever against operation when the platen is out of printing position, and key-controlled connections for rendering said locking means ineffective.

30. In a calculating machine, the combination of printing mechanism, including a platen, calculating mechanism, means for operating said mechanisms to enter a predetermined item, means for moving said platen out of printing position and key-controlled connections for preventing such movement of the platen, said connections being operable upon depression of the total key.

31. In a calculating machine, the combination of a pivoted platen-supporting carriage, mechanism for locking said carriage in printing position, means for releasing the carriage from said mechanism, means for automatically locking the machine against operation when the carriage is unlocked, connections for rendering said last mentioned means ineffective and a removable key for controlling said connections.

32. In a calculating machine, the combination of printing mechanism, including a platen, calculating mechanism, a lever for simultaneously operating said mechanisms to enter a predetermined item, means for automatically locking said lever against operation when the platen is out of printing position, connections for rendering said locking means ineffective, and a removable key for controlling said connections.

33. In a calculating machine, the combination of calculating wheels, a key-controlled rack associated with each wheel for actuating the same, means for operating said racks to clear the numeral wheels, connections for automatically arresting the movement of each rack when the associated numeral wheel reaches zero position, an arm adapted to be connected with each rack for simultaneous operation therewith, whereby the actuated position of said arms is representative of the item cleared from the numeral wheels, a keyboard, and means for controlling said keyboard by said arms.

34. In a calculating machine, the combination of calculating wheels adapted to receive entries, means for operating said wheels in a negative direction to zero position, mechanism adapted to be operated in accordance with the negative operation of the numeral wheels, a keyboard controlled by said mechanism, and a lever for controlling the operative position of said mechanism.

35. In a calculating machine, the combination of printing mechanism, including a platen-carriage pivotally mounted for swinging movement, mechanism for locking said carriage in printing position and against swinging movement, means for releasing the carriage from said mechanism, means for automatically locking the machine against operation as a calculator when the carriage is unlocked, regardless of whether or not the platen is swung away from printing position, and means operable upon the swinging of said platen away from printing position to lock said calculator locking means against release.

36. In a calculating machine, the combination of printing mechanism, including a platen mounted to swing toward and from the other members of said mechanism, calculating mechanism, means for simultaneously operating said mechanisms to enter a predetermined item, means to lock said platen against swinging and in operative position, means to release said locking means, and means connecting said releasing means and said operating means whereby when said releasing means is operated said operating means is locked against operation, regardlless of the position of said platen, and when said releasing means is returned to normal position said operating means may operate providing the platen is in printing position.

In witness whereof, I hereunto subscribe my name this 9th day of December A. D. 1910.

MARTIN TEETOR.

Witnesses:
CLARENCE J. LOFTUS,
ELIZABETH SKAHILL.

---

Corrections in Letters Patent No. 1,344,191.

It is hereby certified that in Letters Patent No. 1,344,191, granted June 22, 1920, upon the application of Martin Teetor, of Des Moines, Iowa, for an improvement in "Calculating-Machines," errors appear in the printed specification requiring correction as follows: Page 14, line 4, for the reference-numeral "57" read *157*, and page 23, line 83, for "400ᵃ" read *400ᵇ*; page 30, line 63, for the word "are" read *were*; page 32, line 47, for the reference-numeral "645" read *647*; same page, line 48, for "647" read *645*, and line 117 for "625" read *65*; page 41, claim 22, commencing with the word "regardless," line 6, strike out all to and including the word "position," line 8, and insert the words *and against pivotal movement*; and that the said Letters Patent should be read with these corrections therein that the same may conform to the record of the case in the Patent Office.

Signed and sealed this 30th day of November, A. D., 1920.

[SEAL.]

L. B. MANN,
*Acting Commissioner of Patents.*

Cl. 235—60.

DISCLAIMER.

1,344,191.—*Martin Teetor*, Des Moines, Iowa. CALCULATING MACHINE. Patent dated June 22, 1920. Disclaimer filed October 31, 1927, by the assignee by mesne assignments, *Lincoln Accounting Machines Company*.

Hereby disclaims any structure falling within claims 7, 8, 12, and 25 of said patent as set forth more specifically below:

*Claims 7, 8, and 12.*—Your petitioner hereby disclaims any construction falling within the terms of any of these claims wherein the "adding lever" controls the release of a motor for operating the machine.

*Claim 25.*—Your petitioner hereby disclaims any construction falling within the terms of this claim, except one wherein the connections for preventing movement of the platen out of printing position are under the control of means for effecting clearing of the machine.

[*Official Gazette November 22, 1927.*]